(12) United States Patent
Tomlin et al.

(10) Patent No.: US 9,946,642 B2
(45) Date of Patent: Apr. 17, 2018

(54) DISTRIBUTED MULTIMODE STORAGE MANAGEMENT

(71) Applicant: Samsung Electronics Co., LTD, Gyeonggi-Do (KR)

(72) Inventors: Andrew Tomlin, San Jose, CA (US); Fred Weber, San Jose, CA (US)

(73) Assignee: SAMSUNG ELECTRONICS CO., LTD, Gyeonggi-Do (KR)

(*) Notice: Subject to any disclaimer, the term of this patent is extended or adjusted under 35 U.S.C. 154(b) by 97 days.

(21) Appl. No.: 14/947,931

(22) Filed: Nov. 20, 2015

(65) Prior Publication Data

US 2017/0139823 A1 May 18, 2017

Related U.S. Application Data

(63) Continuation-in-part of application No. 14/941,512, filed on Nov. 13, 2015, and a continuation-in-part of
(Continued)

(51) Int. Cl.
*G06F 12/02* (2006.01)
*G06F 3/06* (2006.01)
(Continued)

(52) U.S. Cl.
CPC .......... *G06F 12/0246* (2013.01); *G06F 3/061* (2013.01); *G06F 3/0604* (2013.01); *G06F 3/067* (2013.01); *G06F 3/0611* (2013.01); *G06F 3/0626* (2013.01); *G06F 3/0643* (2013.01); *G06F 3/0644* (2013.01); *G06F 3/0652* (2013.01); *G06F 3/0659* (2013.01); *G06F 3/0664* (2013.01); *G06F 3/0688* (2013.01); *G06F 11/2069* (2013.01);
(Continued)

(58) Field of Classification Search
CPC ............. G06F 12/0246; G06F 12/1009; H04L 67/1097
See application file for complete search history.

(56) References Cited

U.S. PATENT DOCUMENTS

| | | |
|---|---|---|
| 8,639,669 B1 | 1/2014 | Douglis et al. |
| 2003/0023818 A1 | 1/2003 | Archibald, Jr. et al. |

(Continued)

*Primary Examiner* — Edward J Dudek, Jr.

(57) ABSTRACT

In one embodiment, a distributed storage system comprises: a plurality of appliances, a distributed multimode storage management coordinator, and a communication mechanism for communicating distributed multimode storage management messages. A first one of the plurality of appliances can include: a plurality of storage devices that have a first storage partition including a first type of interface and a first information storage region and a second storage partition including a selective underlying exposure (SUE) interface and a second information storage region that stores a second type of information, wherein the SUE interface exposes an aspect of the second information storage region. The distributed multimode storage management coordinator can include a plurality of multimode storage management systems that direct conveyance of information to the plurality of storage devices, wherein the coordinator includes a multiple mode SUE management system that directs file activities of the second partitions via the SUE interface.

20 Claims, 47 Drawing Sheets

Related U.S. Application Data application No. 14/941,525, filed on Nov. 13, 2015, and a continuation-in-part of application No. 14/941,517, filed on Nov. 13, 2015.

(51) Int. Cl.
*G06F 11/20* (2006.01)
*G06F 12/1009* (2016.01)
*H04L 29/08* (2006.01)

(52) U.S. Cl.
CPC ...... *G06F 12/1009* (2013.01); *H04L 67/1097* (2013.01); *G06F 2201/805* (2013.01); *G06F 2212/1024* (2013.01); *G06F 2212/1044* (2013.01); *G06F 2212/154* (2013.01); *G06F 2212/2022* (2013.01); *G06F 2212/7202* (2013.01)

(56) References Cited

U.S. PATENT DOCUMENTS

| | | |
|---|---|---|
| 2004/0030847 A1 | 2/2004 | Tremaine |
| 2007/0074093 A1 | 3/2007 | Lasser |
| 2008/0077728 A1 | 3/2008 | Kim et al. |
| 2010/0172180 A1 | 7/2010 | Paley et al. |
| 2010/0250839 A1 | 9/2010 | Ito et al. |
| 2011/0107018 A1 | 5/2011 | Honda |
| 2011/0161559 A1 | 6/2011 | Yurzola et al. |
| 2012/0096217 A1 | 4/2012 | Son et al. |
| 2012/0297122 A1 | 11/2012 | Gorobets et al. |
| 2013/0227198 A1 | 8/2013 | Lee |
| 2014/0281126 A1 | 9/2014 | Bleyer et al. |
| 2014/0365719 A1 | 12/2014 | Kuzmin et al. |
| 2015/0058591 A1* | 2/2015 | Kaiser ............... G06F 17/30581 711/170 |
| 2016/0124847 A1 | 5/2016 | Malwankar et al. |
| 2017/0017588 A1 | 1/2017 | Frid et al. |

\* cited by examiner

| 370 Partition A | 380 Partition B |
|---|---|
| 371 Interface type 1 partition A | 381 Selective underlying exposure interface for partition B |
| 372 Partition A related activity | |
| 373 Underlying storage for partition A | 383 Underlying storage for partition B |

A first appliance requests allocation in open hot block.

3420

A second appliance performs allocation process.

3430

The first appliance receives allocation information from the second appliance.

Send data to allocated appliances.

3620

The allocated appliances write the data.

3630

Send data for parity calculation.

Send map updates to primary and redundant owners.

3820

Primary and redundant owners journal the map update and write map at later time.

3830

Primary and redundant owners send response.

3840

The responses are accumulated.

Appliances that wrote data send a write data safe indication.

4220

The responses are accumulated.

4230

Appliances send parity safe indication.

4240

A CMD complete indication is forwarded.

4510
A block is promoted to cold block and block picking is requested if necessary.

4520
Perform block picking and forward block pick results.

4530
Perform block pick selection.

4040
Broadcast selected block.

4550
Start performing reclamation and issue map lookup.

4560
Handle map response.

4570
Perform a reclamation write process.

FIG. 45

DISTRIBUTED MULTIMODE STORAGE MANAGEMENT

RELATED APPLICATIONS

This application is a continuation in part of and claims the benefit of prior:
application Ser. No. 14/941,512 entitled "Multimode Storage Management System", filed on Nov. 13, 2015;
application Ser. No. 14/941,525 entitled "A Multimode Storage Device", filed on Nov. 13, 2015; and
application Ser. No. 14/941,517 entitled "Selective Underlying Exposure Storage Mapping", filed on Nov. 13, 2015;
which are all incorporated herein by reference.

FIELD OF INVENTION

The present invention relates to the field of information storage.

BACKGROUND

Numerous electronic technologies such as digital computers, calculators, audio devices, video equipment, and telephone systems have facilitated increased productivity and reduced costs in most areas of business, science, education, and entertainment. These electronic systems typically include operations that involve information storage systems. The speed and ease at which the information storage operations proceed can have a significant impact on overall performance. However, conventional attempts at information storage typically involve an inverse relationship between speed and manageable complexity.

Information storage systems typically involve operations that can fall into one of two categories. One category involves storage operations associated with user initiated activities. The other category involves management and maintenance activities that are typically initiated by the system. The speed and ease at which these operations proceed often corresponds to the type of address space utilized to store the information. Traditional attempts at utilizing a physically addressed space are theoretically considered to operate at a very fast speed but attempts at actual management and maintenance operations in conventional physically addressed space are very complex and not practically implemented. Management and maintenance of conventional logical address space is generally considered to involve less complexity than a physical address space. However, a conventional logical address space does not operate as fast as a physical address space. While conventional storage systems may operate at levels that may have previously been considered tolerable, they are increasingly inadequate to meet the requirements and long felt need for improved applications and platforms. Conventional attempts at achieving both the increased speed and manageable complexity to enable improved system development have not been successful.

SUMMARY

Efficient and effective multimode storage devices that can include multiple different types of address spaces that enable different storage space activities are described. A multimode selective underlying exposure storage device can enable selective exposure of underlying aspects of the storage device. In one embodiment, a distributed storage system comprises: a plurality of appliances, a distributed multimode storage management coordinator, and a communication mechanism for communicating messages between the plurality of multimode storage management systems, including distributed multimode storage management messages. A first one of the plurality of appliances can include: a plurality of storage devices (SSD) that have a first storage partition including a first type of interface and a first information storage region configured to store a first type of information and a second storage partition including a selective underlying exposure (SUE) interface and a second information storage region that stores a second type of information, wherein the SUE interface exposes an aspect of the second information storage region. The distributed multimode storage management coordinator can include a plurality of multimode storage management systems that directs conveyance of information to the plurality of storage devices, wherein the plurality of multimode storage management systems includes multiple mode selective underlying exposure (SUE) management systems that direct file activities of the second partitions via the SUE interface and selected underlying aspects of the second partition.

The messages can keep selected underlying aspects exposed across the plurality of appliances. Metadata storage space and user data storage space can be spread out homogenously across the plurality of appliances. SUE mapping is maintained across multiple systems and wherein representative geometry configuration of the SUE address space mapping matches a representative geometry configuration of an underlying physical address space. Redundancy can be controlled at a level of the multimode storage management system. The plurality of appliances are arranged in an architecture in which elements of the architecture can be linearly scalable across multiple systems. The distributed multimode storage management coordinator operates based on a selective underlying exposure level across the plurality of storage devices. Failure of a single unit does not bring the distributed storage system down even though a node includes more than one storage device. Free space accounting can occur at a selected underlying aspect block level.

In one embodiment, a distributed storage method comprises: setting up a plurality of appliances in a redundant array independent device (RAID) configuration, wherein at least one of the plurality of appliances includes a plurality of storage devices; and managing information storage in the plurality of storage devices, including mapping a first type of address space into a SUE address space that corresponds to an aspect of one of the underlying storage devices. The managing can include coordinating management of information storage in the plurality of storage devices across the RAID configuration. The mapping data can be logically distributed across a plurality of storage devices redundantly. The coordinating includes communicating messages between a first one of the plurality of appliances and a second one of the plurality of appliances. Free space accounting can happen at a multimode storage management system level. The reclamation is managed by a primary block owner which triggers distributed block picking and a picked block is distributed to another block. A non primary block owner performs a physical scan and valid determination lookup.

In one exemplary implementation, a distributed facility comprises: a plurality of appliances that store information in stripes, a distributed multimode storage management coordinator, and a communication mechanism for communicating messages between the distributed multimode storage management coordinator system and a second one of the plurality of appliances. A first one of the plurality of appliances includes: a plurality of storage devices that have a first storage partition including a first type of interface and a first information storage region configured to store a first type of information; and a second storage partition including a SUE interface and a second information storage region that stores a second type of information, wherein the SUE interface exposes an aspect of the second information storage region. The distributed multimode storage management coordinator can include a plurality of multimode storage management systems that direct conveyance of information to the plurality of storage devices, wherein the distributed multimode storage management coordinator includes a multiple mode underlying exposure management system that directs file activities of the second partitions via the SUE interface and selected underlying aspects of the second partition. The distributed facility can further comprise physically striping metadata and user data across multiple systems. Redundancy can be controlled at a level of the distributed multimode storage management coordinator which is a higher hierarchical level than a storage device. A failure unit is a storage node and failure of a single node does not bring down the distributed facility, wherein a storage node includes one of the plurality of appliances.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

FIG. 3 is a block diagram of another exemplary multimode storage device in accordance with one embodiment.

FIG. 34 is a flow chart of an exemplary a write allocation process in accordance with one embodiment.

FIG. 36 is a flow chart of an exemplary a write allocation process in accordance with one embodiment.

FIG. 38 is a flow chart of an exemplary write map update process in accordance with one embodiment.

FIG. 42 is a flow chart of exemplary write completion process in accordance with one embodiment.

FIG. 45 is a flow chart of an exemplary reclamation process in accordance with one embodiment.

DETAILED DESCRIPTION

Reference will now be made in detail to embodiments of the invention, examples of which are illustrated in the accompanying drawings. While the invention will be described in conjunction with some embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Efficient and effective multimode storage approaches that can include multiple different types of address spaces and address space activities are described. In one embodiment, a multimode selective underlying exposure (SUE) storage device enables selective exposure of some underlying aspects of the storage device while not exposing other underlying aspects. A multimode storage and SUE approach can facilitate both improved performance while limiting complexity to a manageable scope. In one exemplary implementation, an underlying aspect of a physical address space is selectively exposed. An overall storage hierarchical approach can be implemented and underlying aspects from one hierarchical level are selectively exposed to another hierarchical level. The selective exposure can occur through address space configurations and mapping between address spaces. The selectively exposed underlying aspect can facilitate more efficient and effective implementation of various activities at a hierarchical level that is different than the hierarchical level at which the exposed underlying aspect resides. The activities can include storage management operations. It is appreciated that multimode storage and SUE approaches can include a variety of configurations and implementations.

A Multimode Storage Device

Figure 1:
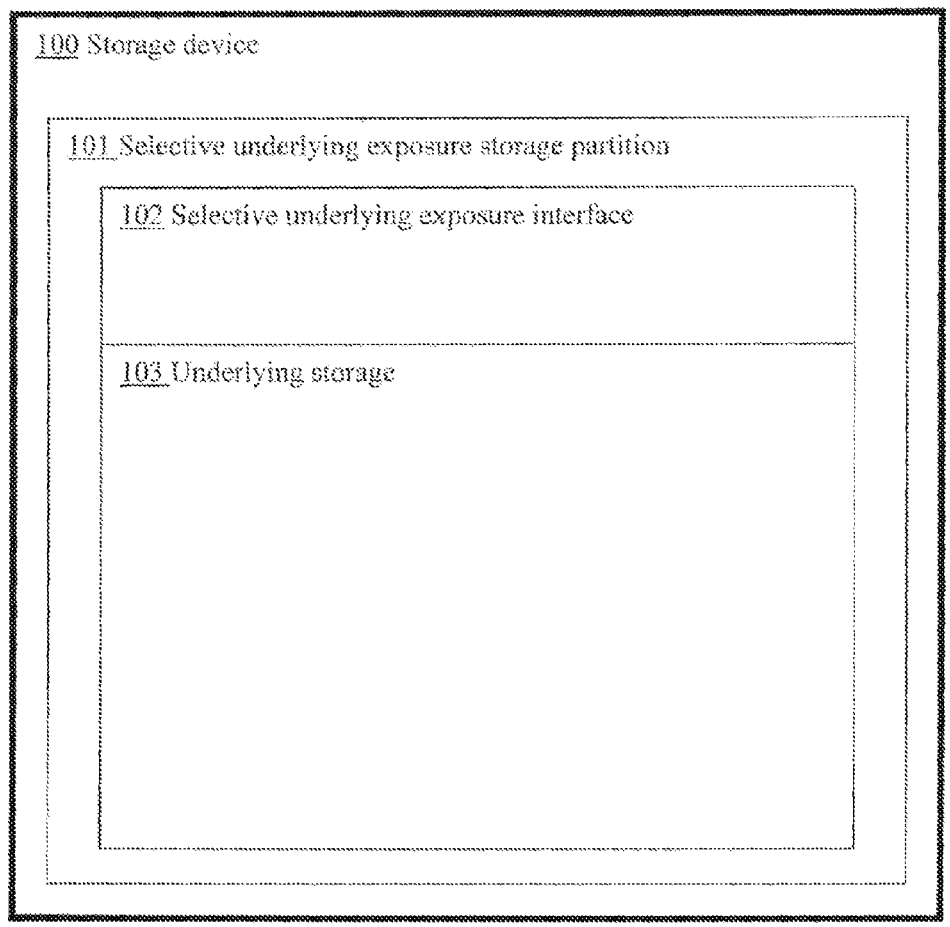
FIG. 1 is a block diagram of an exemplary storage device with a SUE storage partition in accordance with one embodiment.

FIG. 1 is a block diagram of an exemplary storage device 100 with a selective underlying exposure (SUE) storage partition 101 in accordance with one embodiment. SUE storage partition 101 includes a selective underlying exposure (SUE) interface 102 and underlying storage region 103. The underlying storage region 103 stores information and the SUE interface 102 enables selective exposure of an aspect (e.g., characteristic, feature, and function) of the underlying storage region itself (e.g., physical aspects related to dimensions, representative geometry, management functions, write operations, and erase operations) to an external component or storage system hierarchical level (not shown). The exposure can be associated with aspects of the information stored in underlying storage region 103 (user data and metadata). The SUE storage partition 101 can expose a portion of the underlying aspects (e.g., characteristics, features, and functions).

In one exemplary implementation in which a portion of the underlying aspects are exposed, an activity (e.g., free space management, reclamation and conditioning for free space use, over-provisioning, trim operations, and power cycling) the exposed aspects are associated with is performed more efficiently (e.g., faster, less bandwidth, and improved power consumption) than a system that does not selectively expose a portion of the underlying aspect. The activity can be performed with less complexity than an approach that exposes more or all of the underlying aspects. In one embodiment, the selection of which portion of the underlying aspects that are exposed is based upon a comparison or balancing of speed versus complexity. It is appreciated that the SUE storage partition 101 can be included in a single mode storage device with a single partition or the SUE storage partition can be included in a multimode storage device with a plurality of partitions.

Figure 2:
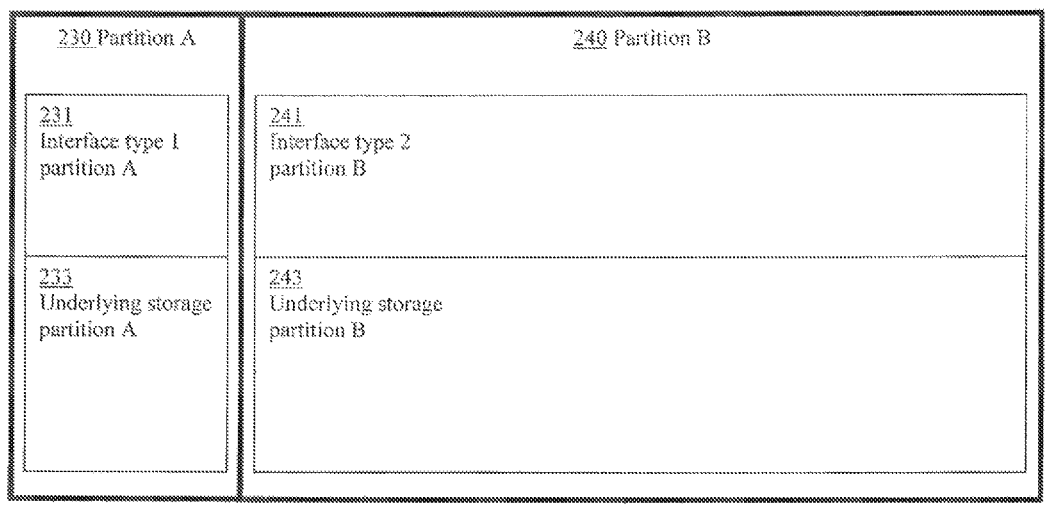
FIG. 2 is a block diagram of an exemplary multimode storage device in accordance with one embodiment.

FIG. 2 is a block diagram of an exemplary multimode storage device 220 in accordance with one embodiment. Storage device 220 includes a first partition 230 and a second partition 240. It is appreciated that the multiple modes and corresponding partitions can be associated with or based upon a variety of things. The various things can include different exposures of underlying storage, different address spaces (e.g., logical, virtual, and physical), different storage management modes (e.g., internal management and external management), different underlying stored information (e.g., metadata and user data), and so on. The internal management and external management can include storage device management system components and operations (e.g., flash management system (FMS) and solid state device management system). The partitions and corresponding components can also be different types.

Partitions and corresponding interfaces in a multimode storage device can be associated with different types of address spaces (e.g., logical address space and selective underlying exposure (SUE) address space). More than one partition and corresponding interface in a multimode storage device can also be the same type of address space (e.g., more than one partition and corresponding interface in a multimode storage device can be SUE address spaces). First partition 230 includes a first type of interface 231 and an underlying storage region 233. Second partition 240 includes a second type of interface 241 and an underlying storage region 243. In one embodiment, a first partition 230 is a first type of address space partition (e.g., logical address space partition) and a second partition 240 is a second type of address space partition (e.g., SUE address space and virtual address space). It is appreciated a partition can be a SUE storage partition.

FIG. 3 is a block diagram of another exemplary multimode storage device 350 in accordance with one embodiment. Storage device 350 includes a first partition 370 and a second partition 380. In one embodiment, first partition 370 is a first type of address space partition and second partition 380 is a SUE address space partition. First partition 370 includes a first type of interface 371 and an underlying storage region 373. Second partition 380 includes a SUE interface 381 and an underlying storage region 383. It is appreciated that some activities, such as first partition related activities 372 (e.g., FMS) can be performed for one partition internally (e.g., in the storage device) and externally (not shown) for the other partition.

Different types of information can be stored in the different partitions. In one embodiment, there are two types of information, metadata and user data. User data is primarily generated by user applications and metadata is primarily auxiliary information associated with the user data (e.g., location of file in a storage system hierarchy, size of content in a file, access time, modify time, and user ID). A first flash management system is focused on managing the metadata. The metadata in turn is used to manage storage of the user data.

It is appreciated that a storage system can direct or implement operations associated with user initiated activities differently than system operations associated with management or maintenance activities. For example, a user initiated read or write can be directed to a particular address or location from a user perspective while system operations can be directed to physical blocks and pages from a system perspective. It is also appreciated that a storage device can include a variety of configurations and implementations. In one embodiment, a storage device is a solid state device. The storage device can include flash components (e.g., NAND type flash components and NOR type flash components).

Figure 4:
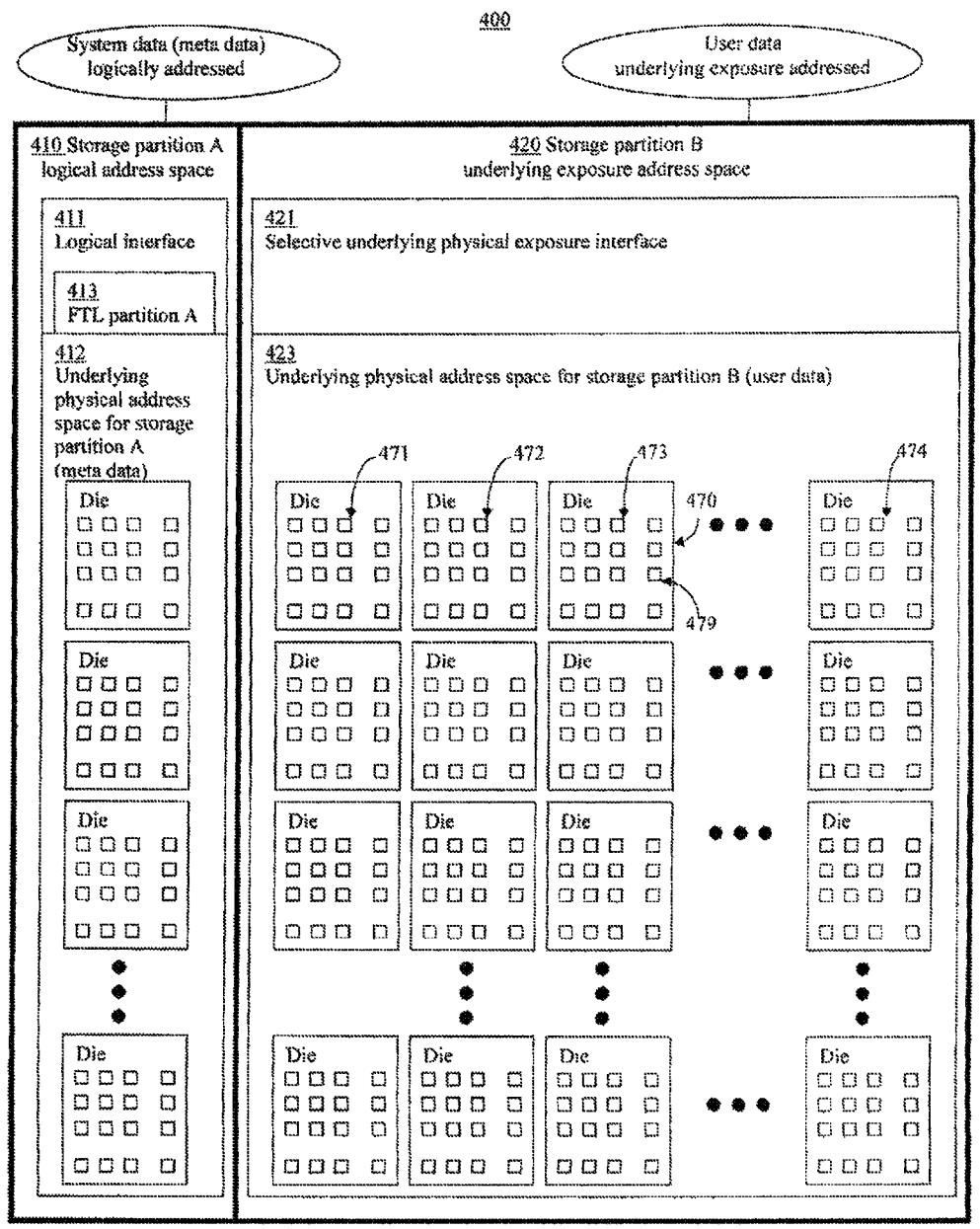
FIG. 4 is a block diagram of exemplary multimode solid state drive (MM-SSD) in accordance with one embodiment.

FIG. 4 is a block diagram of exemplary multimode solid state drive (MM-SSD) 400 in accordance with one embodiment. Multimode solid state drive (SSD) 400 may be one exemplary implementation of a multimode storage device. Multimode solid state drive 400 includes a logical address space partition 410, logical interface 411 that can include flash translation logic FTL 413, an underlying physical address space 412, a SUE address space partition 420, a SUE interface 421, and an underlying physical address space 423. The logical address space partition 410 can receive and store system data (e.g., metadata) that is logically addressed and the selective underlying address space partition 420 can receive user data (e.g., application data) that is addressed in accordance with an underlying exposure address space. The user data is stored in underlying physical address space 423 which can include flash storage components (e.g., different types of floating gate transistors). The flash storage components can be arranged in a variety of configurations and granularities. For example, the flash storage components can be arranged as a plurality of dies and a die 470 with blocks 473 and 479 and pages within the blocks.

In one embodiment, SUE interface 421 exposes an aspect of underlying physical address space 423. Selective aspects of underlying physical address space 423 are exposed by coordination of user data addressing with underlying operations of MM-SSD 400 physical address space 423. The coordination can correspond to exposure of management operations of the underlying physical address space. The underlying physical storage management aspect can include a grouping of a plurality of underlying physical address blocks (e.g., 471, 472, 473, and 474) that are managed together (e.g., in a single operation, as a single management unit, in a block set, in a band, and in response to single management command).

Figure 5:
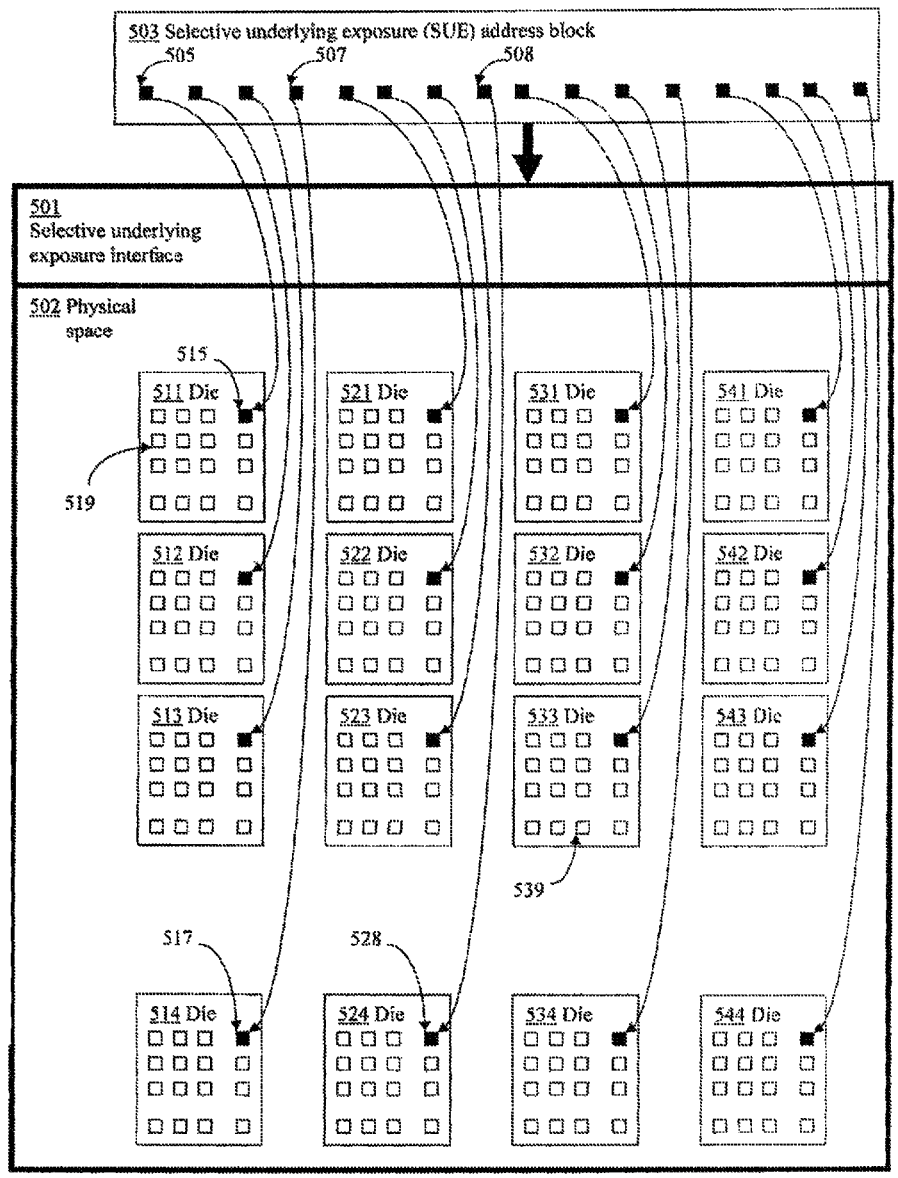
FIG. 5 is a block diagram illustrating an exemplary translation of address space information to logical address space information in accordance with one embodiment.

FIG. 5 is a block diagram illustrating an exemplary translation of address space information to logical address space information in accordance with one embodiment. SUE address block 503 includes information associated with various management and maintenance operations (e.g., 505, 507, and 508). Physical address space 502 includes a plurality of dies (511, 512, 513, 514, 521, 522, 523, 524, 531, 532, 533, 534, 541, 542, 543, and 544). Each die includes a plurality of physical addressed blocks (e.g., 515 and 519) and each physical addressed block includes a plurality of physical address pages.

Physical address space 502 accesses address storage locations on a physical block and physical page basis. A SUE type interface 501 receives selective underlying exposure (SUE) address space block 503 information and translates or reconfigures the information into configurations compatible with physical address space 502. The SUE address block 503 information corresponds to the information involved in a physical management operation. In one embodiment, management and maintenance operations are directed to physical blocks (e.g., physical block 515, 519, and 539) in physical space 502. A management operation can be directed to a physical address space or physical level management unit. The physical level management unit can include managing a plurality of addresses, pages, blocks, and so on that are managed at substantially the same time (e.g., in response to a management operation or command). For example, an erase operation can be directed to a physical block (shown in black similar to block 515) from each die. As the SUE address block is configured to match the physical block, each piece of information (e.g., 505, 507, and 508) for each corresponding physical block is included in the SUE address space block 503. In one exemplary implementation, SUE interface 501 receives SUE address space block 503 information, identifies information 505, 507, and 508 as corresponding to physical blocks 515, 517, and 528 respectively, and performs the corresponding management and maintenance operations accordingly. In one embodiment, erase management operations are performed on information in a plurality of physical blocks and write operations are performed on information in a page.

The geometries of the two address spaces can also be different. In one embodiment, a logical address space is a single dimension (e.g., how the logical block address (LBA) offset is aligned). A physical address space is multidimensional, including various aspects such as error correction code (ECC), physical page, physical block, physical die, and so on (including some or a subset thereof). The SUE address space can be one dimensional or a limited or reduced number of dimensions. In one exemplary implementation of the SUE address space, dimensions of an underlying physical address space are abstracted into a single or reduced number of dimensions. Selected dimensions (e.g., block and page) associated with a management activity (e.g., reclamation/garbage collection and power cycling) of the underlying physical address space are abstracted into a SUE address space while other aspects or activities (e.g., ECC) of the underlying physical address space are not abstracted into the SUE address space.

Figure 6:
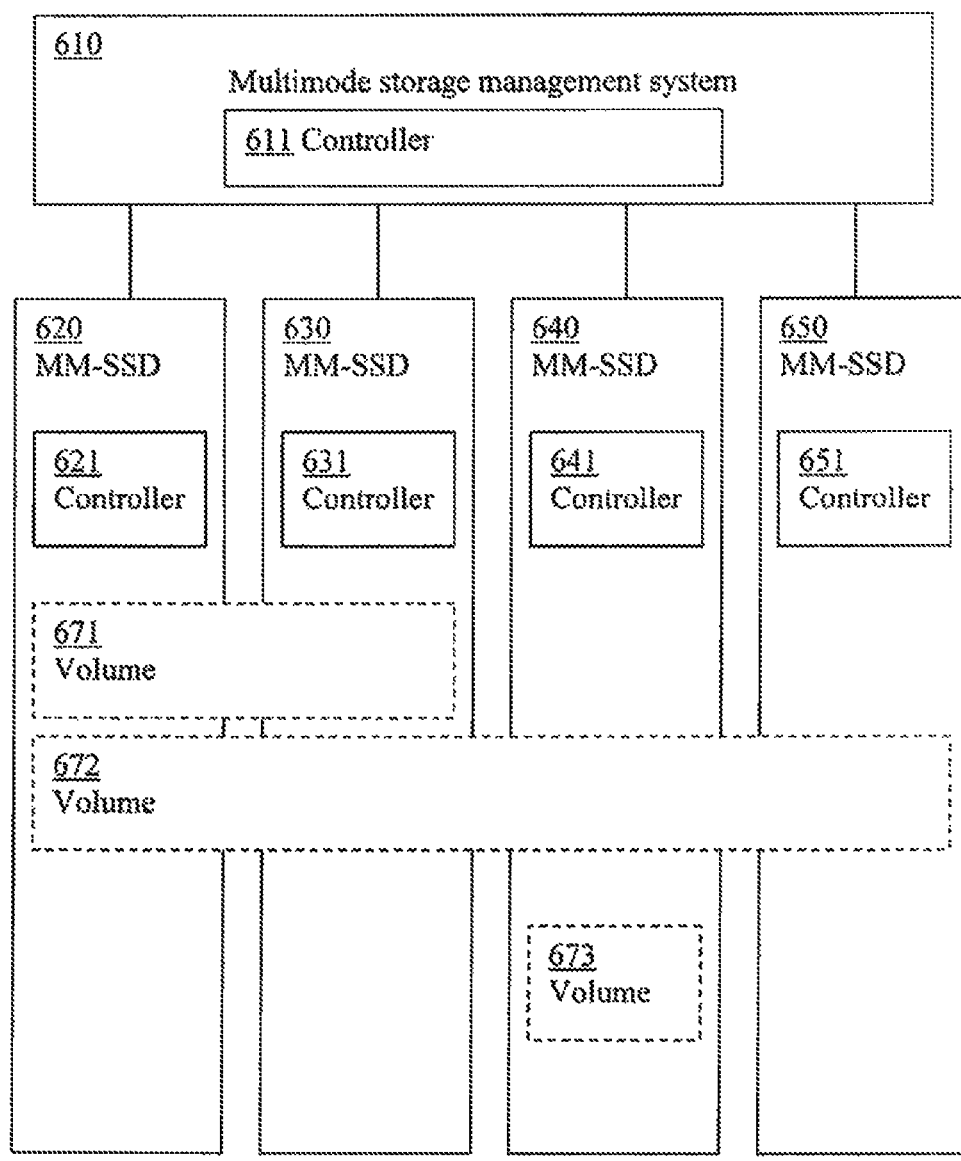
FIG. 6 is a block diagram of an exemplary system in accordance with one embodiment.

It is appreciated that, selective exposure of an underlying aspect can include coordination prior to delivery of the user data to MM-SSD 400 performed by other components (not shown) in the overall system rather than the MM-SSD. In one embodiment, a MM-SSD can be coupled to a management component operating at a different level of an overall system hierarchy. FIG. 6 is a block diagram of system 600 in accordance with one embodiment. System 600 includes a plurality of MM-SSDs (e.g., 620, 630, 640 and 650) communicatively coupled to multimode storage management system 610. It is appreciated that some activities (e.g., some storage management operations and flash management system operations) can be controlled by multimode storage management system 610 and other activities (e.g., other storage management operations and flash management system operations) can be controlled by the multimode MM-SSDs 620, 630, 640, and 650 respectively. In one embodiment, MM-SSDs 620, 630, 640, and 650 include controllers 621, 631, 641, and 651 respectively that control or direct some activities for MM-SSDs 620, 630, 630, and 650 while multimode storage management system 610 includes controller 611 that controls or directs some activities for MM-SSDs 620, 630, 640, and 650. In one exemplary implementation, controllers 621, 631, 641, and 651 control or direct activities of the first partitions in MM-SSDs 620, 630, 640, and 650 respectively, and controller 611 controls or directs activities of the second partitions in MM-SSDs 620, 630, 640, and 650. Controller 611 can control the activities in the MM-SSDs 620, 630, 640, and 650 via selective underlying exposure interfaces.

In one embodiment, system 600 includes multiple volumes (e.g., 671, 672, and 673). In one exemplary implementation, the system includes a user space and the user space is mapped into multiple volumes and the storage space is presented to the user as the multiple volumes. It is appreciated that the volumes can be different sizes. It is also appreciated that the different size SUE addressable units can be associated with the multiple volumes.

Figure 7:
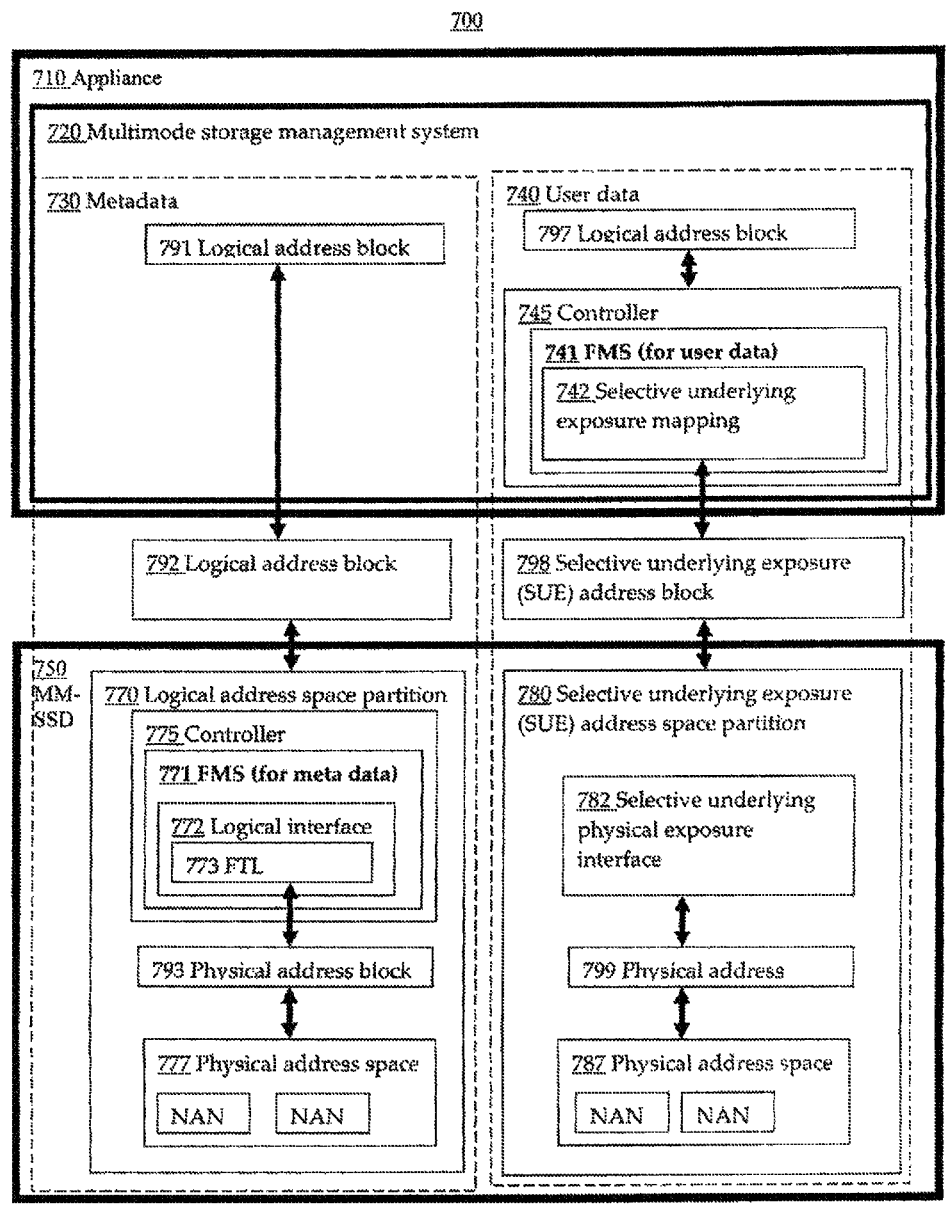
FIG. 7 is a block diagram of system in accordance with one embodiment.

FIG. 7 is a block diagram of system 700 in accordance with one embodiment. System 700 includes a multimode SSD (MM-SSD) 750 communicatively coupled to multimode storage management system 720 included in appliance 710. It is appreciated that other multimode SSDs can be coupled to multimode storage management system 720. System 700 manages storage of metadata 730 and user data 740. Multimode storage management system 720 includes a controller 745. Controller 745 includes flash management system 741 (for user data) and SUE mapping 742. Multi-Mode SSD 750 includes logical address space partition 770 and SUE address space partition 780. Logical address space partition 770 includes physical address space 777 and a controller 775 that includes flash management system 771 (for metadata). Flash management system 771 can include logical interface 772, which in turn can include FTL 773. Physical address space 777 can include NAND flash. Underlying exposure address space partition 780 includes SUE interface 782 and physical address space 787, which can include NAND flash.

Metadata 730 information is received in logical address blocks 791 and forwarded in logical address blocks 792 from multimode management system 720 to logical address space 770. It is appreciated that logical address blocks 791 and 792 can be identical (e.g., logical address blocks 791 is unchanged and simply forwarded logical address space 770). Logical interface 772 translates the logical block address (LBA) associated with the metadata to a physical address block 793 associated with physical address space 777. FMS 771 directs storage management and maintenance operations associated with physical address space 777. The metadata is stored in NAND flash of physical address space 777.

User data in logical address blocks 797 is forwarded to FMS 741. As underlying features and characteristics of physical address space 787 are exposed via SUE interface 782, FMS 741 directs flash management system and maintenance operations associated with underlying features and characteristics of physical address space 787. A SUE mapping component 742 maps the logical address block 797 to SUE address block 798, which is in turn translated by selective underlying interface 782 to a physical address block 799 (e.g., similar to 517 and 519 in FIG. 5) associated with NAND flash components included in physical address space 787. It is appreciated that the logical address block can be a different size than the SUE address block, which in turn can be a different size than the physical address block.

Performing various activities in the hierarchy level above facilitates more efficient and convenient management than conventional approaches. Conventional approaches are often limited in their flexibility in dealing with activities that impact multiple layers. Some conventional approaches must perform an activity on multiple levels resulting in exponential adverse impacts on overall performance (e.g., log-on-log, FMS at drive level and FMS at system level). For example, in a raid storage system there are a number of items that need to managed together (e.g., data storage and corresponding parity storage) that have impacts at both an upper storage hierarchy level (e.g., raid system management level) and a lower storage hierarchy level (e.g., storage drive level). The lifecycle of information may be different for each level (e.g., a user may want to overwrite the information but the raid system may still need it for parity recalculation) resulting in a drive FMS writing "new" data for a user but the system FMS still keeping the "old" information for the raid system. This results in write amplification being 1/(OPdrive) (OPsystem) without the ability to do trim.

Figure 8:
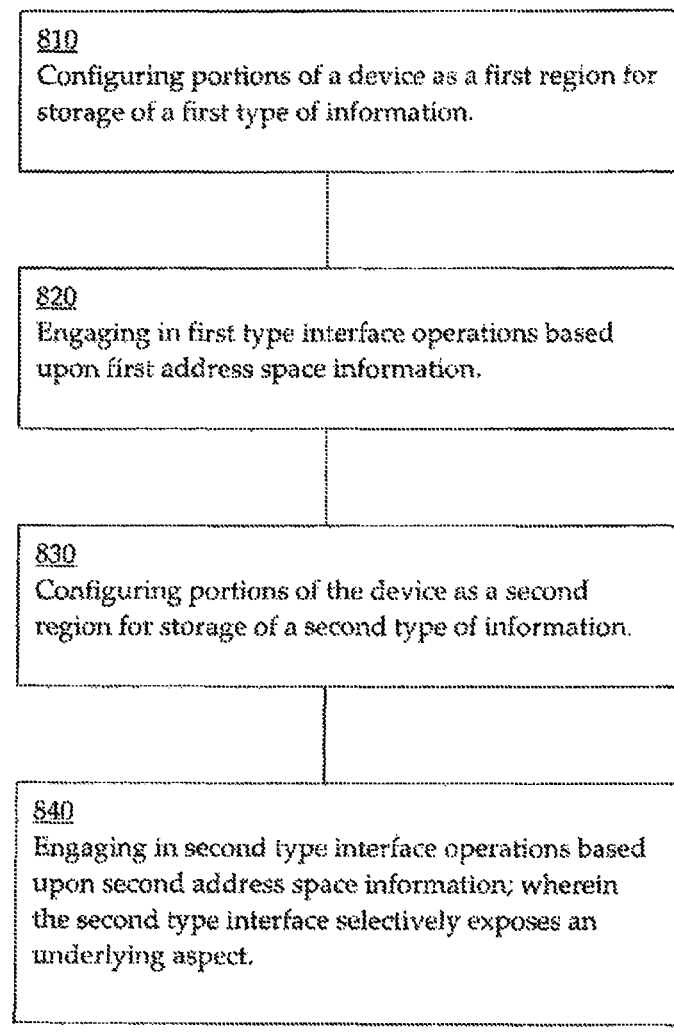
FIG. 8 is a flow chart of multimode underlying exposure drive method in accordance with one embodiment.

FIG. 8 is a flow chart of multimode selective underlying exposure (MM-SUE) drive method 800 in accordance with one embodiment. In a drive with over provisioning (e.g., SSD) of 7%, the drive is working 15 times harder than a direct overwrite system without drive over provisioning (e.g., HDD) and also another 15 times harder for a system without system over-provisioning for a total of 225 (15×15) times harder. The multimode storage device that allows the FMS to be moved up to the upper level facilitates a reduction back down (e.g., for 7% just 15 times harder range, and for 28% just 3 times harder range) resulting in a reduction of write amplification. In one exemplary implementation, the selected underlying address block and pages used to direct management operations from the upper level are coordinated with or match the underlying physical level and allow the user and system lifecycles to differ, but from a management standpoint the lifecycles are aligned (e.g., can correspond the use and erasure of the user space).

In block 810, a first portion of a device is configured or designated as a first region for storage of a first type of information. In one embodiment, the first region is a metadata region and the first type of information is metadata. The error correction code (ECC) size can be varied.

In block 820, first type interface operations are performed based upon first address space type information. In one exemplary implementation, the first region is a metadata region and the first type of information is metadata. In one embodiment, the first address type interface is a logical address space interface and operations are performed based upon logically addressed information. The logical interface operations can include flash translation logic (FTL) comprising: receiving metadata and logical addresses; and translating between address blocks visible at a system level configuration to address blocks at the physical level configuration.

In block 830, a second portion of a device is configured or designated as a second region for storage of a second type of information. In one embodiment, the second region is a user data region and the second type of information is user data. A SUE address space abstracts or removes complexity associated with the physical address space while still exposing a relationship or correspondence with the underlying physical address space configuration. In one exemplary implementation, the physical space dimensions are abstracted into a SUE address page dimension and SUE address block dimension. The physical address space is abstracted by a SUE address.

In block 840, second type interface operations are performed based upon second address space information, wherein the second type interface selectively exposes an underlying aspect. The second address space information can be selective underlying exposure (SUE) address space information, wherein the SUE address space information corresponds to an underlying aspect. The underlying aspect can include a representative geometry or dimension of a physical address space geometry. The SUE interface can expose dimensions associated with underlying system management operations (e.g., free space management, reclamation, and conditioning for free space use). The percentage of over provisioning in metadata region is different than the percentage of over provisioning in user data region.

Figure 9:
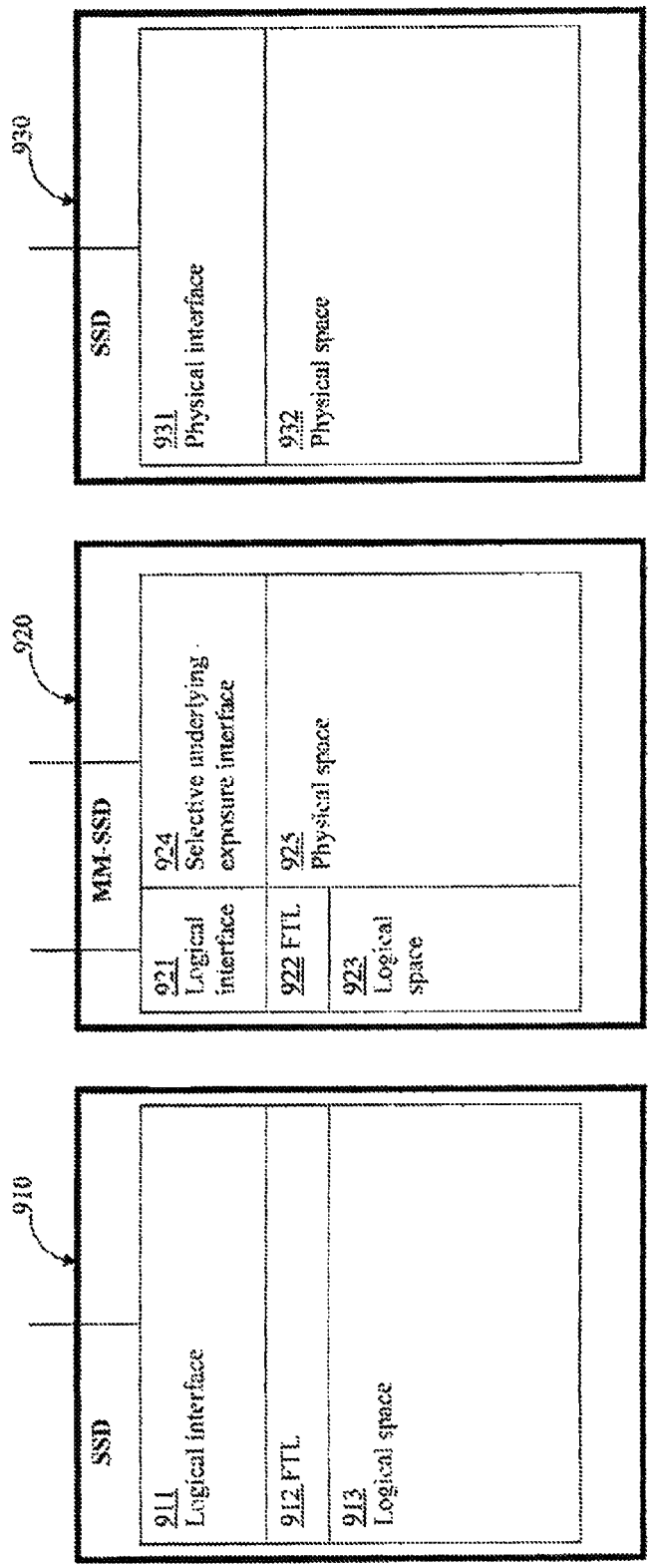
FIG. 9 is a block diagram of an exemplary multimode SSD device in contrast to conventional attempts at a logical SSD approach and a physical SSD approach.

FIG. 9 is a block diagram of exemplary multimode SSD device 920 in contrast to conventional attempts at a logically addressed SSD 910 and a physically addressed SSD 930. Logically addressed SSD 910 includes logical interface 911, FTL 912, and logical address space 913. Physically addressed device 930 includes physical interface 931 and physical address space 932. Multimode SSD 920 includes logical interface 921, FTL 922, logical space 923, SUE interface 924, and physical space 925.

Multimode SSD 920 facilitates convenient and selective exposure of underlying aspects of the drive. The multimode SSD 920 allows an appropriate amount of exposure without undue complexity unlike conventional approaches that either do not expose enough or have too much complexity. However conventional SSDs are not typically a nice linear address space in reality, rather they usually have a controller with a bunch of flash chips with dies configured to operate in blocks made up of pages that have the data to be stored in groups or strings of transistors. Physically addressed device 930 tries to expose all of the underlying physical address aspects of the storage medium allowing what is considered very fast operations (e.g., compared to logically addressed SSD 910) but gives rise to a very complex approach. Logical SSD 910 has what is considered a single linear flat mapping space with a scheme that hides away all or nearly all the underlying details of aspects of the storage medium, however trying to store the data ultimately in a physical region with many of the underlying details hidden slows the system down (e.g., compared to physically addressed SSD 930).

Multimode SSD 920 facilitates convenient and flexible configuration and implementation of FMS operations. Multimode SSD 920 primarily performs FMS operations in an internal controller of multimode SSD 920 for logical space 923 while FMS operations for SUE address space 925 are primarily performed at a system level in a controller external to multimode SSD 920. This ability to split or divide FMS operations of the multimode SSD 920 is unlike FMS operation approaches used for SSD 910 and SSD 930 that do not allow a split or division of FMS operations. FMS operations for logical SSD 910 are primarily performed in a controller of logical SSD 910 while FMS operations for physical SSD 930 are primarily performed at a system level in a controller external to physical SSD 930. In one embodiment, multimode SSD 920 selectively exposes some underlying address space features and SSD 910 and SSD 930 do not facilitate selective exposure of some underlying address space features and not others. In one embodiment, the exposure of the underlying aspect to an external FMS involves mapping of the selected exposure of the underlying aspect.

Selective Underlying Exposure (SUE) Mapping

Another embodiment of the present invention implements a selective underlying exposure (SUE) mapping scheme to create a mapping from a logical address space to a SUE address space for user data in a storage system. The SUE mapping scheme selectively exposes significant features of the underlying physical storage media in order to permit certain storage media management functions to be performed at a system level across multiple storage devices rather than at an individual storage device level.

For example, an embodiment enables selective exposure of aspects of a user address space across multiple NAND flash nonvolatile memory devices in a storage appliance. The SUE pages and blocks of the SUE mapping scheme are aligned with corresponding physical pages and blocks that are jointly managed as a unit in each of the physical NAND flash nonvolatile memory devices. Individual dies in the physical NAND flash nonvolatile memory devices are not distinguished in the SUE mapping scheme, but nonetheless are indirectly reflected in the SUE block size.

The correlation between the physical pages and blocks of the storage devices and the SUE pages and blocks of the SUE mapping scheme allows certain NAND flash management functions, such as erasures, programming, reclamation (garbage collection) and free space management, to be coordinated and implemented at a system level across all NAND flash nonvolatile memory devices in the storage system. The system-level implementation of certain storage media management functions can provide advantageous efficiencies regarding storage resource provisioning.

Referring again to FIG. 3, a multimode storage device (e.g., 350, 400, 620), such as a NAND flash nonvolatile memory device, may be implemented in conjunction with the SUE mapping scheme described in this disclosure. For example, in some embodiments the multimode storage device is a NAND flash-based solid-state drive (SSD). In some embodiments, the multimode storage device conforms to a standardized physical form factor, such as a standard disk drive form factor or a standard memory card form factor.

Referring again to FIG. 5, as described above, a multimode storage device can include multiple dies 511, 512, 513, 514, 521, 522, 523, 524, 531, 532, 533, 534, 541, 542, 543, and 544, or memory chips, with a number of NAND flash memory cells. The NAND flash memory cells on each die are subdivided into multiple discrete physical blocks of memory cells, such as physical blocks 515, 517, 519, 528, and 539.

Erasures and management of free space generally are performed with respect to blocks of memory cells on one or more discrete groupings of dies on the multimode storage device. For example, a multimode storage device may include one hundred twenty-eight dies, and may erase and manage free space with respect to one block from each of the one hundred twenty-eight dies as a group or unit. Alternatively, multimode storage device 350 may include one hundred twenty-eight dies, and may erase and manage free space with respect to one block from a subset of the dies as a group, for example, a grouping of thirty-two dies.

Figure 10:
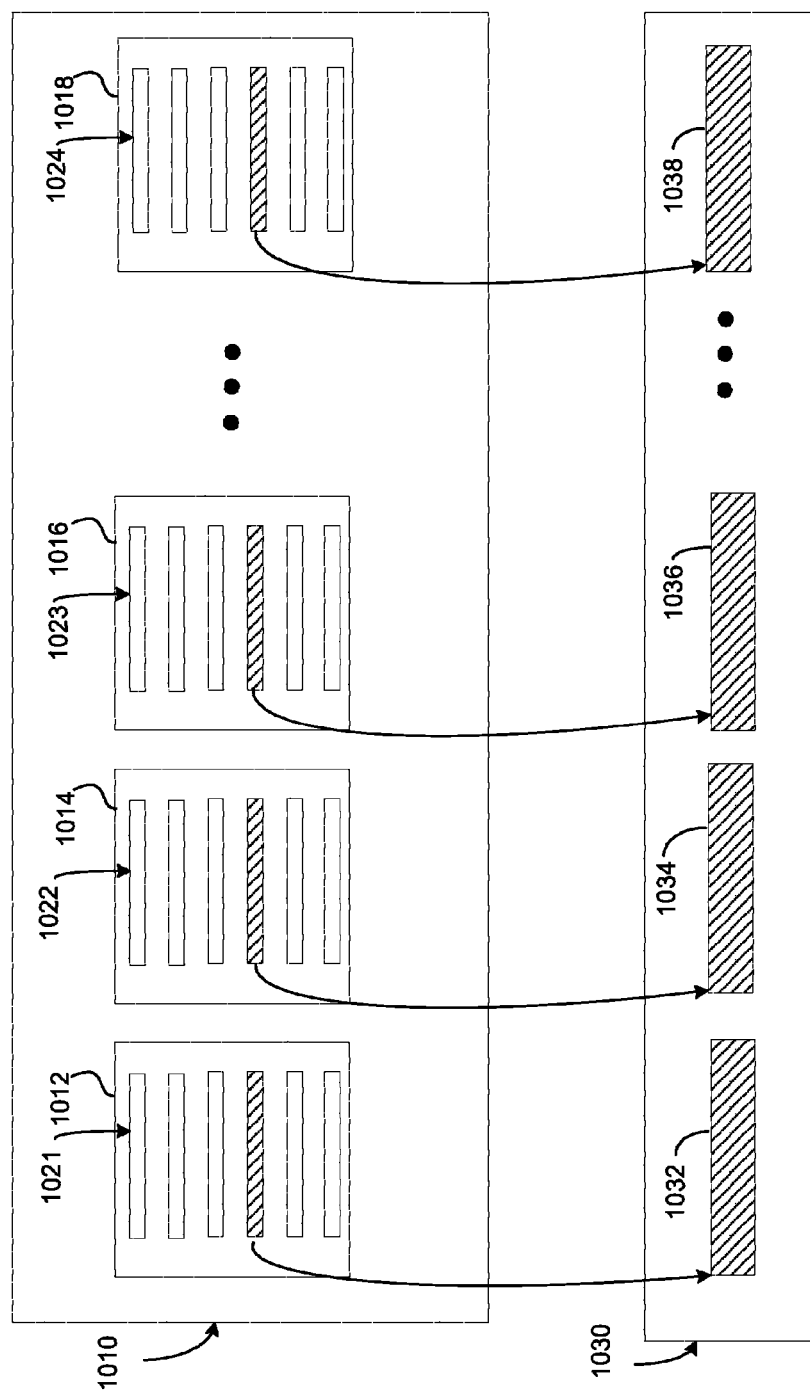
FIG. 10 is a block diagram depicting an exemplary SUE block and a corresponding SUE page for storage in the user area of a multimode storage device in accordance with an embodiment of the present invention.

Referring now to FIG. 10, a sequence of physical blocks 1012, 1014, 1016, and 1018 are shown that form a SUE block 1010. Each physical block of memory cells 1012, 1014, 1016, and 1018 is further subdivided into multiple discrete physical pages (e.g., 1021, 1022, 1023, and 1024) of memory cells. A SUE page 1030 includes a corresponding physical page 1032, 1034, 1036, and 1038 from each physical block 1012, 1014, 1016, and 1018 in the corresponding SUE block 1010.

In an embodiment of the present invention, a SUE configuration of the memory cells in the multimode storage device (e.g., 350, 400, or 620) is created. SUE pages and SUE blocks are organized with respect to each grouping of dies on the storage device that are jointly managed as a unit with respect to programming and erasures. SUE blocks are defined to include one physical block of memory cells from each die of a subset of dies in the multimode storage device that are jointly erased and managed as a unit. SUE pages are defined to include discrete sections or segments of a SUE block that are jointly programmed.

For example, in an embodiment the multimode storage device has one hundred twenty-eight dies, and jointly erases and manages free space on a respective physical block from each die. The corresponding SUE block 1010 is defined to include one hundred twenty-eight respective physical blocks of memory cells from the multimode storage device. The corresponding SUE page 1030 is defined to include one hundred twenty-eight respective sections or segments corresponding to the respective physical blocks.

In another embodiment, the multimode storage device has one hundred twenty-eight dies and, for example, jointly erases and manages free space on a respective physical block from thirty-two dies at a time. The corresponding SUE block 1010 is defined to include thirty-two respective physical blocks of memory cells from the multimode storage device. In this case, the corresponding SUE page 1030 is defined to include thirty-two respective sections or segments corresponding to the respective physical blocks.

In yet another embodiment, the multimode storage device has one hundred twenty-eight dies divided into four planes, and manages free space on a respective four-plane block from each die. The corresponding SUE block 1010 is defined to include one hundred twenty-eight respective four-plane blocks of memory cells from the memory device. In this case, the corresponding SUE page 1030 is defined to include one hundred twenty-eight respective sections or segments corresponding to the respective four-plane blocks.

Figure 11:
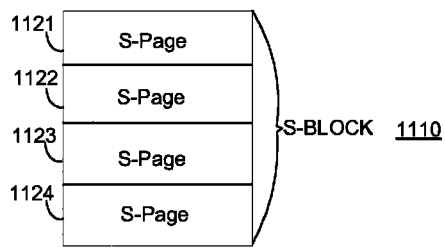
FIG. 11 is a block diagram depicting an exemplary SUE block of user storage space and corresponding SUE pages for storage in the user area of a multimode storage device in accordance with an embodiment of the present invention.

Referring now to FIG. 11, an exemplary SUE block (S-Block) 1110 of user storage space is represented as a block diagram. In one embodiment, SUE block 1110 can be considered similar to a virtual block (V-Block). The SUE block 1110 is the basic unit of memory media management at the individual storage device level. The SUE block is composed of multiple SUE pages (S-Pages). In one exemplary implementation, SUE pages can be considered similar to virtual pages (V-Pages). For example, the SUE block 1110 depicted in FIG. 11 includes four SUE pages (S-Pages) 1121, 1122, 123, and 1124.

As depicted in FIG. 5, the physical memory cells allotted to a SUE page (S-Page) in a SUE block (S-Block) are located in corresponding physical pages and physical blocks across multiple dies in a single multimode storage device (e.g., 350, 400, or 620). Alternative embodiments include blocks that are divided into any number of pages based on the relationship between the physical erasure block size and the programmable physical page size of the multimode storage device.

Figure 12:
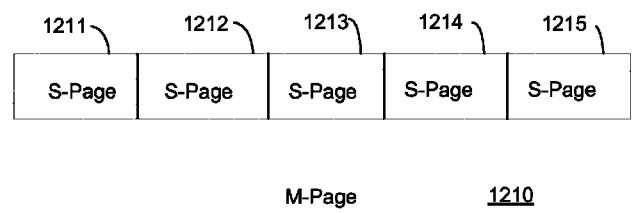
FIG. 12 is a block diagram depicting an exemplary SUE metapage and corresponding SUE pages for storage in the user area of a multimode storage device in accordance with an embodiment of the present invention.

Referring now to FIG. 12, an exemplary metapage (MPAGE) 1210 is represented as a block diagram. The metapage 1210 is composed of multiple SUE pages (S-Pages) across multiple storage devices in a storage system. For example, the metapage 1210 depicted in FIG. 12 includes five SUE pages (S-Pages) 1211, 1212, 1213, 1214, and 1215. Alternative embodiments include metapages that are divided into any number of SUE pages based on the number of individual multimode storage devices in the storage system and the number of dies jointly managed as a unit in each of the multimode storage devices.

The physical memory cells allotted to each SUE page are located in an individual multimode storage device (e.g., 350, 400, or 620). The memory cells allotted to the various SUE pages 1211, 1212, 1213, 1214, and 1215 that form a metapage 1210 are located in multiple storage devices (e.g., 620, 630, 640, and 650) associated with a storage system, for example, a storage appliance.

Thus, while the size or width of the SUE pages 1121, 1122, 1223, and 1124 correspond to the number of dies that are jointly managed as a unit in each multimode storage device, the size or width of the metapage 1210 corresponds to the number of multimode storage devices included in the storage system.

Figure 13:
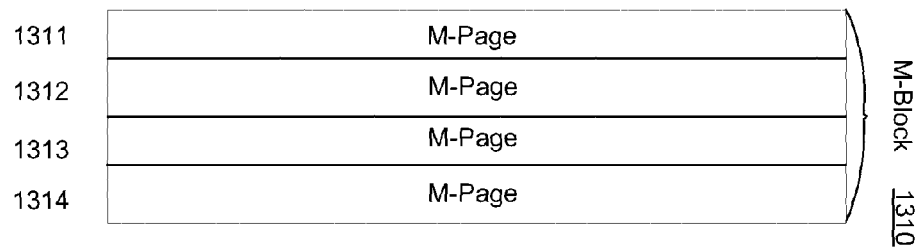
FIG. 13 is a block diagram depicting an exemplary SUE metablock and corresponding SUE metapages for storage in the user area of a multimode storage device in accordance with an embodiment of the present invention.

Referring to FIG. 13, an exemplary metablock (M-Block) 1310 is represented as a block diagram. The metablock (M-Block) 1310 is composed of multiple metapages 1311,

1312, 1313, and 1314. As with the metapage (M-Page) 1210, the physical memory cells allotted to a metablock (M-Block) 1310 are located in multiple storage devices associated with a storage system. That is, a metablock (M-Block) 1310 includes a respective block from each die in corresponding subsets of dies that are jointly managed as a unit in each multimode storage device (e.g., 620, 630, 640, and 650) in a storage system. Thus, the size of the metablock 1310 corresponds to the number of dies that are jointly managed in each multimode storage device (e.g., 350, 400, or 620) and the number of multimode storage devices (e.g., 620, 630, 640, and 650) included in the storage system.

Figure 14:
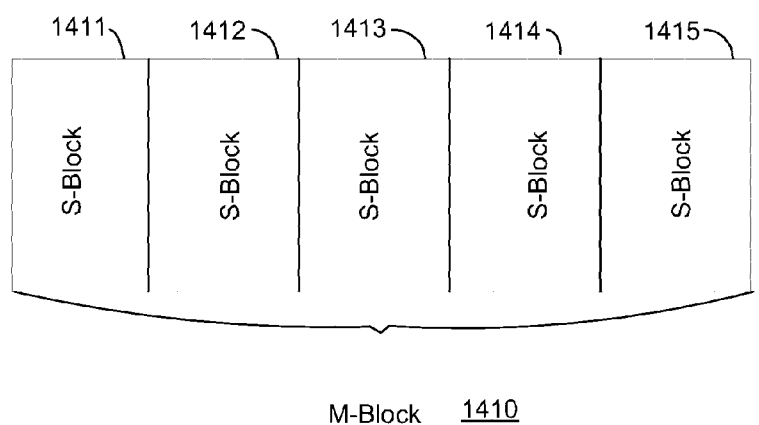
FIG. 14 is a block diagram depicting another exemplary SUE metablock and corresponding SUE blocks for storage in the user area of a multimode storage device in accordance with an embodiment of the present invention.

Referring to FIG. 14, the exemplary metablock (M-Block) 1410 can be represented as a block diagram composed of multiple SUE blocks (S-Blocks) 1110. The metablock 1410 is an aggregation of respective SUE blocks 1411, 1412, 1413, 1414, and 1415 from each subset of jointly managed dies in each of the multimode storage devices (e.g., 620, 630, 640, and 650) included in the storage system. Similarly, a metapage 1210 is an aggregation of corresponding SUE pages (e.g., 1211, 1212, 1213, 1214, and 1215) from each of corresponding SUE blocks 1411, 1412, 1413, 1414, and 1415 in a metablock 1410.

In an embodiment of the present invention, certain memory media management functions, such as erasures, programming, reclamation (garbage collection) and free space management, are performed at the metablock level. That is to say, these memory media management functions are coordinated at the storage system level, instead of at the individual storage device level.

In order to enable the desired system-level memory management, the logical address space dedicated to user data, which is addressed, for example, by applications and virtual machine (VM) operating systems, is mapped to a SUE address space. Thus, the user area of the multimode storage devices in the system is addressed through an underlying exposure interface. The system-level memory mapping and management results in a lower write amplification factor, which allows reduced storage provisioning, resulting in cost savings.

Figure 15:
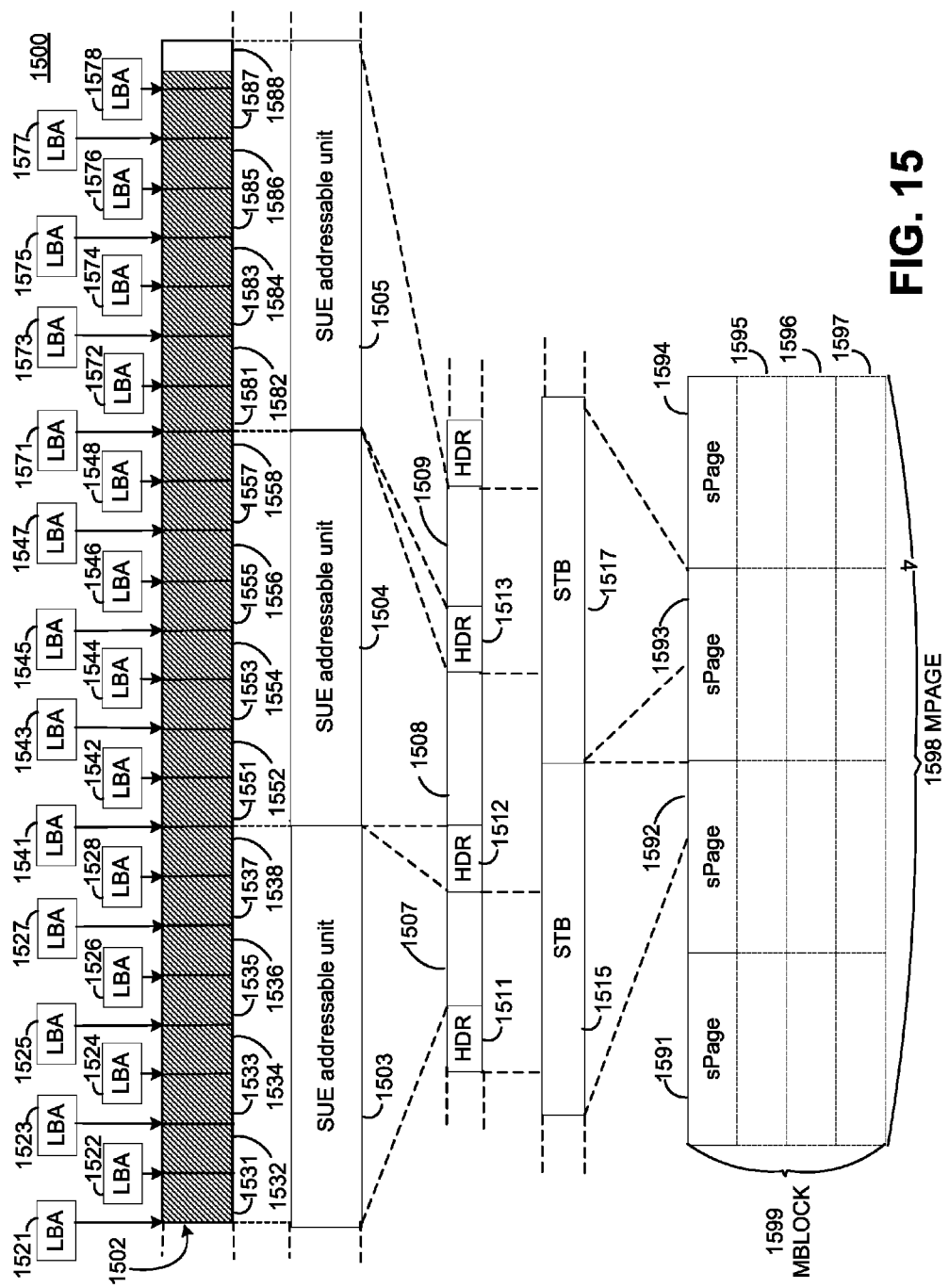
FIG. 15 is a block diagram depicting an exemplary SUE mapping scheme that may be implemented by a multimode storage system to provide logical-to-SUE storage address mapping in accordance with an embodiment of the present invention.

Referring to FIG. 15, a SUE mapping scheme 1500 is illustrated that may be implemented by a storage system, such as the multimode storage management system 610 of FIG. 6, to provide logical-to-SUE storage address mapping in an embodiment of the present invention. The SUE mapping scheme 1500 correlates a logical address space with a SUE address space. The SUE address space reveals significant features of the underlying physical storage media. The SUE address space is used to address the aggregate physical storage space of multiple storage devices in a storage system.

User data 1502 is received as input, for example, from host applications and virtual machine operating systems. The host user data is organized into storage units, for example, logically-addressed blocks, or logical blocks, that generally correspond to a logical block size, such as a 512K byte piece of information, associated with a native host file system, interface standard, or the like. Each logical block of received user data is addressed by a logical block address (LBA). For example, in some embodiments, the input logical block addressing corresponds to a Small Computer System Interface (SCSI) standard promulgated by the American National Standards Institute (ANSI).

The logically-addressed blocks of user data 1502 are combined into SUE addressable units, or hybrid mapping system (HMS) mapping blocks (HMBs). In some embodiments, an integral number of logical blocks 1504 are grouped to form a SUE addressable unit. For example, in FIG. 15, eight logical blocks are combined to form each SUE addressable unit. In alternative embodiments, any whole or fractional number of logical blocks may be combined to form a SUE addressable unit.

In an embodiment, the SUE addressable unit can be the minimum granularity of mapping for a system. In various embodiments, the SUE addressable unit size can include 4K bytes, 8K bytes, or any other suitable size or chunk of information.

In one embodiment, the storage system includes a set of volumes and each volume includes a set of SUE addressable units and each addressable unit includes a set of logical units. Different volumes can utilize different SUE addressable unit sizes. It is appreciated that a volume can have a number of characteristics. A volume can correspond to: an application, a single user level file system, a logical drive, a namespace (e.g., a collection of contiguous logical addresses associated with a given namespace), a LUN, and so on.

In the depicted example implementation: logically-addressed blocks 1531, 1532, 1533, 1534, 1535, 1536, 1537, and 1538 addressed by logical block addresses 1521, 1522, 1523, 1524, 1525, 1526, 1527, and 1528 are combined into SUE addressable unit 1503; logically-addressed blocks 1551, 1552, 1553, 1554, 1555, 1556, 1557, and 1558 addressed by logical block addresses 1541, 1542, 1543, 1544, 1555, 1546, 1547, and 1548 are combined into SUE addressable unit 1504; and logically-addressed blocks 1581, 1582, 1583, 1584, 1585, 1586, 1587, and 1588 addressed by logical block addresses 1571, 1572, 1573, 1574, 1575, 1576, 1577, and 1578 are combined into SUE addressable unit 1505. A logical block can span an addressable unit. There can be multiple blocks per addressable unit.

A data compression algorithm is optionally performed on the user data 1502 in the SUE addressable units (e.g., 1503, 1504, and 1505) to produce compressed SUE addressable units (e.g., 1507, 1508, and 1509). A header section (e.g., 1511, 1512, and 1513) is generated corresponding to each compressed SUE addressable unit (e.g., 1507, 1508, and 1509). The header section contains information, for example, for use in reclamation and data recovery activities.

The compressed SUE addressable units and header sections are placed in storage device transfer blocks, or SSD transfer blocks (STBs) 1515 and 1517. In the depicted example, header sections 1511, 1512, and 1513 and corresponding compressed SUE addressable units 1507, 1508, and 1509 are included in STBs 1515 and 1517. In an embodiment, compressed SUE addressable units, as well as enclosed logical blocks of user data, are allowed to span across two or more storage device transfer blocks.

An integral number of storage device transfer blocks are aligned to each SUE page 1591, 1592, 1593, and 1594 for transfer to a multimode storage device. In an embodiment, compressed SUE addressable units, as well as enclosed logical blocks of user data, are allowed to span across two or more SUE pages 1591, 1592, 1593, and 1594.

In an embodiment, error checking, such as error-correcting code (ECC), is not implemented with respect to the user data 1502 at the system level, but rather, error checking must be implemented by the individual multimode storage devices.

Metadata associated with the user data is stored in a logically-addressed system area of the multimode storage device (e.g., 350, 400, or 620). For example, in an embodiment, a partition of memory cells in the multimode storage device addressed using logical block addressing stores a map table that maps the SUE addressable units into the SUE address space. That is, the map table stores pointers, each of which points to an individual SUE addressable unit. Thus, the corresponding storage locations of the logical blocks of user data in the SUE address space can be determined using the mapping of the SUE addressable units and corresponding offsets of the logical blocks and SUE addressable units.

In one embodiment, information is stored in a volume (e.g., 671, 672, and 673). There can be multiple volumes or name spaces and different volumes or namespaces can be associated with different size SUE addressable units. It is also appreciated that different size volumes or namespaces can be associated with the same size SUE addressable units.

Figure 16:
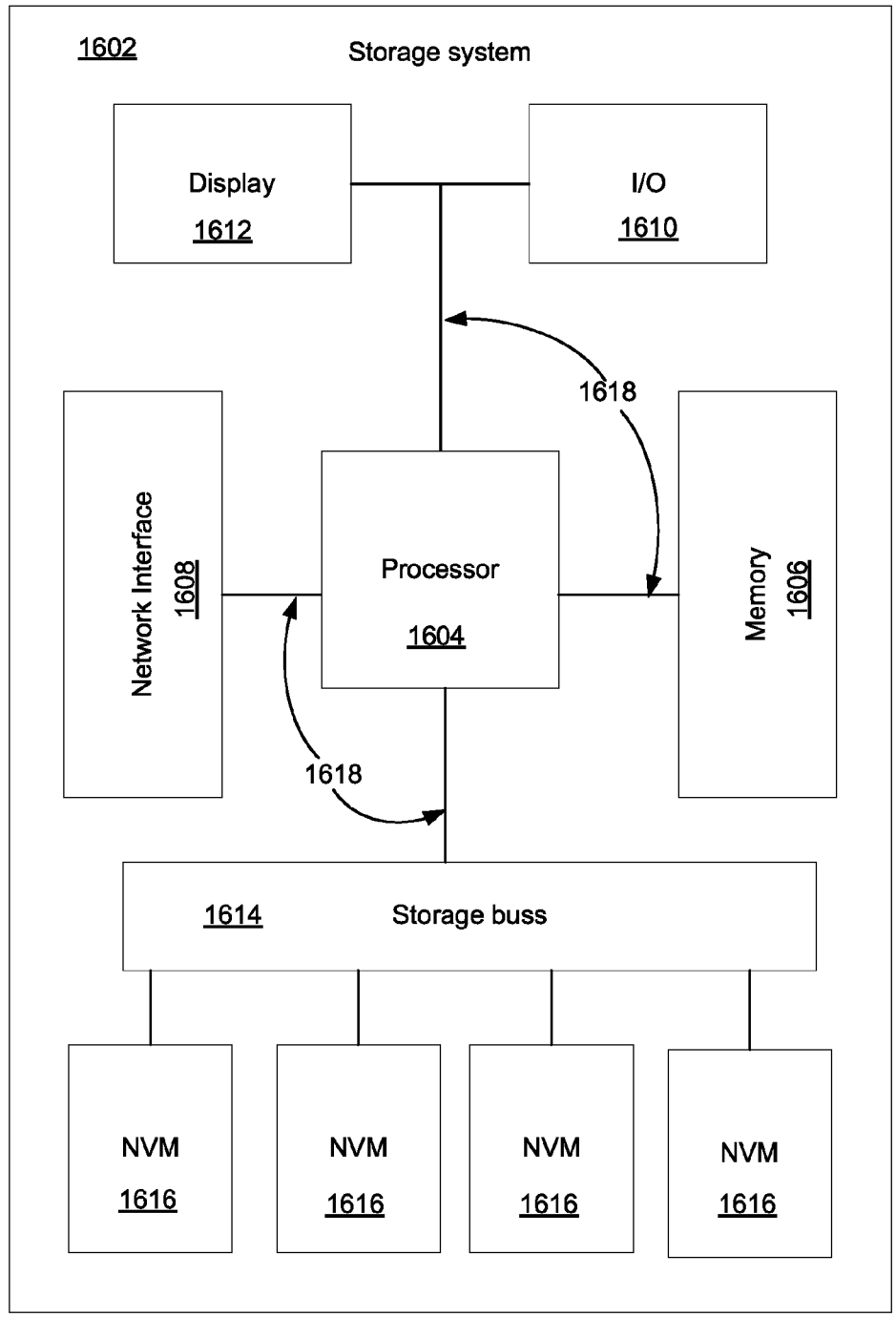
FIG. 16 is a schematic view depicting an exemplary storage system that can implement the SUE mapping scheme of FIG. 15.

As illustrated in FIG. 16, an exemplary storage system 1602 that can implement the SUE mapping scheme 1500 of FIG. 15 includes a processor 1604, a memory 1606, a network interface 1608, an input/output (I/O) device 1610, a display device 1612, a storage bus 1614 and multiple nonvolatile memory devices 1616. The various components of the storage device 1602 are coupled by local data links 1618, which in various embodiments incorporate, for example, an address bus, a data bus, a serial bus, a parallel bus, or any combination of these.

The processor 1604 may include any general or application-specific digital processor suitable for controlling a storage system. The memory 1606 may include any digital memory device suitable for storing data and instructions for access by the processor 1604. The network interface 1608 may include any networking interface suitable for communicatively connecting the storage system 1602 to a communications network, such as a local area network (LAN) or an internet protocol (IP) network. The network interface 1608 may implement a storage networking standard, for example, the Internet Small Computer System Interface (iSCSI) protocol.

The input/output device 1610 may include any suitable device for sending or receiving digital information to or from the storage system 1602. The display device 1612 may include any suitable device for displaying text or a graphical user interface (GUI). The storage bus 1614 may include, for example, a peripheral component interconnect express (PCIe) bus, or any other suitable high-speed serial expansion bus for communications in a storage system known in the art. The storage bus 1614 may utilize standard NVM Express (NVMe), or Non-Volatile Memory Host Controller Interface Specification (NVMHCI), commands to access storage devices in the storage system, such as the nonvolatile memory devices 1616. The nonvolatile memory devices 1616 may include, for example, NAND flash-based solid state drives (SSDs), or any other suitable nonvolatile memory device known in the art.

In an alternative embodiment, a general computing device implements the functions of the SUE mapping scheme 1500 of FIG. 15. For example, the general computing device may include a server, a work station, a personal computer, or the like.

Programming code, such as source code, object code or executable code, stored on a computer-readable medium, such as the nonvolatile memory devices 1616, can be loaded into the memory 1606 and executed by the processor 1604 in order to perform the functions of the SUE mapping scheme 1500 of FIG. 15. In alternative embodiments, executable instructions may be stored in firmware, or the functions may be performed by specialized hardware.

Figure 17:
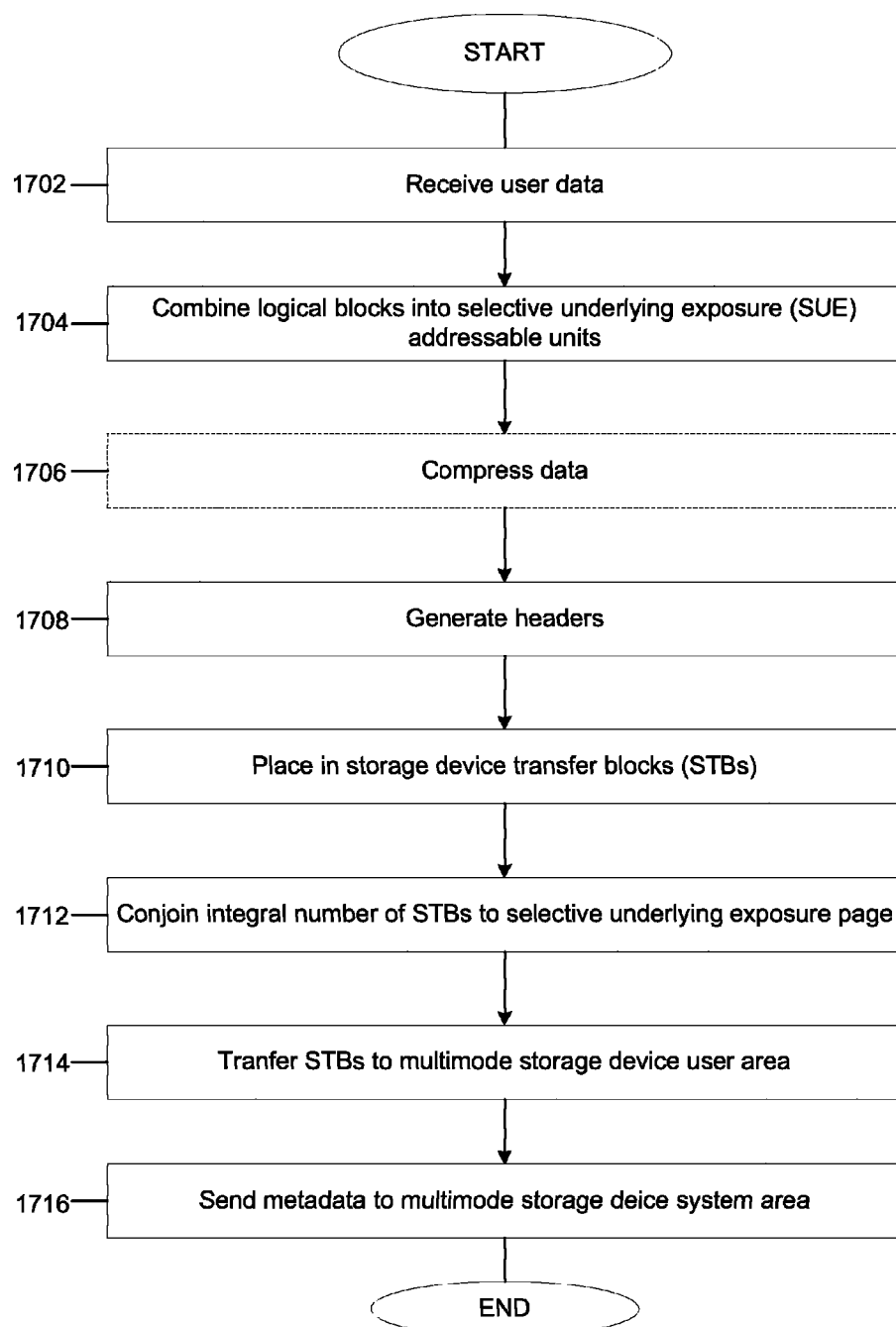
FIG. 17 is a flowchart representing an exemplary method of mapping a logical address space to a SUE address space in accordance with an embodiment of the present invention.

Referring now to FIG. 17, an exemplary process flow is illustrated that may be performed, for example, by the storage system 1602 of FIG. 16 to implement an embodiment of the SUE mapping scheme described in this disclosure for mapping a logical address space to a SUE address space in order to address the aggregate physical storage space of multiple storage devices in a storage system.

The process begins at block 1702, where user data is received, for example, from a host application or a virtual machine operating system. The received user data is organized in logical blocks and addressed by logical block addresses. The logical blocks correspond to a minimum addressable memory unit size associated with a native host file system, database, or the like.

In block 1704, as described above, the logical blocks are combined into SUE addressable units. For example, an integral number of logical blocks are grouped to form each SUE addressable unit. A data compression algorithm is optionally performed, in block 1706, on the user data in the SUE addressable units, as explained above. (Components shown with dashed lines in FIG. 17 are optional items.)

A header section is generated and added to each SUE addressable unit, in block 1708, including, for example, information for use in reclamation and data recovery activities, as described above. In block 1710, the compressed SUE addressable units and header sections are placed in storage device transfer blocks, as explained above.

As further explained above, in block 1712, an integral number of storage device transfer blocks are conjoined and aligned to a SUE page, and in block 1714 the storage transfer blocks corresponding to the SUE page are transferred to a multimode storage device to be stored in the user area. In block 1716, metadata regarding the user data in the SUE page is sent to the multimode storage device to be stored in the system area, as described above.

Multimode Storage Management System

Figure 18:
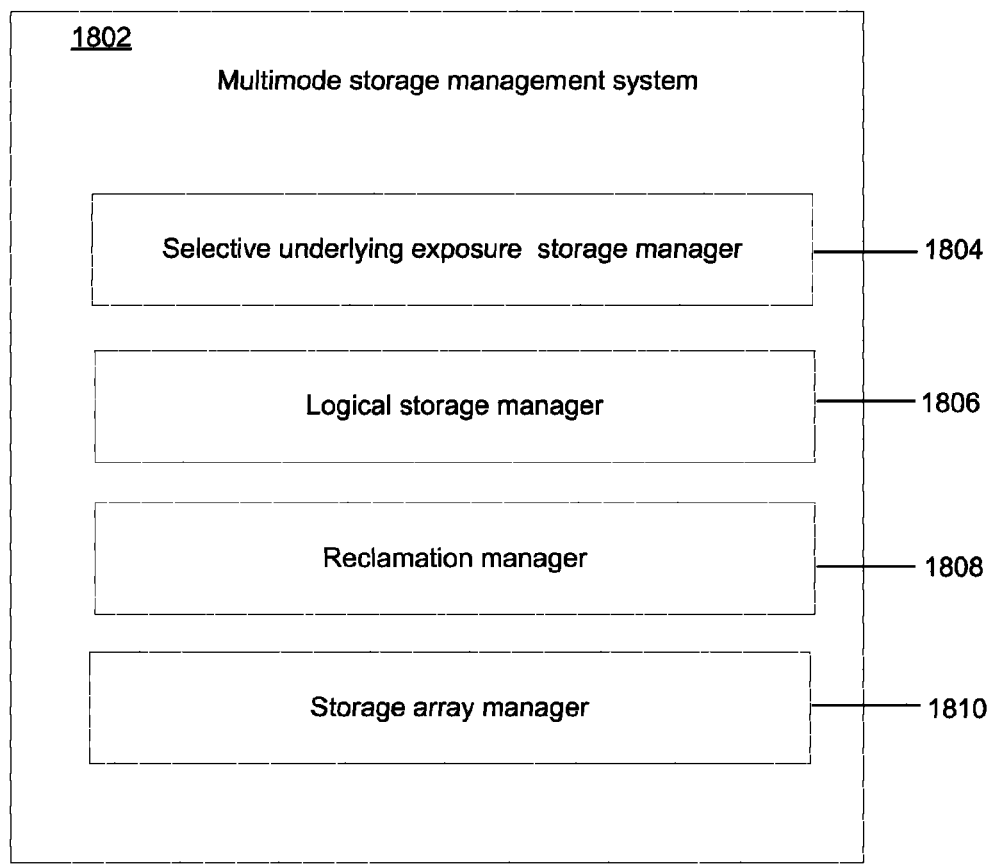
FIG. 18 is a schematic view illustrating an exemplary multimode storage management system that employs a SUE addressing scheme in order to allow a storage system to address logical and SUE storage spaces in a storage device in accordance with an embodiment of the present invention.

Another embodiment of the present invention is shown in FIG. 18, which illustrates an exemplary multimode storage management system 1802 that employs a SUE addressing scheme in order to allow a storage system to address logical and SUE storage spaces in a storage system, such as the storage system 1602 of FIG. 16. The multimode storage management system 1802 includes a SUE storage manager 1804, a logical storage manager 1806, a reclamation manager 1808, and a storage array manager 1810.

The SUE storage manager 1804 provides user data storage mapping, read and write functions. The SUE storage manager 1804 maps user data to a user area of a storage system using a SUE address mapping scheme. The SUE storage manager 1804 accesses user data stored in the user area through a SUE interface to the storage devices of the storage system.

The SUE mapping scheme distributes the logical block address-to-physical address mapping function between the storage system and the storage devices. That is to say, the SUE mapping scheme combines storage system-level mapping, or virtualization, from logical block addresses to SUE addresses with storage device-level mapping, or translation, from SUE addresses to physical addresses.

The SUE mapping scheme exposes certain physical features, or representative geometry, of the storage devices to the storage system, enabling certain nonvolatile memory management functions with regard to user data to be performed at the storage system level across multiple storage devices, rather than at the individual storage device level. This redistribution of user data management tasks from the individual storage device level to the storage system level can result in system efficiencies, including a reduced write amplification factor, permitting reduced resource provisioning and lowering costs.

The logical storage manager 1806 provides system data storage mapping, read and write functions. The logical storage manager 1806 maps system data to a system area of the storage device using a logical address mapping scheme, such as conventional logical block addressing (LBA) known in the art. The logical storage manager 1806 accesses system data stored in the system area through a logical interface to the storage device.

Thus, in an embodiment, the memory space of an associated storage device or each of multiple associated storage devices is subdivided, or partitioned, into separate storage areas, or address spaces, including a logically-addressed system area and a SUE address user area. The storage devices include two host interfaces, a logical host interface that provides access to the logically-addressed system area and a SUE host interface that provides access to the SUE address user area. Nonvolatile memory management functions with regard to system data are performed by the individual storage device controllers.

The reclamation manager 1808 provides nonvolatile memory management, including free space management and reclamation, or garbage collection, functions at the storage system level with regard to user data. Thus, the individual storage devices in the storage system do not perform local reclamation (garbage collection) for user data. The reclamation manager 1808 may implement conventional free space management and reclamation methods known in the art. In some embodiments, the reclamation manager 1808 also performs novel free space management and reclamation methods described in this disclosure.

The storage array manager 1810, or redundant array of independent disks (RAID) manager, provides storage management for an array of multiple storage devices in the storage system, including data recovery functions, with regard to user data. Thus, the individual storage devices in the storage system do not perform die-level RAID functions for user data. The storage array manager 1810 may implement conventional storage management and data recovery methods known in the art. In some embodiments, the storage array manager 1810 also performs novel storage management and data recovery methods described in this disclosure.

Figure 19:
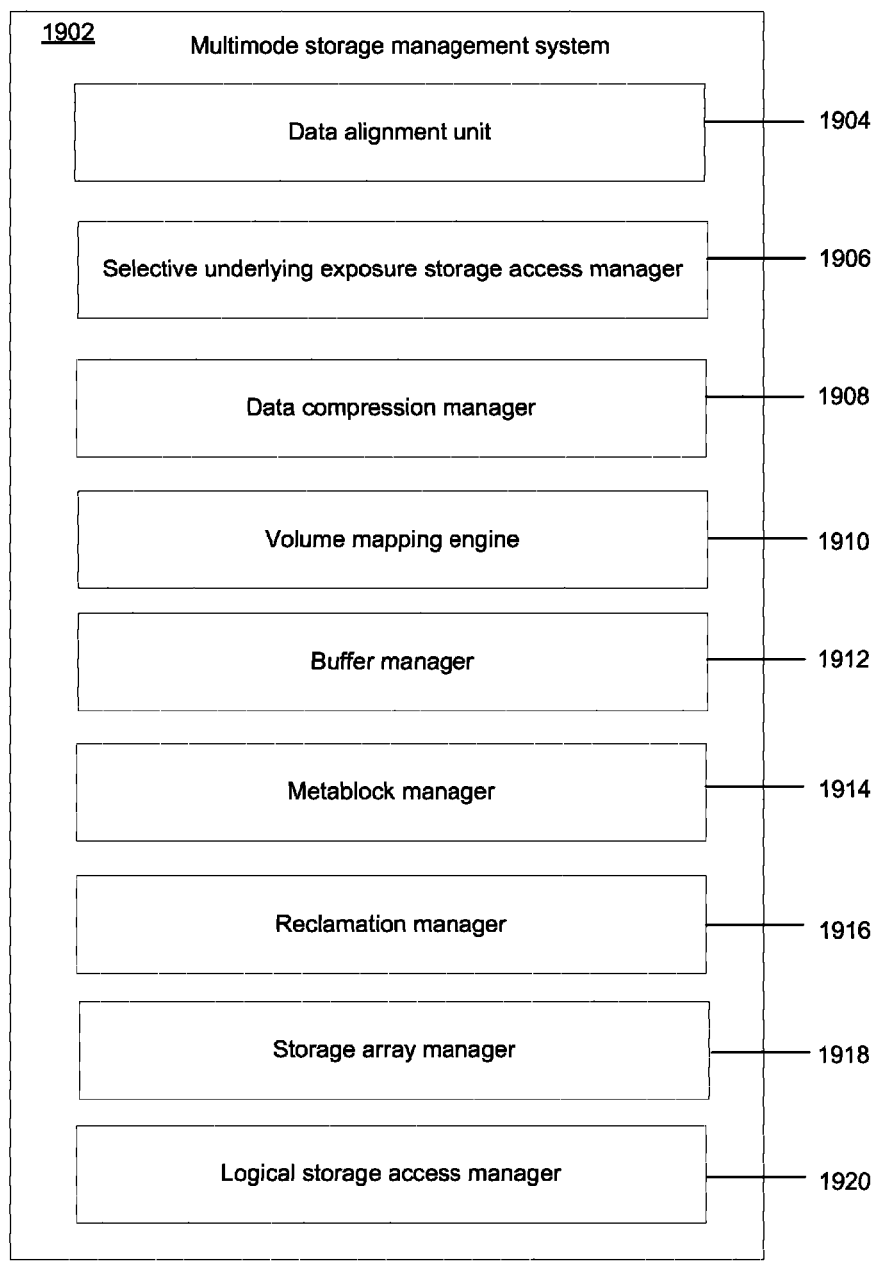
FIG. 19 is a schematic view illustrating another exemplary multimode storage management system that employs a SUE addressing scheme in order to allow a storage system to address logical and SUE storage spaces in a storage device in accordance with an embodiment of the present invention.

Referring now to FIG. 19, another exemplary multimode storage management system 1902 is illustrated that employs a SUE addressing scheme in order to allow a storage system to address logical and SUE storage spaces in a storage system, such as the storage system 1602 of FIG. 16. The multimode storage management system 1902 includes a data alignment unit (DAU) 1904, a SUE storage access manager 1906, a data compression manager 1908, a volume mapping engine 1910, a buffer manager 1912, a metablock manager 1914, a reclamation manager 1916, a storage array manager 1918 and a logical storage access manager 2020.

The data alignment unit (DAU) 1904 receives logically-addressed media access commands, for example, read, write and unmap commands from a Small Computer System Interface (SCSI) target. By convention, the commands utilize logical block addressing (LBA), an SCSI memory location abstraction standard based on a linear addressing scheme in which memory blocks are indicated by an integer index. In logical block addressing, a single-integer base address is used to identify the beginning of each logical block of data, and each linear base address is uniquely associated with a single logical block. Thus, logical block addressing hides, or masks, the specific details or features of the storage device from the operating system, file system, device drivers and host applications.

During write operations, the data alignment unit 1904 combines logical blocks of data received from the SCSI target into SUE mapping blocks. For example, in some embodiments, an integral number of logical blocks are grouped to form a SUE mapping block. The data compression manager 1908 optionally performs a data compression algorithm on the user data in the SUE mapping blocks.

During read operations, the data alignment unit 1904 receives a read command from the SCSI target and passes on a read request to the SUE storage access manager 1906. The data alignment unit 1904 receives the requested user data from the SUE storage access manager 1906 and passes the requested user data to the SCSI target.

The SUE storage access manager 1906 provides user data storage read and write functions. During write operations, the SUE storage access manager 1906 generates a header section for each SUE mapping block. The header section contains information, for example, for use in reclamation and data recovery activities. The SUE storage access manager 1906 places the compressed SUE mapping blocks, together with the corresponding header sections, in storage device transfer blocks. In an embodiment, compressed SUE mapping blocks, as well as enclosed logical blocks of user data, are allowed to span across two or more storage device transfer blocks.

The SUE storage access manager 1906 further aligns an integral number of storage device transfer blocks to a SUE page for transfer to a storage device. The SUE storage access manager 1906 transfers the storage device transfer blocks corresponding to the SUE page to a write buffer.

In an embodiment, compressed SUE mapping blocks, as well as enclosed logical blocks of user data, are allowed to span across two or more SUE pages. Each SUE page corresponds to an individual storage device of the storage system. The SUE page is the basic unit of storage programming, or write operations, in the SUE mapping scheme.

During read operations, the SUE storage access manager 1906 determines the location of the requested user data and requests that the requested user data be read from the associated storage device(s) to a read buffer. The SUE storage access manager 1906 transfers the user data from the read buffer to the data alignment unit 1904.

The data compression manager 1908 performs a compression algorithm on the user data as a subfunction of—or as a complementary function to—the SUE addressing scheme. The data compression function performed by the data compression manager 1908 can help offset inherent system factors that result in write amplification.

The volume mapping engine 1910 coordinates the SUE address mapping functions. The volume mapping engine 1910 maintains a user area map table that records the current location of user data. The user area map table includes mapping information that correlates logical block addresses to SUE addresses of stored user data. The user area map table is stored in the logically-addressed system area of the associated storage device(s).

During write operations, the volume mapping engine 1910 updates the user area map table with new or revised SUE address location(s) received from the SUE storage access manager 1906 with respect to the written user data.

During read operations, the volume mapping engine 1910 looks up the SUE address location(s) of the requested user data in the user area map table based on the requested logical block address(es) and provides the SUE address location(s) to the SUE storage access manager 1906.

The volume mapping engine 1910 organizes the user data into SUE pages, SUE blocks, metapages and metablocks. A SUE block maps to a number of physical blocks on an individual storage device. In an embodiment, each physical block that is mapped to the same SUE block is located on a separate die of the storage device. All of the physical blocks that are mapped to the same SUE block are erased and managed as a unit at the storage device level. Thus, a SUE block corresponds to a group of physical blocks that are jointly managed on respective dies with respect to reclamation and free space management. Equivalently, a group of respective physical blocks on dies corresponding to a SUE block are managed as a unit of storage media.

Each SUE block includes a number of SUE pages, each of which aligns to a physical page of a respective physical block that is mapped to the SUE block. Corresponding SUE pages of respective SUE blocks across all of the storage devices included in a storage system are mapped to a metapage. Similarly, corresponding SUE blocks across all of the storage devices included in a storage system are mapped to a metablock.

Storage media management functions at the multimode storage management system level, such as reclamation and free space management, are performed with respect to metablocks of user data. Thus, storage media management functions at the multimode storage management system level are performed with respect to groups of corresponding physical blocks that are jointly managed in each storage device included in a storage system.

Programming operations and read operations are performed with respect to metapages of user data. Thus, programming operations and read operations are performed with respect to groups of corresponding physical pages that are jointly managed in each nonvolatile memory device included in a storage system.

Thus, the storage devices in a storage system are virtualized in a manner that exposes significant organization, or representative geometry, of the physical storage to the multimode storage management system 1902. Groups of physical blocks that are jointly managed on respective dies in a single storage device are presented to the multimode storage management system 1902 as SUE blocks, and corresponding groups of physical blocks that are jointly managed on respective dies across all of the storage devices in the storage system are presented to the multimode storage management system 1902 as metablocks.

Similarly, groups of physical pages that are jointly programmed on respective dies in a single storage device are presented to the multimode storage management system 1902 as SUE pages, and groups of physical pages that are jointly programmed on respective dies across all of the storage devices in the storage system are presented to the multimode storage management system 1902 as metapages.

The buffer manager 1912 manages a pool of read and write buffers. During write operations, the buffer manager 1912 accumulates storage device transfer blocks received from the SUE storage access manager 1906 in write buffers until approximately a complete metapage of user data has accumulated before the user data is separately sent by way of the storage array manager 1918 to the individual storage devices as SUE pages.

During read operations, the buffer manager 1912 provides read buffers to support the read cache function. SUE pages of user data received in storage device transfer blocks from the storage array manager 1918 are saved in read buffers until being forwarded to the SUE storage access manager 1906.

The metablock manager 1914 keeps track of the current state of individual metablocks defined in the user area of the storage devices, for example, erased, active, closed, reclamation or erasing. The current states are stored in a metablock information table that is stored in memory and backed up in the system area of the storage devices. The metablock manager 1914 also keeps corresponding lists of metablocks currently in particular states, such as an erased list, a reclamation list and an erasing list. The metablock manager 1914 selects specific metablocks for submission to the SUE storage access manager 1906 for reclamation activities.

The reclamation manager 1916 services reclamation requests from the metablock manager 1914 to recover valid user data from designated metablocks and relocate the valid user data to other metablocks. The reclamation manager 1916 requests that the physical memory cells corresponding to the designated metablocks be erased and reclaimed to provide free space in the user area of the storage devices.

The storage array manager 1918 provides a SUE interface with the user area of the storage devices, as well as a logical interface with the system area of the storage devices. The storage array manager 1918 provides data protection functions, such as RAID striping and parity checks. For example, in an embodiment, storage device transfer blocks are used as RAID elements, and a RAID stripe includes storage device transfer blocks across all SUE pages in a metapage. Thus, should a single storage device in the storage system fail, the storage array manager 1918 is able to recover the data from the failed storage device using a reverse parity computation.

The logical storage access manager 1920 provides system data storage read and write functions using logical addressing methods known in the art. The logical storage access manager 1920 stores and retrieves metadata regarding the user data, including the user area map table, metablock information table, volume table, as well as storage system files, log files, and the like.

With regard to user data stored in the user area, the individual nonvolatile memory devices are responsible for certain memory media management functions, including read retry, failed-physical-block mapping, error-correcting code (ECC) and advanced incremental step pulse programming (ISPP). With regard to system data stored in the system area, the individual nonvolatile memory devices are responsible for all memory media management functions, including reclamation, wear-leveling, read and write caching, read retry, failed-physical-block mapping, error-correcting code (ECC) and advanced incremental step pulse programming (ISPP).

Figure 20:
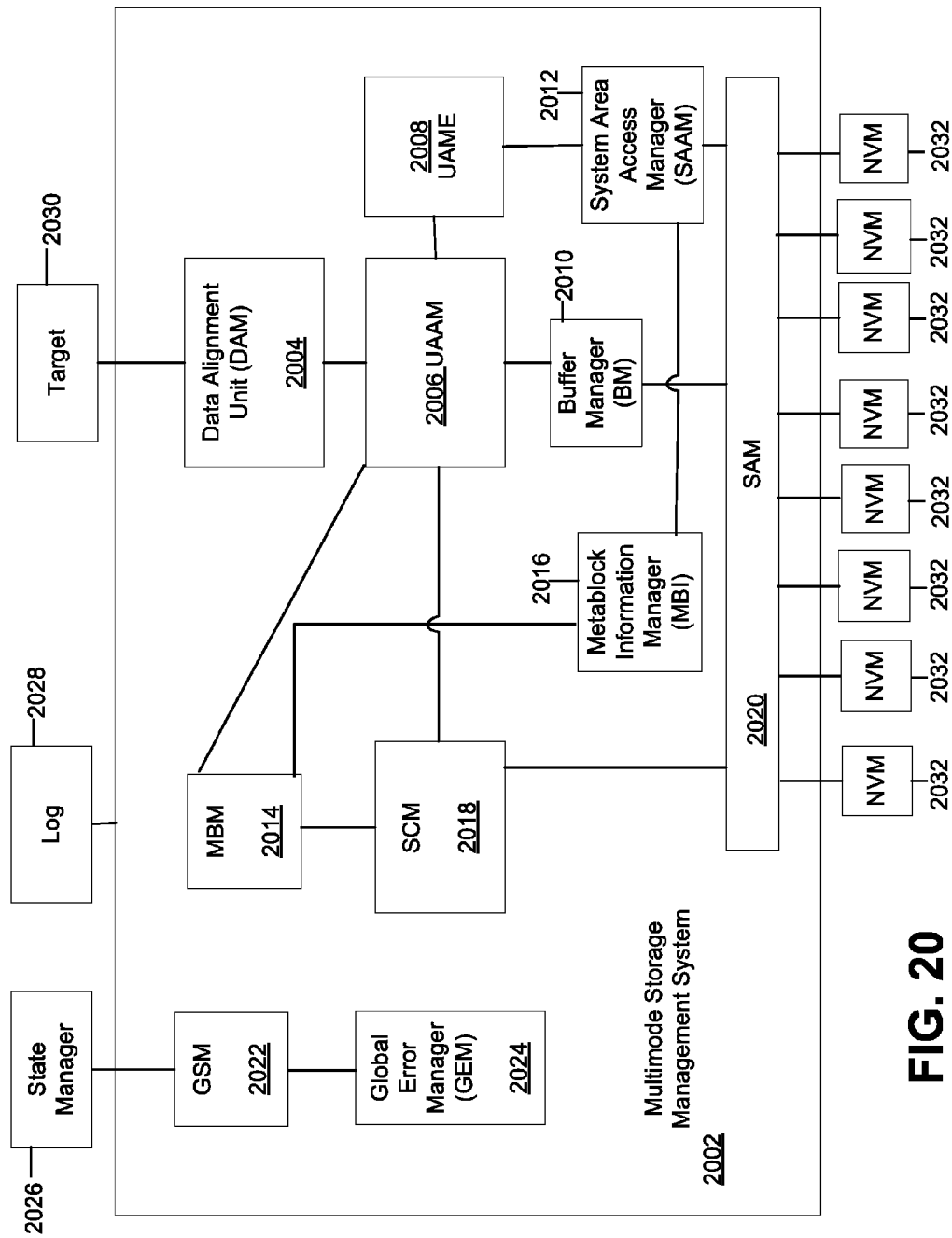
FIG. 20 is a schematic view illustrating yet another exemplary multimode storage management system that employs a SUE addressing scheme in order to allow a storage system to address logical and SUE storage spaces in a storage device in accordance with an embodiment of the present invention.

Referring now to FIG. 20, another exemplary multimode storage management system 2002, or hybrid mapping system (HMS), is illustrated that employs a SUE addressing scheme in order to allow a storage system to address logical and SUE storage spaces in a storage device. The multimode storage management system 2002 acts as a global flash translation layer (GFTL) responsible for nonvolatile memory media management with regard to a user area distributed across multiple storage devices in a storage system. The multimode storage management system 2002 performs nonvolatile memory media access functions, address mapping functions to map host application logical address space elements into SUE address space data structures that are aligned to physical nonvolatile memory locations, reclamation and wear-leveling functions.

The multimode storage management system 2002 includes a data alignment unit (DAU) 2004, a user area access manager (UAAM) 2006, a user area mapping engine (UAME) 2008, a buffer manager (BM) 2010, a system area access manager (SAAM) 2012, a metablock manager (MBM) 2014, a metablock information manager (MBI) 2016, a storage device control manager (SCM) 2018, a storage device access manager (SAM) 2020, a global state manager (GSM) 2022 and a global error manager (GEM) 2024.

The multimode storage management system 2002 is communicatively connected to a system state manager 2026, a system logging and statistics manager 2028, a target device 2030 and multiple nonvolatile memory (NVM) devices 2032.

The data alignment unit (DAU) 2004 receives logically-addressed media access commands, for example, read, write and unmap commands from target module 2030. The data alignment unit 2004 receives a logical block addressing (LBA) buffer list as input. During write operations, the data alignment unit 2004 combines logical blocks of data received from the target into SUE mapping blocks, or hybrid mapping blocks (HMBs). For example, in some embodiments, an integral number of logical blocks are grouped to form a SUE mapping block.

The data alignment unit 2004 consolidates both aligned and unaligned user data traffic arriving from the target module 2030, performing read/modify/write operations for non-aligned write traffic in order to align the data to the logical-to-physical mapping units (SUE mapping blocks). The data alignment unit 2004 places the user data into a SUE mapping block-aligned buffer list. In various embodiments, SUE mapping blocks may contain a fixed quantity of data, such as 4 KB, 8 KB, 16 KB, or the like.

During read operations, the data alignment unit 2004 receives a read command from the target module 2030 and passes on a read request to the user area access manager 2006. The data alignment unit 2004 receives the requested user data from the user area access manager 2006 and passes the requested user data to the target module 2030.

Figure 21:
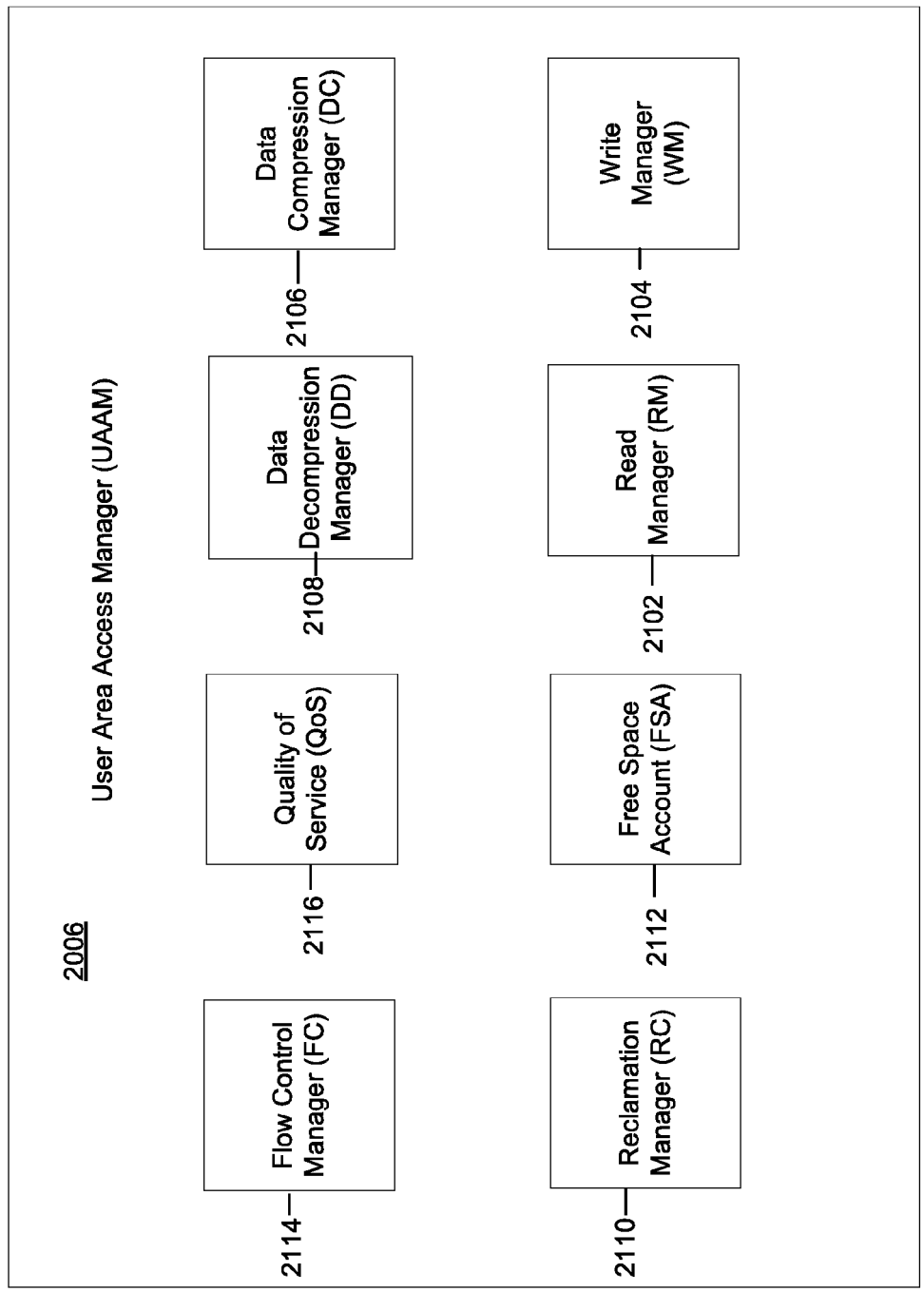
FIG. 21 is a schematic view illustrating a user area access manager (UAAM) that can be implemented by a multimode storage management system in accordance with an embodiment of the present invention.

Referring to FIG. 21, the user area access manager (UAAM) 2006 includes a read manager (RM) 2102, a write manager (WM) 2104, a data compression manager (DC) 2106, a data decompression manager (DD) 2108, a reclamation manager (RC) 2110, a free space account (FSA) 2112, a flow control manager (FC) 2114 and a quality of service manager (QoS) 2116.

The read manager (RM) 2102 receives read requests from the data alignment unit 2004 and services the read requests. The read manager 2102 requests relevant mapping information from the user area mapping engine (UAME) 2008. The read manager 2102 posts the read requests to the storage device access manager 2020. During read operations, the read manager 2102 requests the release of user data in the read buffers from the buffer manager 2010. The read manager 2102 posts decompression requests regarding read user data to the data decompression manager 2108.

The write manager (WM) 2104 receives write requests from the data alignment unit 2004. During write operations, the write manager 2104 generates metadata headers on the SUE mapping block stream, and generates mapping information for the user area mapping engine 2008 regarding the SUE addressing of user data. The write manager 2104 posts compression requests to the data compression data compression manager 2106 to schedule user data compression commands, and posts write requests to the storage device access manager 2020. The write manager 2104 requests the release of user data in the write buffers from the buffer manager 2010. When the current metablock of write data has become full, the write manager 2104 requests the metablock manager (MBM) 2014 to open a new active metablock.

The data compression manager (DC) 2106 receives data compression requests from the write manager 2104 and services the compression requests. In some embodiments, the data compression manager 2106 implements a data compression algorithm on the user data in the SUE mapping blocks. In other embodiments, the data compression manager 2106 schedules data compression tasks to an external compressing unit (not shown).

The data decompression manager (DD) 2108 receives data decompression requests from the read manager 2102 and services the decompression requests. In some embodiments, the data decompression manager 2108 implements a data decompression algorithm on the user data in the SUE mapping blocks. In other embodiments, the data decompression manager 2108 schedules data decompression tasks to an external decompressing unit (not shown).

The reclamation manager (RC) 2110 receives reclamation requests from the metablock manager 2014 and services the requests to recover valid data from designated metablocks to reclaim free space. The reclamation manager 2110 requests relevant mapping information from the user area mapping engine 2008 and posts read requests to the read manager 2102 regarding the designated metablocks. The reclamation manager 2110 parses metadata headers accompanying the SUE mapping blocks in the storage device read data stream and posts write requests to the write manager 2104 regarding all valid data remaining in the designated metablocks. The reclamation manager 2110 also services requests from the storage device control manager (SCM) 2018 to reclaim partial metablock data.

The free space account (FSA) 2112 receives mapping information from the write manager 2104 during write operations and generates free space information regarding stale user data in stored metablocks. The free space account 2112 posts free space information to the metablock information manager 2016 to update corresponding metablock information table entries.

The flow control manager (FC) 2114 monitors system resources, such as read/write buffers, compression buffers, storage bus and other queue depths, or the like. If system-level resource provisioning falls below preset limits, the flow control manager 2114 resets throttling-down levels in the quality of service manager 2116. In an embodiment, required provisioning levels can be established using system administrator commands. The flow control manager 2114 provides statistics for the system administrator, which can be used for interface level throttling.

The quality of service manager (QoS) 2116 defines quality of service policies based on system resource provisioning levels and latency measurements. The quality of service manager 2116 implements multiple queues to service different quality of service policy pools. With regard to latency-based policies, the quality of service manager 2116 implements timestamps on queue entries. The quality of service manager 2116 monitors various queue parameters and selects requests to ensure the policies are not violated. At the request of the flow control manager 2114, the quality of service manager 2116 throttles down traffic on provisioning-based policy queues.

Figure 22:
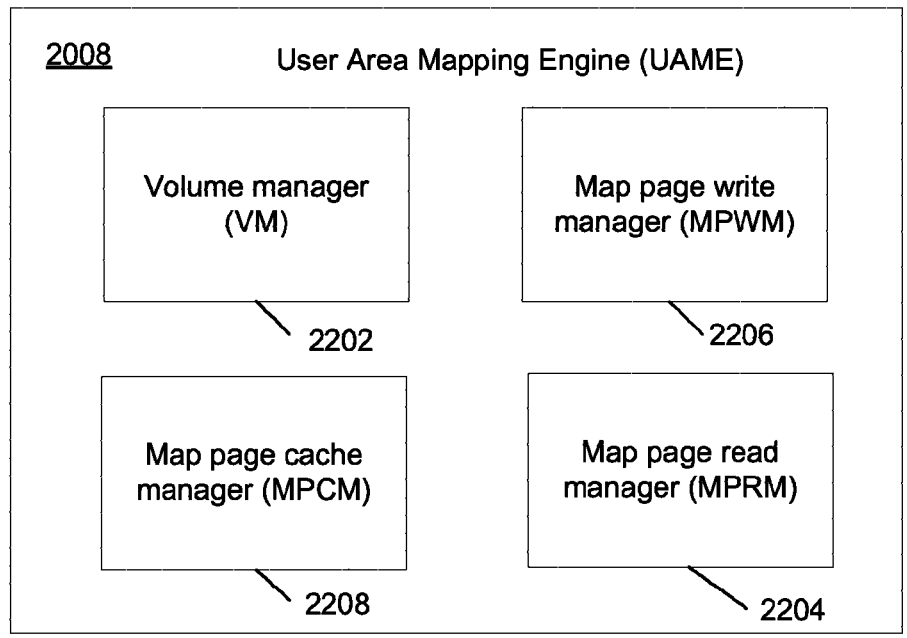
FIG. 22 is a schematic view illustrating a user area mapping engine (UAME) that can be implemented by a multimode storage management system in accordance with an embodiment of the present invention.

Referring to FIG. 22, the user area mapping engine (UAME) 2008 includes a volume manager (VM) 2202, a map page read manager (MPRM) 2204, a map page write manager (MPWM) 2206, and a map page cache manager (MPCM) 2208.

The volume manager (VM) 2202 provides services to create, destroy and manage volumes and handles multiple provisioning policies. The volume manager 2202 maintains relevant information in a volume table that is stored in memory and backed up in the system area, and provides access services to entries in the volume table. The volume manager 2202 uses the system area access manager 2012 to back up and restore the volume table.

The map page read manager (MPRM) 2204 receives and services requests from the map page cache manager 2208 for absent mapping pages when map page misses are detected by the map page cache manager 2208.

The map page write manager (MPWM) 2206 receives and services requests from the map page cache manager 2208 for mapping page evictions.

The map page cache manager (MPCM) 2208 services mapping entry information requests from the read manager 2102 and reclamation manager 2110, as well as mapping entry updates provided by the write manager 2104. When a map page miss is detected, the map page cache manager 2208 requests the absent mapping page from the map page read manager 2204. The map page cache manager 2208 requests mapping page evictions from the map page write manager 2206.

The buffer manager (BM) 2010 manages a pool of read and write buffers. During write operations, the buffer manager 2010 allocates and releases storage device transfer blocks to accumulate user data received from the write manager 2104 in write buffers. The buffer manager 2010 receives requests for the release of user data in the write buffers from the write manager 2104 when approximately a complete metapage of user data has accumulated, and forwards the user data to the storage device access manager 2020.

During read operations, the buffer manager 2010 allocates and releases storage device transfer blocks in read buffers to support the read cache function. SUE pages of user data received in storage device transfer blocks from the storage device access manager 2020 are initially saved in the read buffers. The buffer manager 2010 receives a request from the read manager 2102 for the release of user data in the read buffers, and the buffer manager 2010 forwards the storage device transfer blocks to the read manager 2102.

The system area access manager (SAAM) 2012 services requests regarding access to system data stored in the system area of the storage devices in the storage system. The system area access manager 2012 receives and services requests from the volume manager 2202 and the metablock information manager 2016 to back up and restore the volume table and the metablock information table, respectively. The system area access manager 2012 receives and services requests from the map page write manager 2206, the map page read manager 2204 and the map page cache manager 2008 to access the user area map table.

Figure 23:
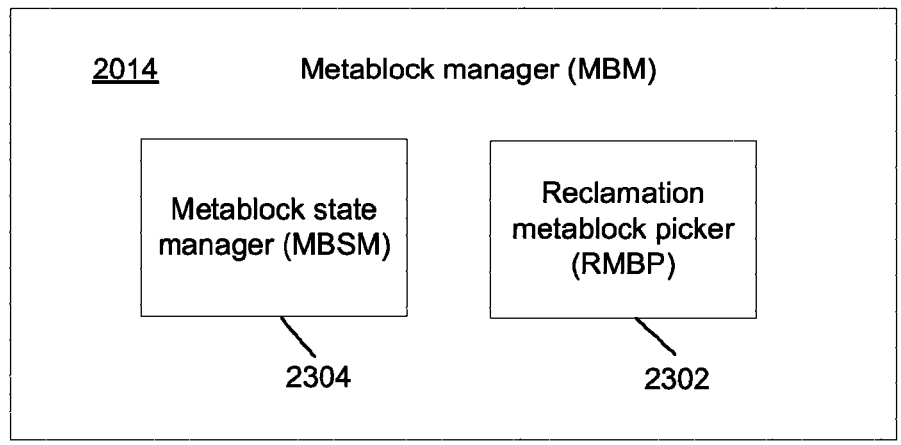
FIG. 23 is a schematic view illustrating a metablock manager (MBM) that can be implemented by a multimode storage management system in accordance with an embodiment of the present invention.

Referring to FIG. 23, the metablock manager 2014 includes a reclamation metablock picker (RCMBP) 2302 and a metablock state manager (MBSM) 2304. The reclamation metablock picker (RCMBP) 2302 monitors parameters regarding the user area metablocks, such as erase count, stale data level, dwell time, and the like. Based on the monitored parameters, the reclamation metablock picker 2302 selects metablocks for reclamation, or garbage collection. The reclamation metablock picker 2302 implements wear-leveling policies known in the art. For example, the reclamation metablock picker 2302 attempts to maintain metablock erase counts within a preferred value range, and attempts to segregate relatively dynamic (hot) and relatively static (cold) data in separate metablocks.

The metablock state manager (MBSM) 2304 tracks the current state of the user area metablocks, for example, active, closed, erasing, erased, reclamation or garbage collection. The metablock state manager 2304 transitions metablocks through the various states by updating the metablock information table. The metablock state manager 2304 also maintains various lists of metablocks in specific states, for example, an erased metablock list, a reclamation metablock list and an erasing metablock list. The metablock state manager 2304 monitors the erased metablock list to determine individual metablocks that are ready for reclamation (garbage collection).

The metablock information manager (MBI) 2016 maintains the metablock information table. The metablock information manager 2016 maintains the metablock information table and provides access services to entries in the metablock information table for other modules. The metablock information manager 2016 sends requests to the system area access manager 2012 to back up and restore the metablock information table.

Figure 24:
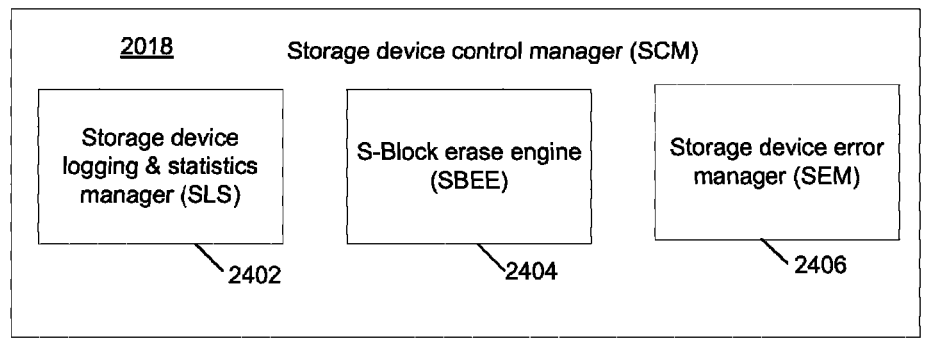
FIG. 24 is a schematic view illustrating a storage device control manager (SCM) that can be implemented by a multimode storage management system in accordance with an embodiment of the present invention.

Referring to FIG. 24, the storage device control manager (SCM) 2018, or solid state device (SSD) control manager (SCM), includes a storage device logging and statistics manager (SLS) 2402, a S-Block erase engine (SBEE) 2404 and a storage device error manager (SEM) 2406.

The storage device logging and statistics manager (SLS) 2402 maintains a log of storage device access history.

The S-Block erase engine (SBEE) 2404 receives erasure requests from the reclamation manager 2110 by way of the metablock manager 2014 and manages the erasure process. The S-Block erase engine 2404 sends S-Block erasure requests to the storage device access manager 2020.

The storage device error manager (SEM) 2406 sends requests to the reclamation manager 2110 to reclaim partial metablock data.

Figure 25:
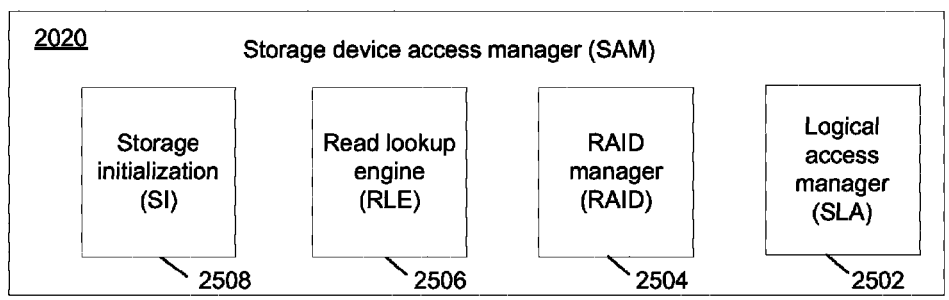
FIG. 25 is a schematic view illustrating a storage device access manager (SAM) that can be implemented by a multimode storage management system in accordance with an embodiment of the present invention.

Referring to FIG. 25, the storage device access manager (SAM) 2020 includes a logical access manager (SLA) 2502, a RAID manager (RAID) 2504, a read lookup engine (RLE) 2506 and a storage initialization manager (SI) 2508.

The logical access manager (SLA) 2502, or SSD logical access manager, provides access services with respect to system data in the system area of the storage devices. The logical access manager 2502 uses conventional logical block addressing as known in the art to address system data in the system area of the storage devices. The logical access manager 2502 utilizes standard NVM Express (NVMe), or Non-Volatile Memory Host Controller Interface Specification (NVMHCI), commands to access storage devices, or solid-state drives (SSDs), in the storage system.

The RAID manager (RAID) 2504 provides storage management for an array of multiple storage devices in the storage system, including data recovery functions, with regard to user data. Thus, the individual storage devices in the storage system do not perform die-level RAID functions for user data. The RAID manager 2504 may implement conventional storage management and data recovery methods known in the art. In some embodiments, the RAID manager 2504 also performs novel storage management and data recovery methods described in this disclosure.

The RAID manager 2504 provides a SUE interface with the user area of the storage devices, as well as a logical interface with the system area of the storage devices. The RAID manager 2504 provides data protection functions, such as RAID striping and parity checks. For example, in an embodiment, storage device transfer blocks are used as RAID elements, and a RAID stripe includes storage device transfer blocks across all SUE pages in a metapage. Thus, should a single storage device in the storage system should fail, the RAID manager 2504 is able to recover the data from the failed storage device using a reverse parity computation.

Figure 26:
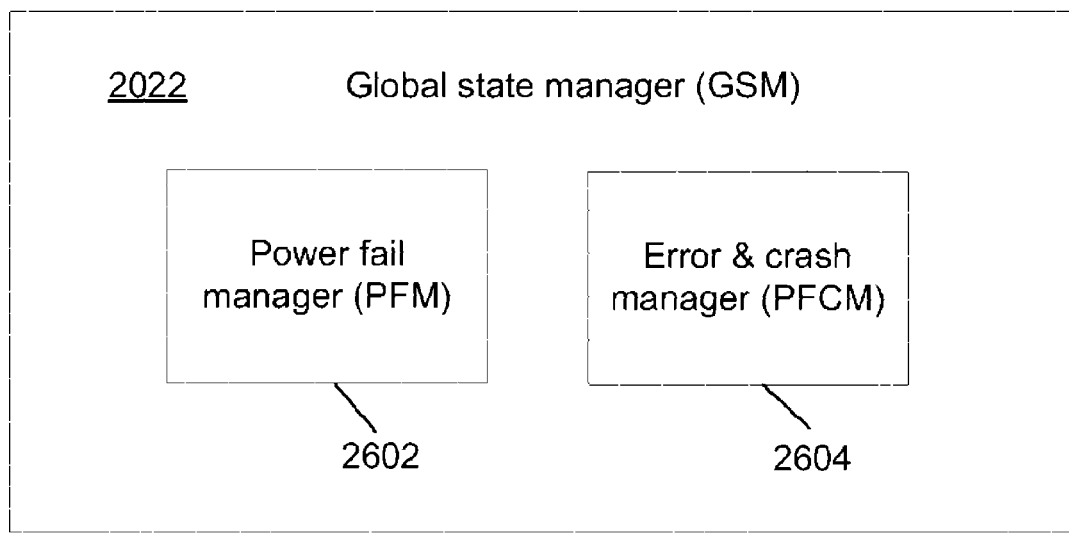
FIG. 26 is a schematic view illustrating a global state manager (GSM) that can be implemented by a multimode storage management system in accordance with an embodiment of the present invention.

Referring to FIG. 26, a global state manager (GSM) 2022 includes a power fail manager (PFM) 2602 and an error and crash manager (PFCM) 2604.

The functions of the multimode storage management systems 1802, 1902, and 2002 of FIGS. 18, 19, and 20 can be implemented by the storage system 1602 of FIG. 16. In alternative embodiments, the functions of the multimode storage management systems 1802, 1902, and 2002 may be implemented by a general computing device or by specialized hardware. The presented multimode approaches include variety of features and characteristics that facilitate effective and efficient storage of information. The features and characteristics can be leveraged to improve many different aspects of performance. In one embodiment, the flexibility of the described partitioning approaches allows realization of relatively fast speed and manageable complexity. The relatively large amounts of user data are stored in a SUE address space that enables very fast storage and management operations for the user data. While the relatively small amounts of metadata are stored in a logically addressed area allowing the system to leverage the abstraction nature of the metadata utilized for complexity reduction. In addition, the flexibility of increasing the over provisioning of the relatively smaller metadata region gives a much larger percentage over provisioning impact that helps speed up the metadata storage operations and compensate for the complexity reduction speed impact that would otherwise occur. This allows better overall allocation and comparative impact of over-provisioning resources. The flexibility can also facilitate improved life cycle preservation by allowing different storage regions of blocks to be re-assigned or re-allocated between the two partitions. The nature of the data stored in a region may mean it is written/erased less than another region (e.g., most of the metadata does not change much compared to the user data) and a physical block in one partition can be re-assigned to another partition to even out wear and tear on a particular region. The flexibility also allows power cycling improvement by moving the power cycling responsibility up to the system level.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, or process, is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

Distributed

It is appreciated that the presented multimode approach can be implemented in distributed architectures. A distributed architecture can include various attributes. The distributed architecture can be linearly scalable to a number of appliances or systems without being limited to a single thread of execution or having a single bottleneck. The architecture can be implemented with little or no degradation compared to non-distributed architectures as the multimode storage management system can continue to operate at the SUE address block level across multiple storage nodes.

Figure 27:
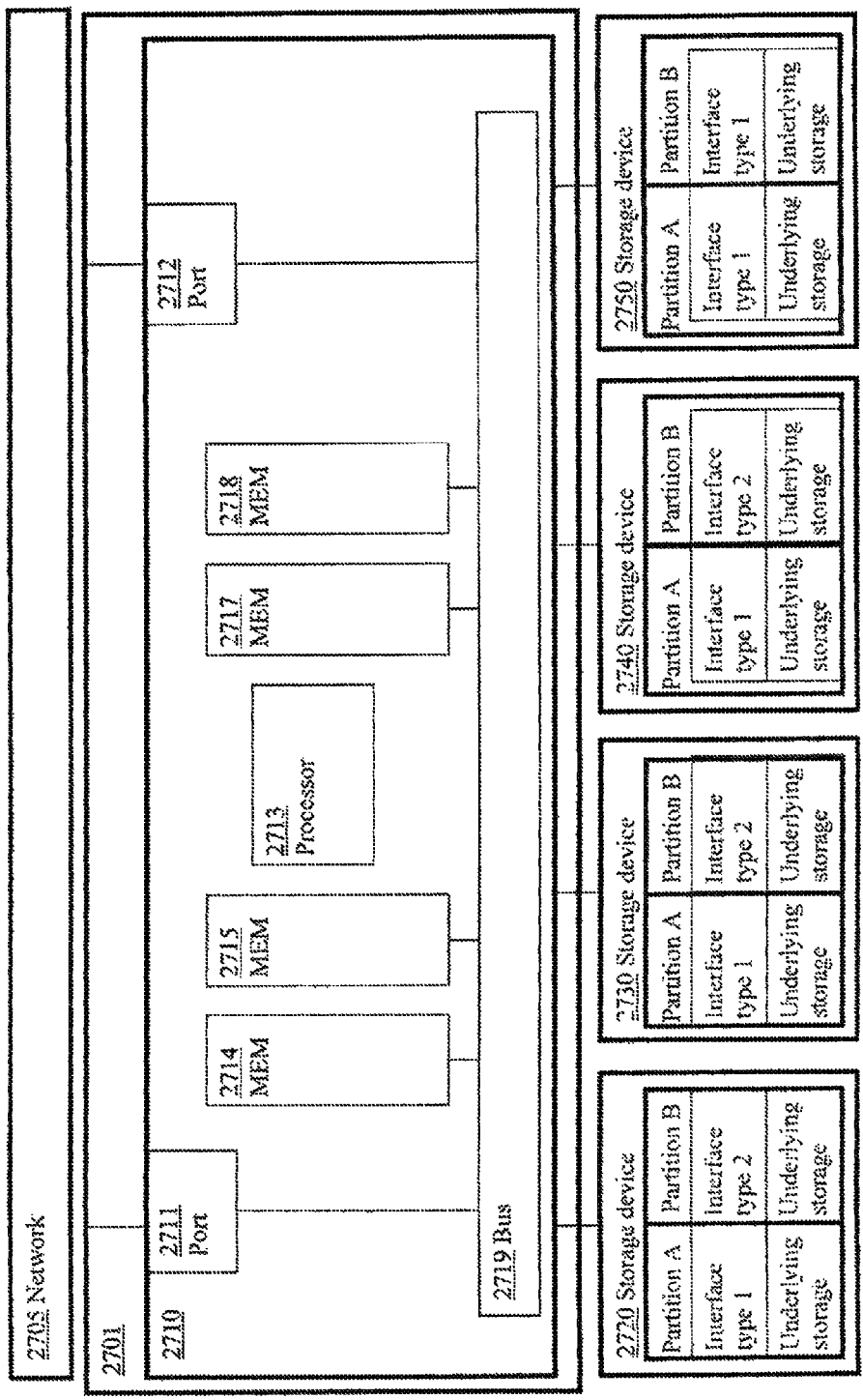
FIG. 27 is a block diagram of an exemplary appliance coupled to a network in accordance with one embodiment

FIG. 27 is a block diagram of an exemplary appliance 2701 coupled to network 2705 in accordance with one embodiment. It is appreciated that network 2705 can be coupled to other devices or appliances (not shown). In one exemplary implementation, appliance 2701 is similar to system 600. The appliance or system 2701 includes multimode storage management system 2710 and storage devices 2720, 2730, 2740 and 2750. Multimode storage management system 2710 includes processor 2713, memories 2714, 2715, 2717, and 2718, bus 2719, and ports 2711 and 2712. Bus 2719 can be a PCI bus and ports 2711 and 2712 can be dual 25G Ethernet ports. Processor 2713 can be 4 or 6 core Intel Xeon and the memories can be 64 GB of RAM. In one embodiment there is no need for a PCIe bridge chip (which can lead to reduced cost and power consumption compared to approaches with a PCIe bridge chip). The storage devices can be multimode SSDs. It is appreciated there can be a variety of characteristics of a distributed system (e.g., the 4 devices or multimode SSDs can operate in a 200 W power envelop, there can be leveraging of over-provisioning OCP for cost, and there can be unique hardware (HW) on a single PCIe adaptor). In one exemplary implementation, a PCIe bridge chip is eliminated saving on cost and power consumption.

Figure 28:
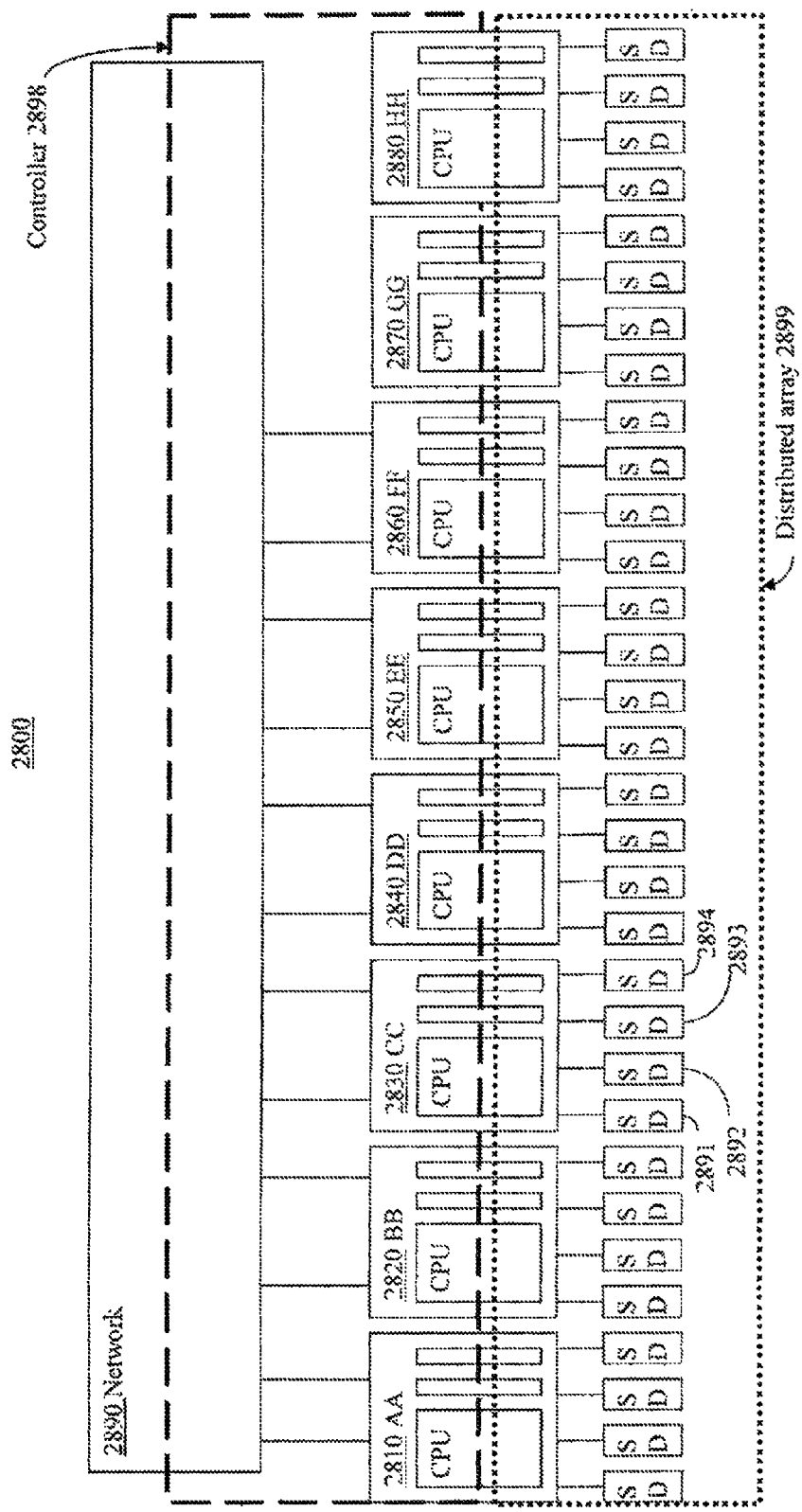
FIG. 28 is a block diagram of a distributed system in accordance with one embodiment.

FIG. 28 is a block diagram of a distributed system 2800 in accordance with one embodiment. Distributed system 2800 includes network 2890 and appliances 2810 AA, 2820 BB, 2830CC, 2840 DD, 2850 EE, 2860 FF, 2870 GG, and 2880 HH. Each appliance 2810 AA, 2820 BB, 2830 CC, 2840 DD, 2850 EE, 2860 FF, 2870 GG, and 2880 HH includes a Multimode storage management system and multiple storage devices (e.g., 2891, 2892, 2893, and 2894). In one exemplary implementation the appliances 2810 AA, 2820 BB, 2830 CC, 2840 DD, 2850 EE, 2860 FF, 2870 GG, and 2880 HH are similar to appliance 2701.

Figure 29:
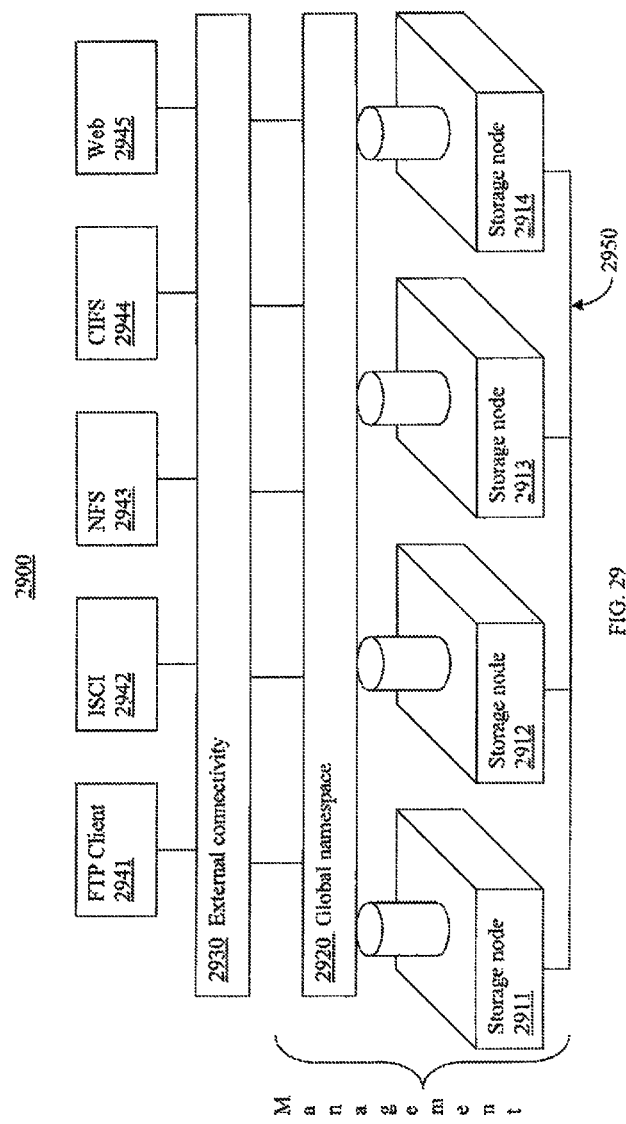
FIG. 29 is a block diagram of a distributed system in accordance with one embodiment.

FIG. 29 is a block diagram of a distributed system 2900 in accordance with one embodiment. Distributed system 2900 includes multiple storage nodes 2911, 2912, 2913, and 2914 that include a global namespace 2920. The multiple storage nodes are coupled to external connectivity mechanism 2930 which is in turn coupled to a plurality of external components including FTP client 2941, ISCI component 2942, NFS component 2943, CIFS component 2944 and Web component 2945. The multiple storage nodes 2911, 2912, 2913, and 2914 are also coupled via node to node connectivity mechanism 2950. The multiple storage nodes 2911, 2912, 2913, and 2914 can store information related to the plurality of external components including FTP client 2941, ISCI component 2942, NFS component 2943, CIFS component 2944 and Web component 2945.

It is appreciated that the selective underlying exposure approach described above with respect to a single appliance or system can be expanded for utilization with multiple distributed appliances or systems. The logically addressed blocks can be associated with selective underlying exposure (SUE) addressable blocks or units. The SUE addressable units can be compressed and associated with a header, and are then arranged in device transfer blocks (STBs). The associations can be similar to those depicted in FIG. 15. However, in a distributed approach the distributed SUE Metablock (DSUE metablock) is information associated with a plurality of physical blocks, wherein no more than one of the plurality of physical blocks is located in a single storage device and there is a first one of the plurality of physical blocks located in a storage device associated with a first appliance or node and a second one of the plurality of physical blocks located in a storage device associated with a second appliance or node. In one exemplary implementation, a DSUE-metablock includes information stored in one physical flash block per SSD and the information storage spans all of the drives and all of the nodes.

During normal operation, there is a primary block owner and as many redundant block owners as needed. The concept of a primary block owner and redundant block owner(s) can be used in multiple design elements. The primary block owner can be a node that is responsible for a given SUE metablock life cycle and free space accounting. A redundant block owner is a node that is responsible for a redundant copy of free space accounting information for a given SUE metablock. A redundant block can be promoted or changed to a primary block owner upon node failure of a prior primary block owner. A primary map owner is an owner of mapping information for a given logical address. A secondary map owner is an owner of redundant mapping formation.

Figure 30:
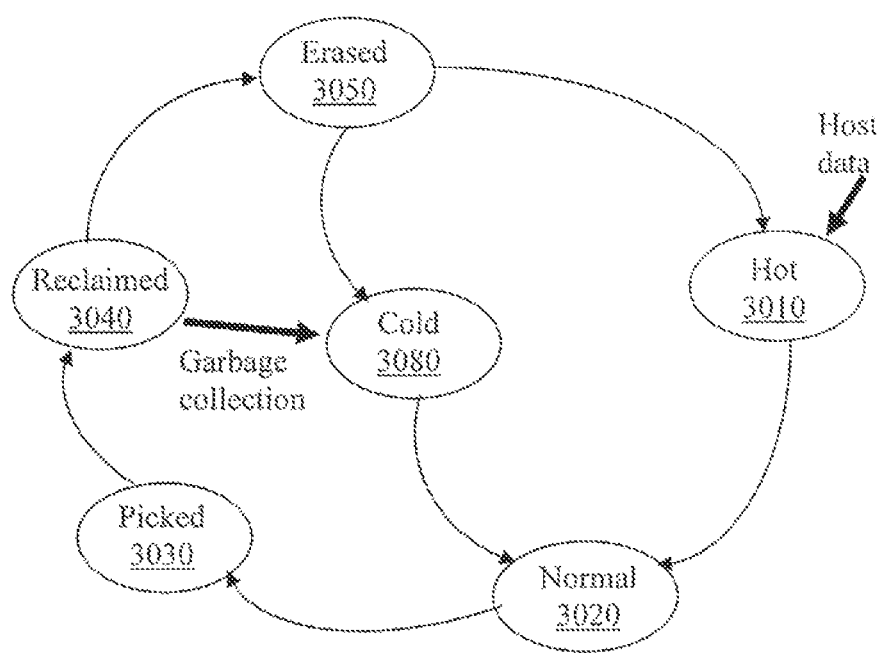
FIG. 30 is a flow chart of a block life cycle in accordance with one embodiment.

FIG. 30 is a flow chart of a block life cycle in accordance with one embodiment. Block 3010 is a hot block which is one of a plurality of blocks where incoming host data is written to. Block 3020 is one of a plurality of normal blocks that are inactive in the system where host data resides. In one exemplary implementation, most of the host data resides in the normal blocks and the normal blocks make up most of the blocks in the system. Block 3030 is one of a plurality of an ordered list of blocks selected by a block picking mechanism to be reclaimed (e.g., as part of garbage collection). These blocks can be selected based upon having the most amount of free space. Block 3040 is a reclamation block that is involved in a process of moving valid data from a picked block to a cold block. Cold block 3080 is one of a plurality of blocks that valid data from a reclamation block is written to. Erased block 3050 is a block in an ordered list of a plurality of blocks to be erased after valid data is transferred to cold block 3080.

In one embodiment, space allocation for a given open block is allocated by a single thread on a single appliance or system. In one exemplary implementation, for a single block there is one block per node designated as hot and one block per node designated as cold. The primary block owner delegates allocation to the block user and the allocator for a given block is the block user. The allocation itself can be single threaded and handling of messages can be parallelized. If a primary block owner fails, a block is considered closed and no further writes occur to the block until reclamation is performed (e.g., garbage collection).

In one embodiment, the concept of a primary block owner (a block that manages block life cycle and free space accounting) is separated from the space allocator. Thus, the metablocks can be made smaller and more numerous. The metablocks can still span multiple drives and appliances or nodes, they are just broken into smaller chunks. In one exemplary implementation, instead of 2K blocks there are 2K*N' blocks (where N'=N rounded up to the nearest power of 2 or 1<<log 2(N−1)+1). A node can perform allocation from its "own" hot and cold block. The data itself can still be spread across multiple nodes. Parity data is written to the node itself. If redundancy is greater than 1, additional redundancy calculations regarding separate nodes can be performed.

Figure 31:
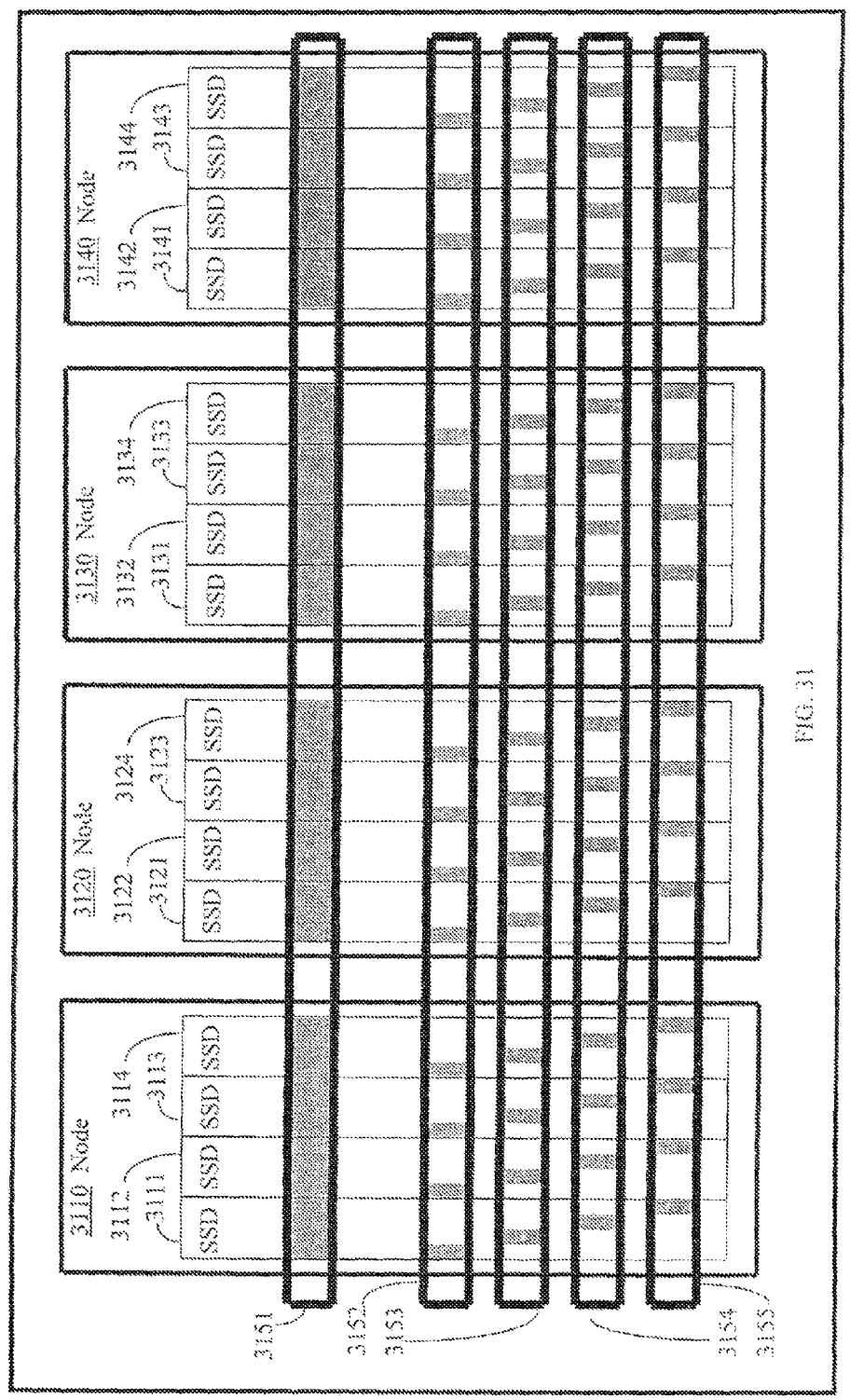
FIG. 31 is a block diagram of a distributed system metablock in accordance with one embodiment.

FIG. 31 is a block diagram of a distributed system metablock in accordance with one embodiment. The distributed selective underlying exposure (DSUE) metablock can be implemented in a 4 node system and the original SUE metablock definition is subdivided into 4 new blocks that form a DSUE metablock. For example, there can be 4 nodes 3110, 3120, 3130, and 3140. Node 3110 includes SSDs 3111, 3112, 3113, and 3114. Node 3120 includes SSDs 3121, 3122, 3123, and 3124. Node 3130 includes SSDs 3131, 3132, 3133, and 3134. Node 3140 includes SSDs 3141, 3142, 3143, and 3144. The original SUE metablock definition 3151 is subdivided into 4 new blocks (3152, 3153, 3154, and 3155) that form a DSUE metablock. When nodes are added or deleted such that a power of 2 is crossed, new blocks created will adopt the new size. Block picking will be based on percent full.

The mapping data can be logically distributed across multiple appliances or systems redundantly. Each appliance or system manages some portion of mapping data redundantly. The appliance or system can calculate primary and redundant owners of mapping data. A hash can be used to calculate primary and redundant owners of mapping data. For reads these appliances or systems can be queried for map information. For writes these appliances or systems can journal map updates and eventually write map data.

The multimode approaches can be implemented in a variety of RAID versions. The RAID calculations can use Reed Solomon (RS) erasure coding for protection of data. The RS encoding calculations can be performed by the block owner. In one exemplary implementation, a failure fallback can be utilized (as loss of a primary appliance or system does not result in data loss). A redundant calculation can be used if more than one symbol is to be corrected (e.g., RAID 6).

In one embodiment, a failure unit is considered to be a single storage node and failure of the single node does not bring down an appliance or system. The distributed architecture can also deal with blast radius issues. Blast radius involves the issue of how many appliances or systems are affected by the failure of a single element (e.g., in a data center, facility, network). Blast radius in data centers can be considered analogous to an enterprise high availability (HA) problem. Even though it is possible to handle failures through replication and other techniques, the concept of impact among elements is still important with respect to availability issues. In distributed appliance or system approaches workload can be shared across N appliances or systems to allow M failures, giving N-M capacity. Typically on less customized hardware, redundancy is at a higher hierarchical or architectural level instead of a lower level.

In distributed appliance or system approaches, free space management can be more complicated than non-distributed approaches. In one embodiment, free space accounting occurs at the SUE address block level. The physical blocks are allocated between the appliances or systems. Each appliance or system tracks free space for "F" blocks. In one embodiment, the free space tracking or accounting can be expressed by the relationship: F free space blocks per appliance or system are equal to N physical blocks times M redundancy blocks divided by N appliances or systems. For specific configurations, more exact appliance or system tracking free space for a given block can be calculated by any appliance or system in the array.

The distributed appliance or system approach can also support various reclamation activities (e.g., garbage collection). Reclamation is initiated by the primary block owner, but managed by the block user. Reclamation can begin after a block is allocated to a cold band for a given block user. A block user triggers distributed block picking. Blocks can be allocated block picking scores based upon various criteria (e.g., valid space, invalid space). Each appliance or system calculates block picking scores for blocks within their range (the blocks that they are tracking free space for). Blocks are selected based upon the block picking scores and an indication of the selected blocks are returned to the primary block owner which then makes another overall block selection for reclamation. In one example, blocks with the best block picking scores are returned to the primary block owner and an overall best block is selected for reclamation or garbage collecting. An indication of the selected block is communicated to the appliances or systems, which then begin their reclamation for their physical segment of a superblock (can be similar to non-distributed multimode storage management system). Each appliance or system performs a physical scan, a lookup to determine if it is valid, sends an allocation request to the primary block owner, sends data to the appropriated node, and sends a map update to an appropriate node. Each appliance or system is able to throttle itself between host and reclamation data.

In one embodiment, there are two picked blocks. One block is in the reclamation process and one block is ready for the reclamation process. Each node will sequentialize the picked block for reclamation but will allocate space in their own cold blocks. There may be optimization available to maintain data sequentially on both request and response. There can be other filters possible such as data aging, volume/logical grouping, snapshot grouping, etc.

Figure 32:
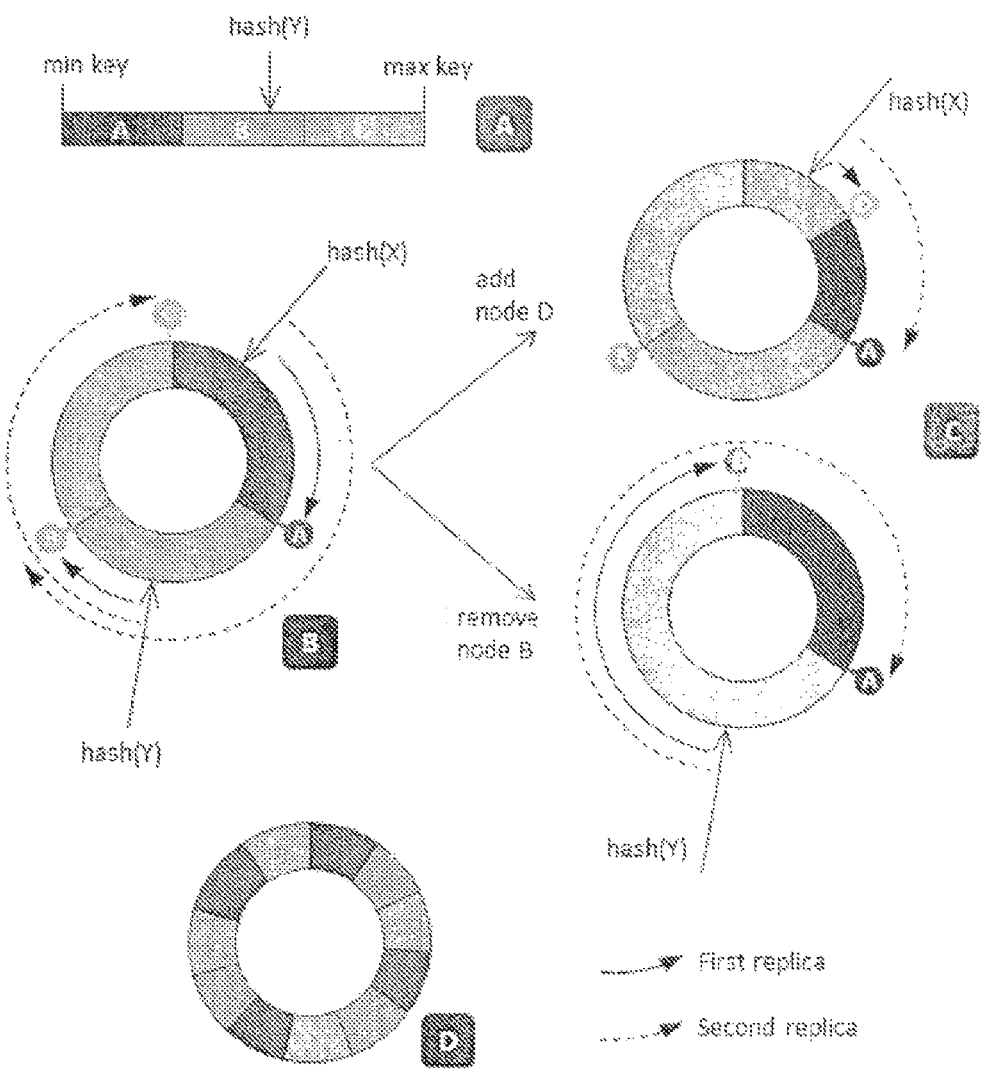
FIG. 32 is a block diagram of consistent hash utilization in adding and removing nodes in accordance with one embodiment.

In a write process, a write command can arrive at any appliance or system. That appliance or system becomes the orchestrator for the command through its entire flow. A correct node for a given piece of data can be identified using consistent hashing. In one exemplary implementation, the solution has an improved property that only 1/n keys are moved for an addition or deletion. FIG. 32 is a block diagram of consistent hash utilized in adding and removing nodes in accordance with one embodiment. The physical free space accounting can be evenly distributed across multiple appliances or systems with a redundant copy on random different systems via consistent hashing. Mapping of logical address space can be evenly distributed across multiple appliances or systems with redundant copy on random different systems via consistent hashing.

Figure 33:
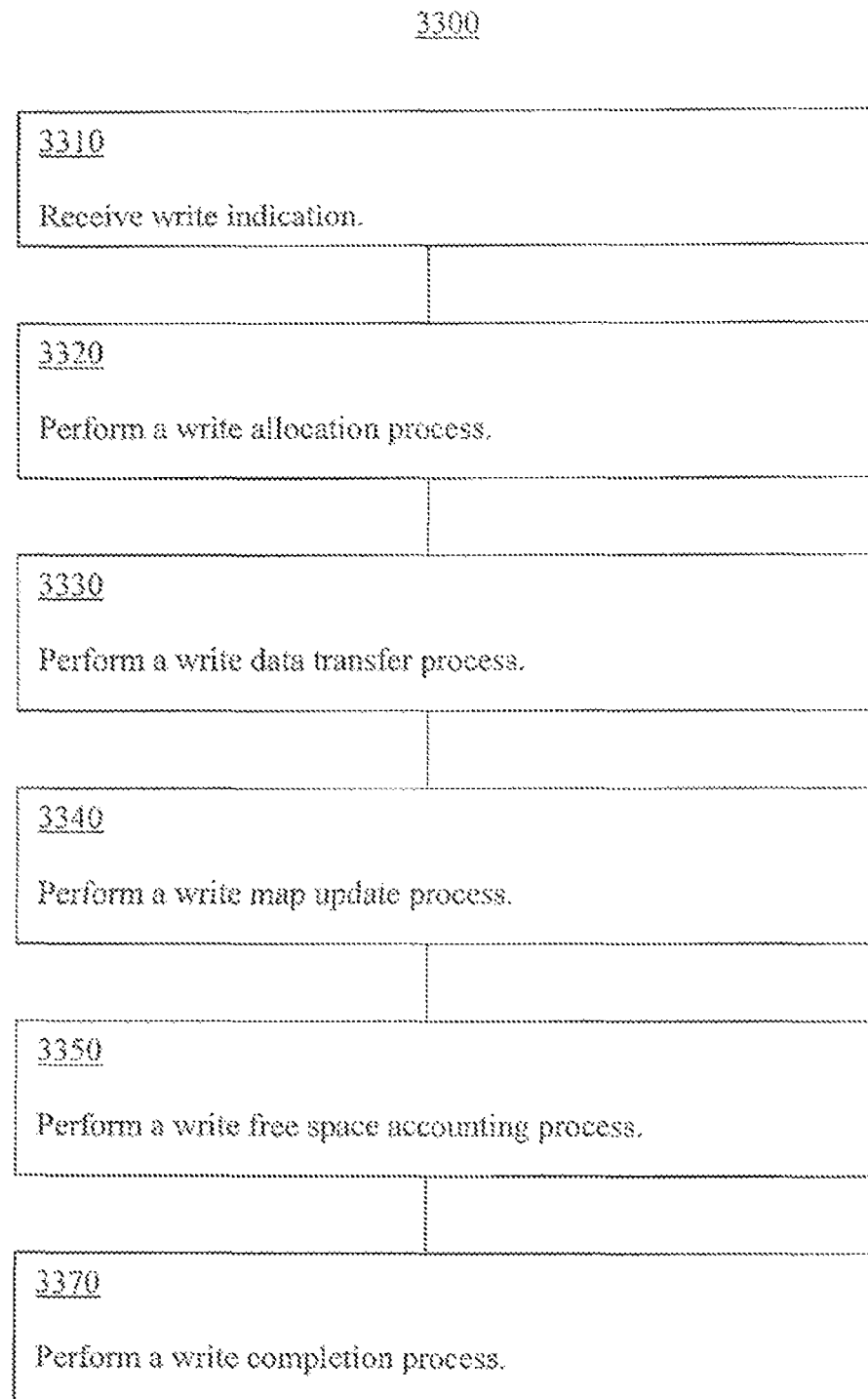
FIG. 33 is a flow chart of an exemplary write process in accordance with one embodiment.

FIG. 33 is a flow chart of an exemplary write process 3300 in accordance with one embodiment. In block 3310, a write indication is received. The write indication can come from a host and the appliance can compress the data. In block 3320, a write allocation is process is performed. In block 3330, a write data transfer process is performed. In block 3340, a write map update process is performed. In block 3350, a write free space accounting process is performed. In block 3370, a write completion process is performed.

FIG. 34 is a flow chart of an exemplary write allocation process 3400 in accordance with one embodiment. In block 3410 a first appliance requests allocation in an open hot block. In block 3420 a second appliance performs allocation process. In block 3430 a first appliance receives allocation information from the second appliance.

Figure 35:
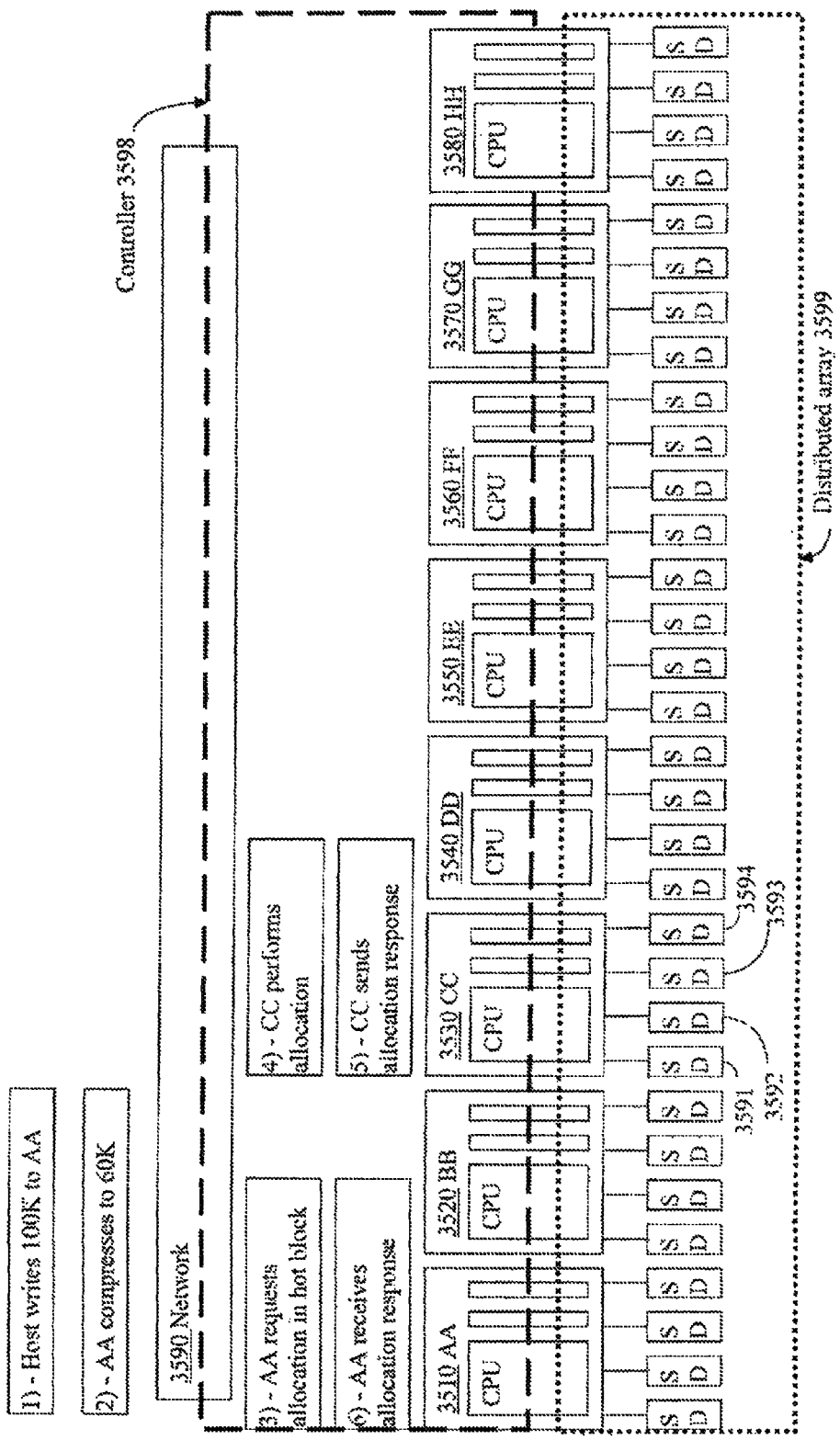
FIG. 35 is a block diagram of one exemplary implementation of a system implementing write allocation process operations in accordance with one embodiment.

FIG. 35 is a block diagram of one exemplary implementation of a distributed system implementing write allocation process operations in accordance with one embodiment. The distributed system includes network 3590 and distributed array 3599. Distributed array 3599 includes appliances 3510 AA, 3520 BB, 3530 CC, 3540 DD, 3550 EE, 3560 FF, 3570 GG, and 3580 HH. Each appliance 3510 AA, 3520 BB, 3530 CC, 3540 DD, 3550 EE, 3560 FF, 3570 GG, and 3580 HH includes a Multimode storage management system and multiple storage devices (e.g., 3591, 3592, 3593, and 3594). In one exemplary implementation the appliances 3510 AA, 3520 BB, 3530 CC, 3540 DD, 3550 EE, 3560 FF, 3570 GG, and 3580 HH are similar to appliance 3501. A host writes 100 KB of data to appliance 3510 AA in step 1. Appliance 3510 AA compresses the data in step 2. In step 3, the appliance 3510 AA requests allocation in a hot block. In step 4, appliance CC performs an allocation and in step 5, sends the allocation response back to appliance 3510 AA. In step 6, appliance 3510 AA receives the allocation response.

FIG. 36 is a flow chart of an exemplary write allocation process 3600 in accordance with one embodiment. In block 3610 data is sent to allocated appliances. In block 3620 the allocated appliances write the data. In block 3630 the data is sent for parity calculation.

Figure 37:
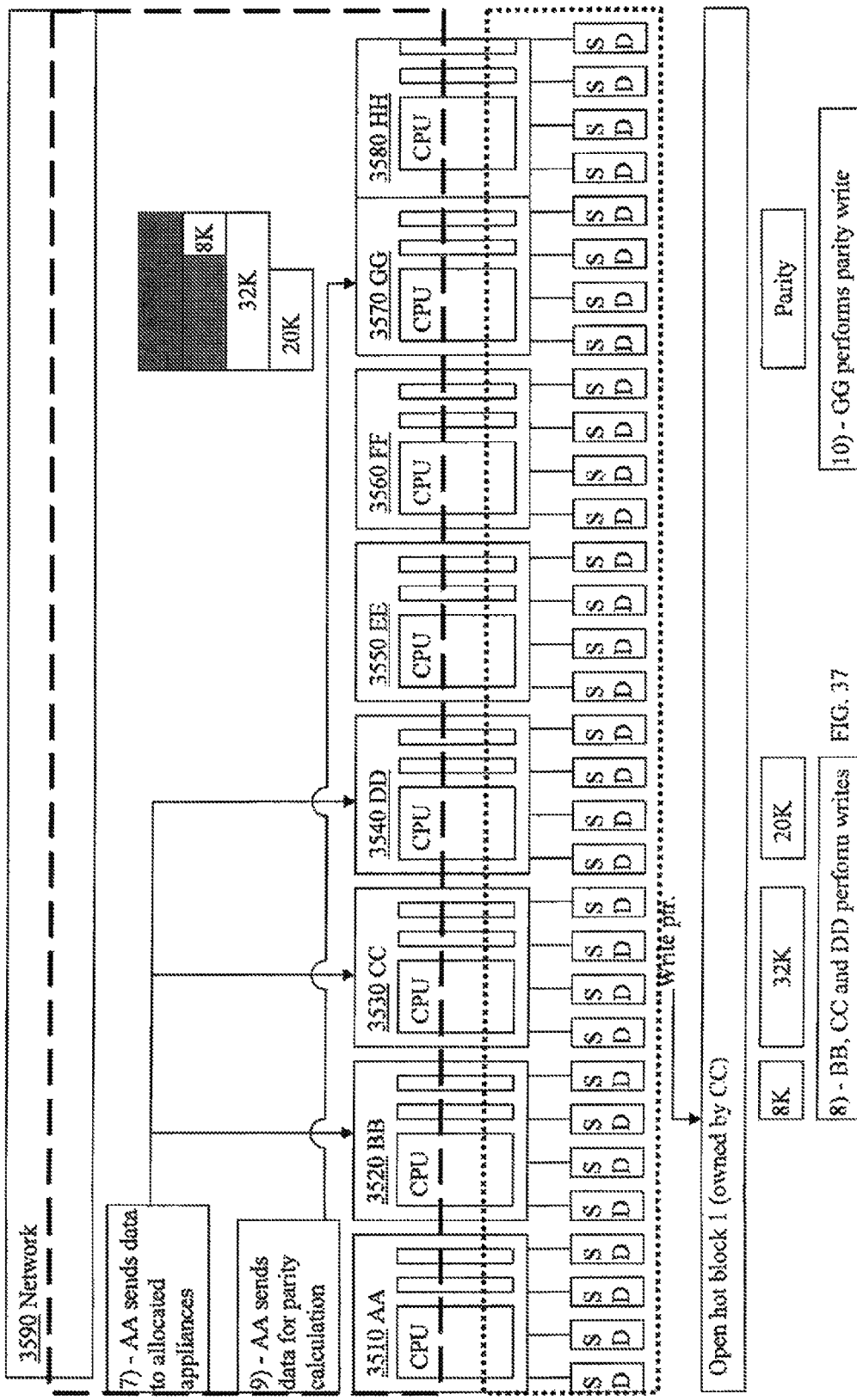
FIG. 37 is a block diagram of one exemplary implementation of a system implementing write allocation process operations in accordance with one embodiment.

FIG. 37 is a block diagram of one exemplary implementation of a system implementing write allocation process operations in accordance with one embodiment. In step 7, appliance 3510 AA sends data to the allocated appliances. In step 8, appliances 3520 BB, 3530 CC and 3540 DD write the data. In step 9, appliance 3510 AA sends the data for parity calculation and in step 10 appliance 3570 GG writes the parity information.

FIG. 38 is a flow chart of an exemplary write map update process 3800 in accordance with one embodiment. In block 3810 map updates are sent to primary and redundant owners. In block 3820 primary and redundant owners journal the map update and write the map at a later time. In block 3830 primary and redundant owners send responses. In block 3840, the responses are accumulated.

Figure 39:
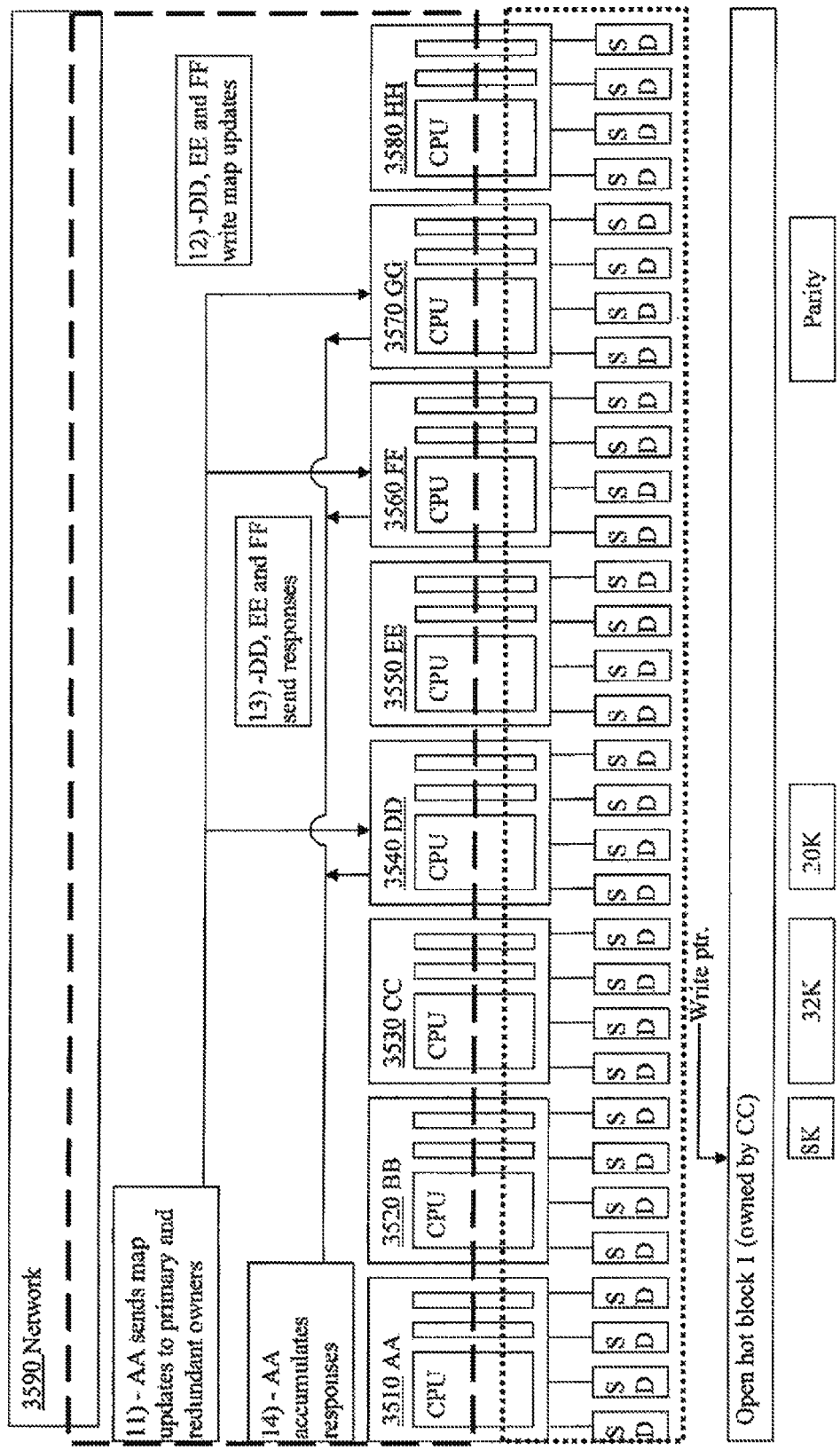
FIG. 39 is a block diagram of one exemplary implementation of a system implementing write map update process operations in accordance with one embodiment.

FIG. 39 is a block diagram of one exemplary system implementation of write map update process operations in accordance with one embodiment. In FIG. 39 step 11, appliance 3510 AA sends map updates to primary and redundant owners. In step 12, appliance 3540 DD, 3550 EE and 3560 FF write map updates and in block 13 they send responses. In step 14, appliance 3510 AA accumulates the responses.

Figure 40:
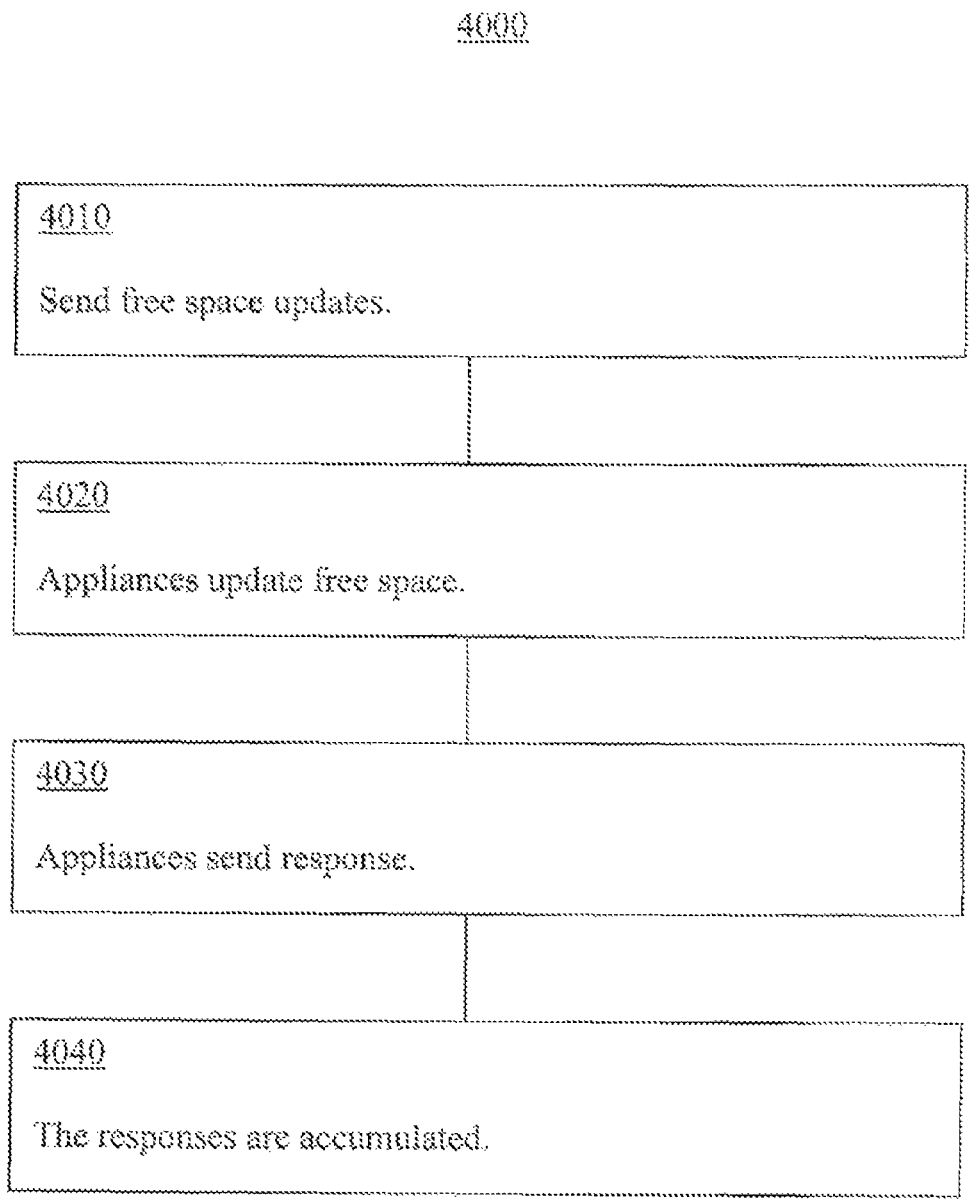
FIG. 40 is a flow chart of exemplary write free space accounting process in accordance with one embodiment.

FIG. 40 is a flow chart of exemplary write free space accounting process 4000 in accordance with one embodiment. In block 4010 free space updates are sent. In block 4020, the appliances update the free space. In block 4050, appliances send responses. In block 4040, the responses are accumulated.

Figure 41:
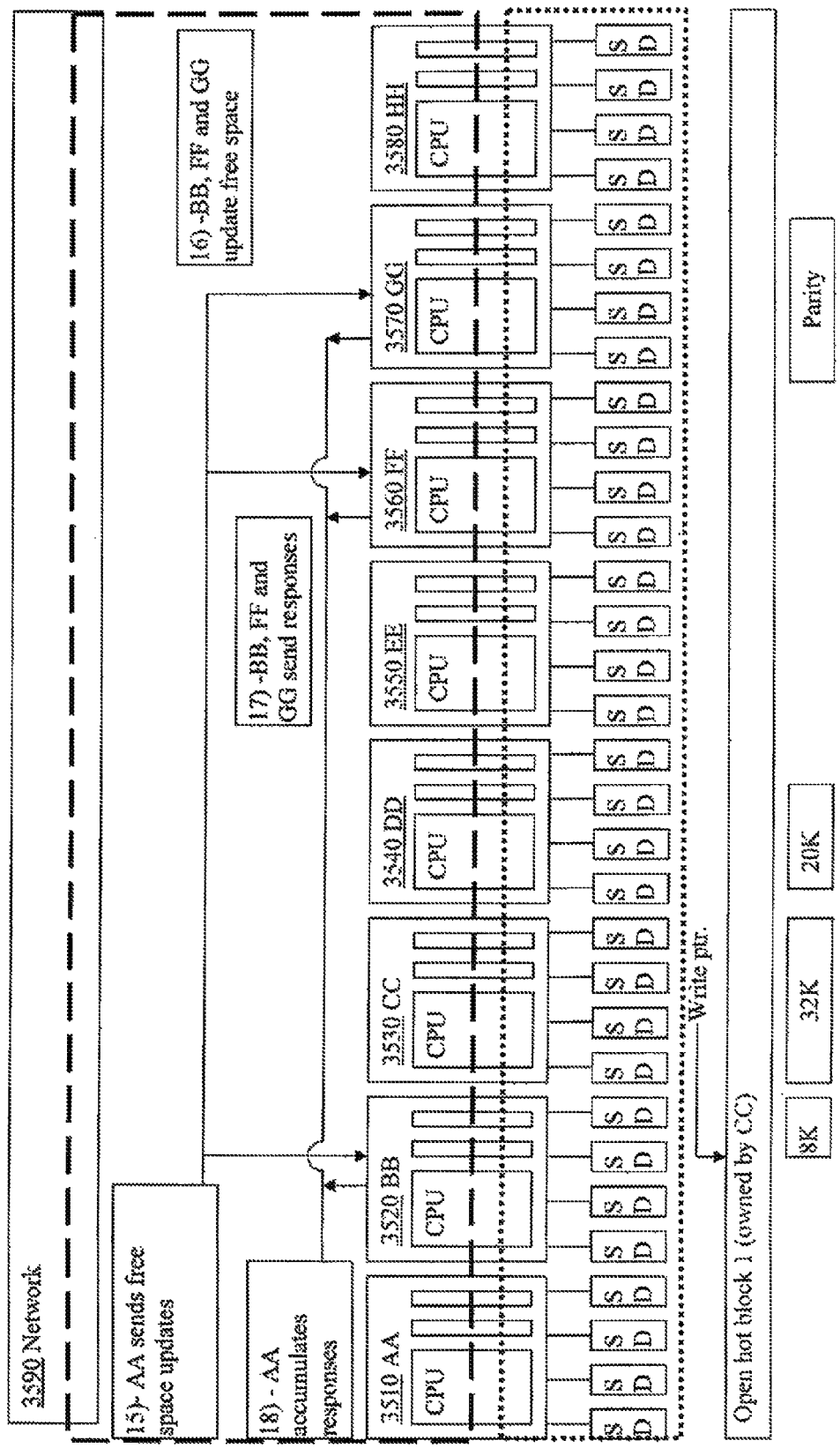
FIG. 41 is a block diagram of one exemplary implementation of a system implementing write free space accounting process operations in accordance with one embodiment.

FIG. 41 is a block diagram of an exemplary system implementing write free space accounting process operations in accordance with one embodiment. In step 15, appliance 3510 AA sends free space updates. In step 16, appliances 3520 BB, 3560 FF, and 3570 GG update free space and in step 17, they send responses. In step 18, appliance 3510 AA accumulates responses.

FIG. 42 is a flow chart of exemplary write completion process 4200 in accordance with one embodiment. In block 4210, appliances that wrote data send a write data safe indication. In block 4220, the responses are accumulated. In block 4230, the appliances send a parity safe indication. In block 4240, a command complete indication is forwarded.

Figure 43:
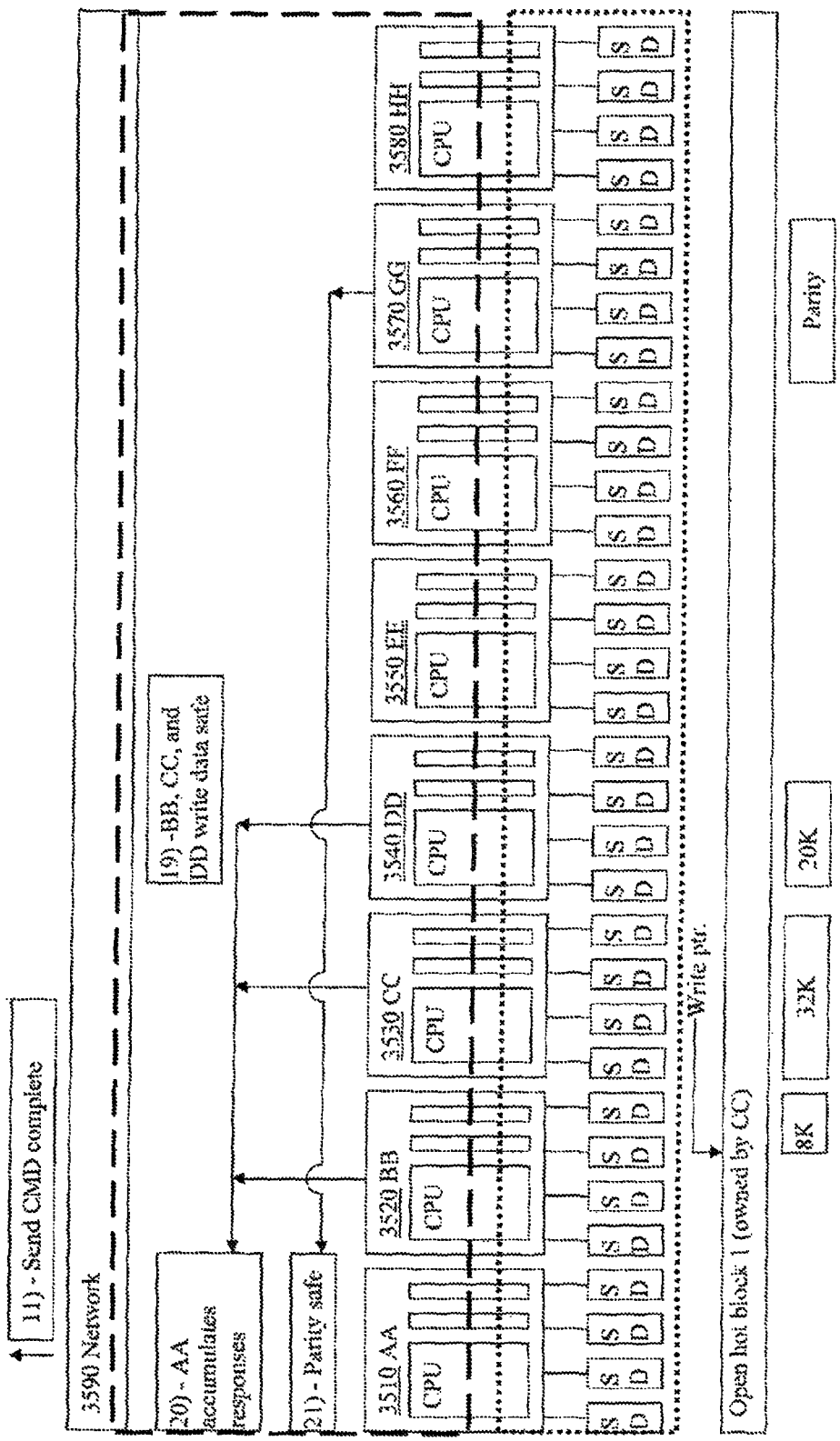
FIG. 43 is a block diagram of one exemplary implementation of a system implementing write completion process operations in accordance with one embodiment.

FIG. 43 is a block diagram of an exemplary system implementing write completion process operations in accordance with one embodiment. In step 19 appliances 3520 BB, 3530 CC, and 3540 DD forward an indication that the write data is safely stored. In step 20 appliance 3510 AA accumulates responses and in step 21 receives a parity safe indication from appliance 3570 GG.

Figure 44:
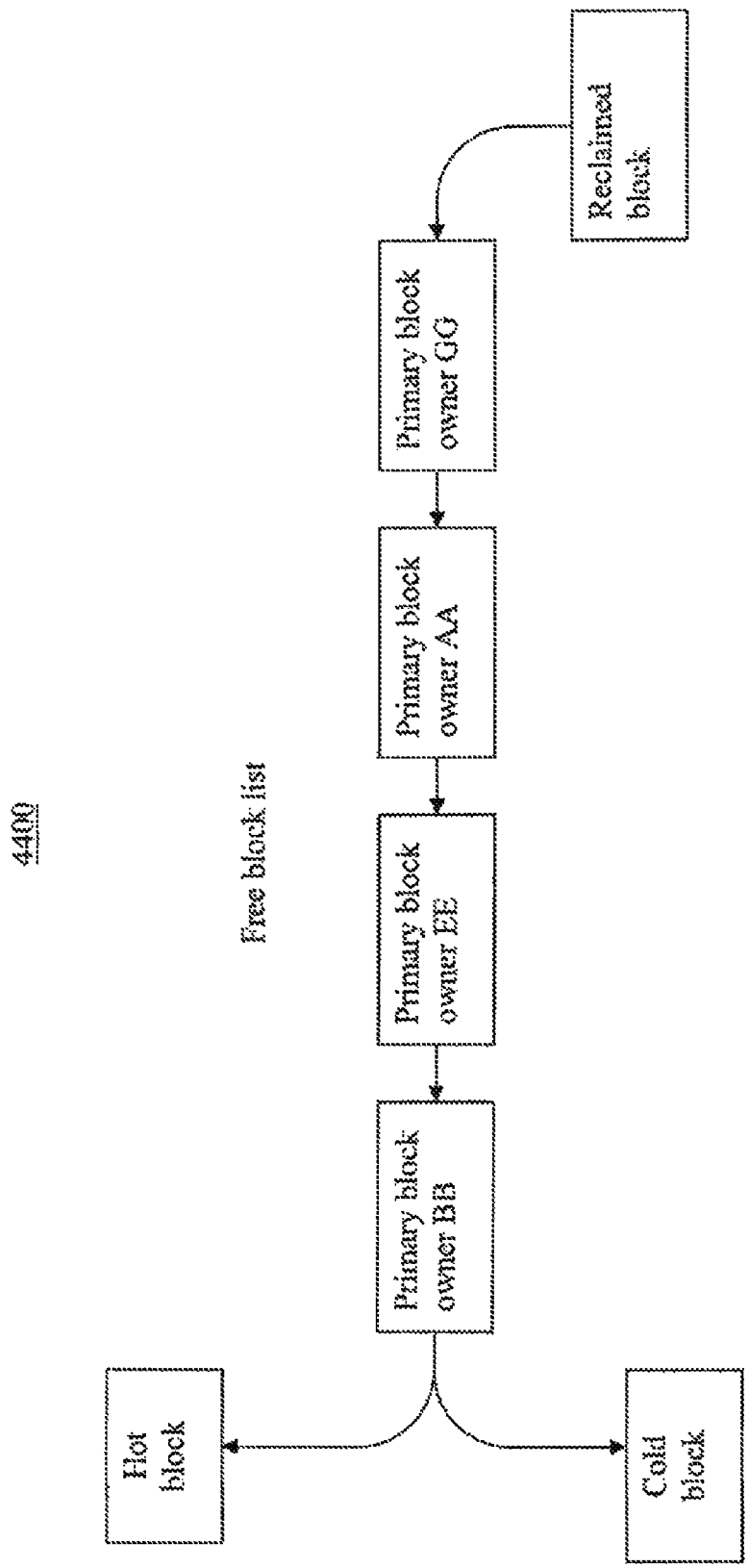
FIG. 44 is a block diagram of a exemplary reclamation initializing process in accordance with one embodiment.

FIG. 44 is a block diagram of an exemplary reclamation initializing process 4400 in accordance with one embodiment. As blocks become ready for reclamation they are directed to a free list. Depending on how many hot and cold blocks are currently active, and the number of blocks in the free block lists, the primary block owner at the head of the erase queue promotes itself to either be a hot or a cold block. If the block becomes a cold block it instigates the reclamation process.

FIG. 45 is a flow chart of an exemplary reclamation process 4500 in accordance with one embodiment. In step 4510, a block is promoted to a cold block and block picking is requested if necessary. In step 4520, block picking of potential blocks for reclamation is performed and the results are forwarded. In step 4530, a block pick selection is performed. In step 4540, the selected block is broadcast. In step 4550, reclamation is started and a map lookup is issued. In step 4560, a map response is handled. In step 4570, a reclamation write process is performed.

Figure 46:
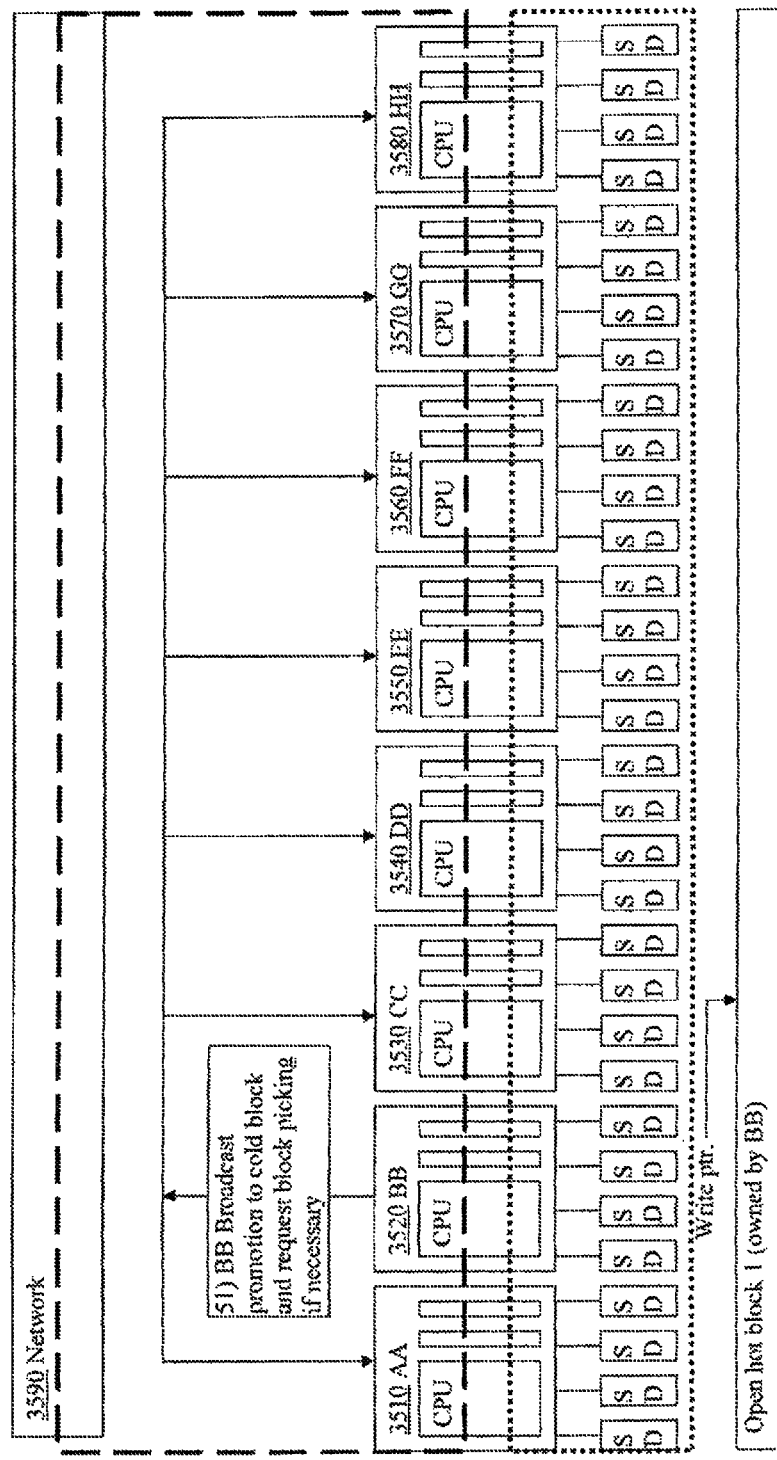
FIG. 46 is a block diagram showing a broadcast from an appliance that a block has become a cold block and requests block picking is necessary.
Figure 47:
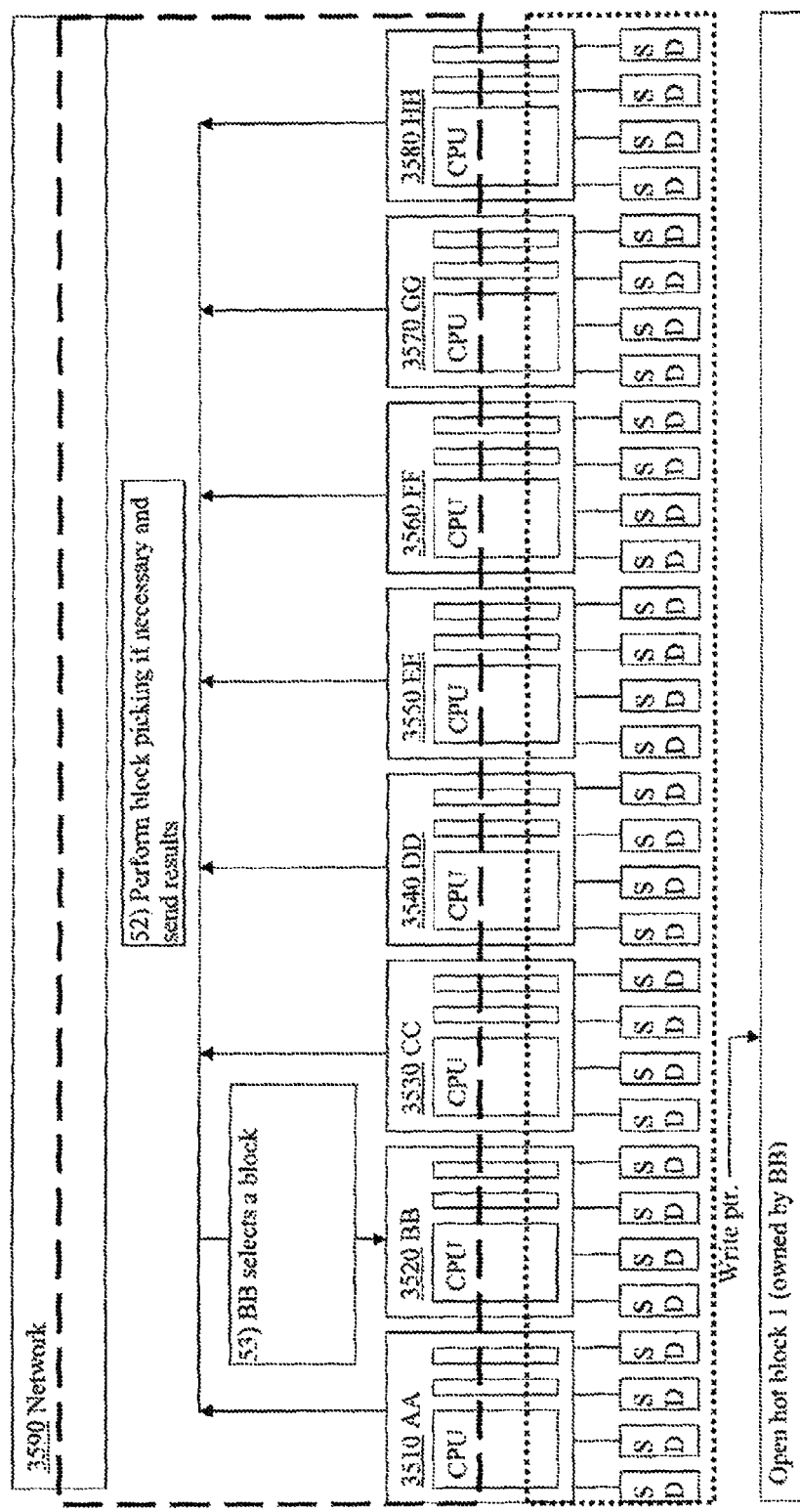
FIG. 47 is a block diagram showing other appliances performing block picking and sending the results back to an appliance.
Figure 48:
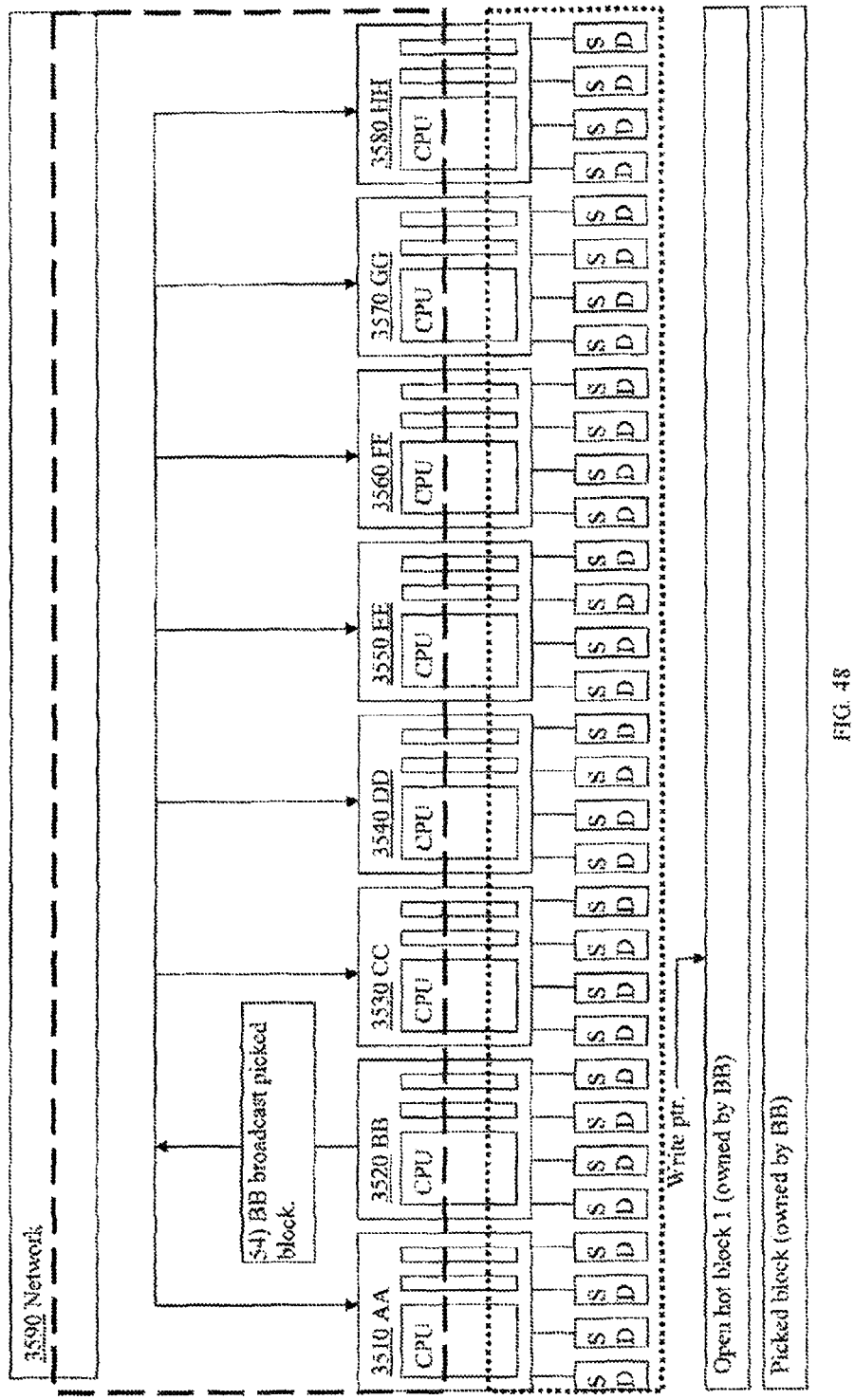
FIG. 48 is a block diagram illustrating an exemplary broadcast of a picked block.
Figure 49:
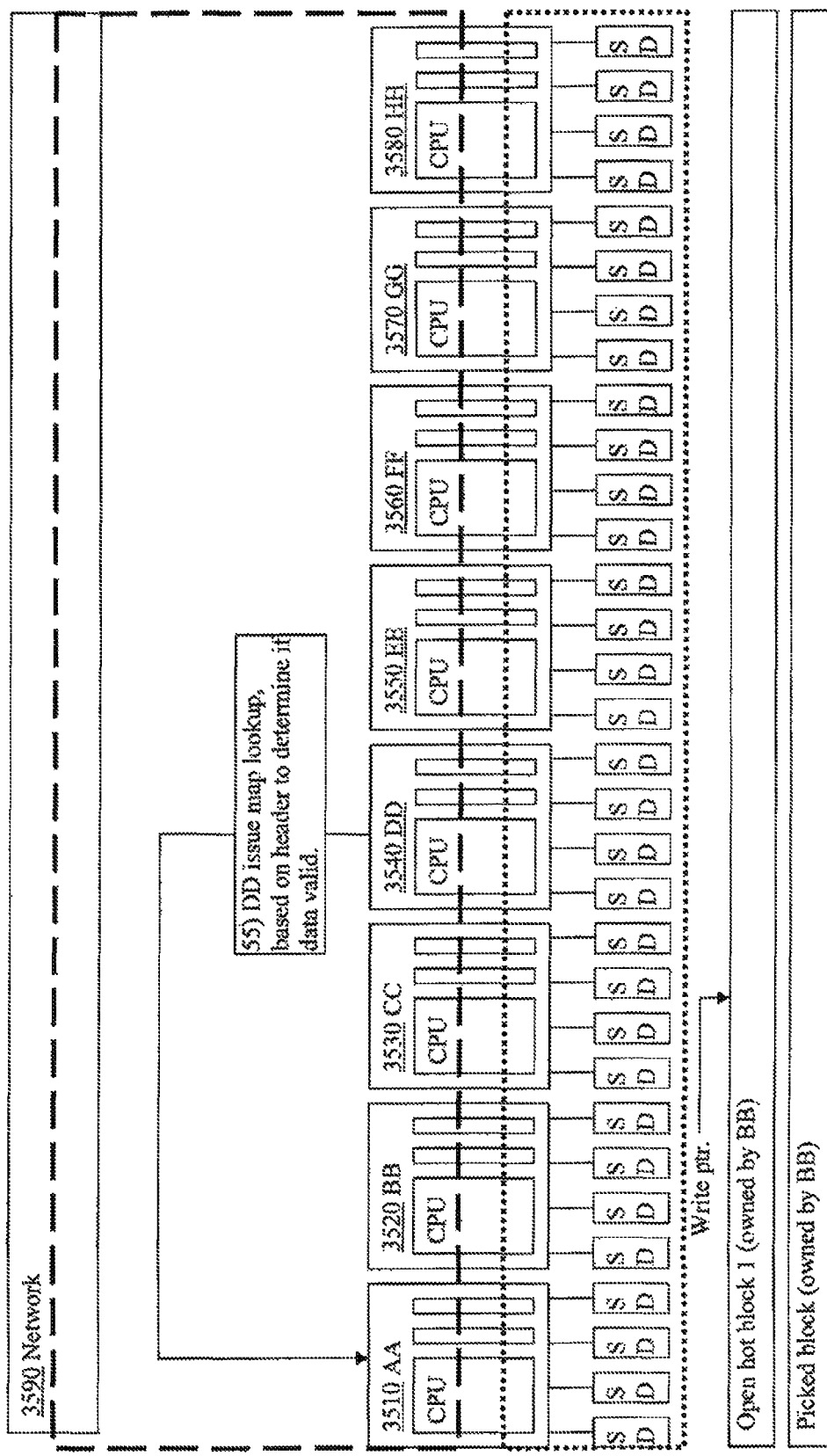
FIG. 49 is a block diagram illustrating an appliance issuing a map lookup to an appliance, based upon header to determine if data is valid.
Figure 50:
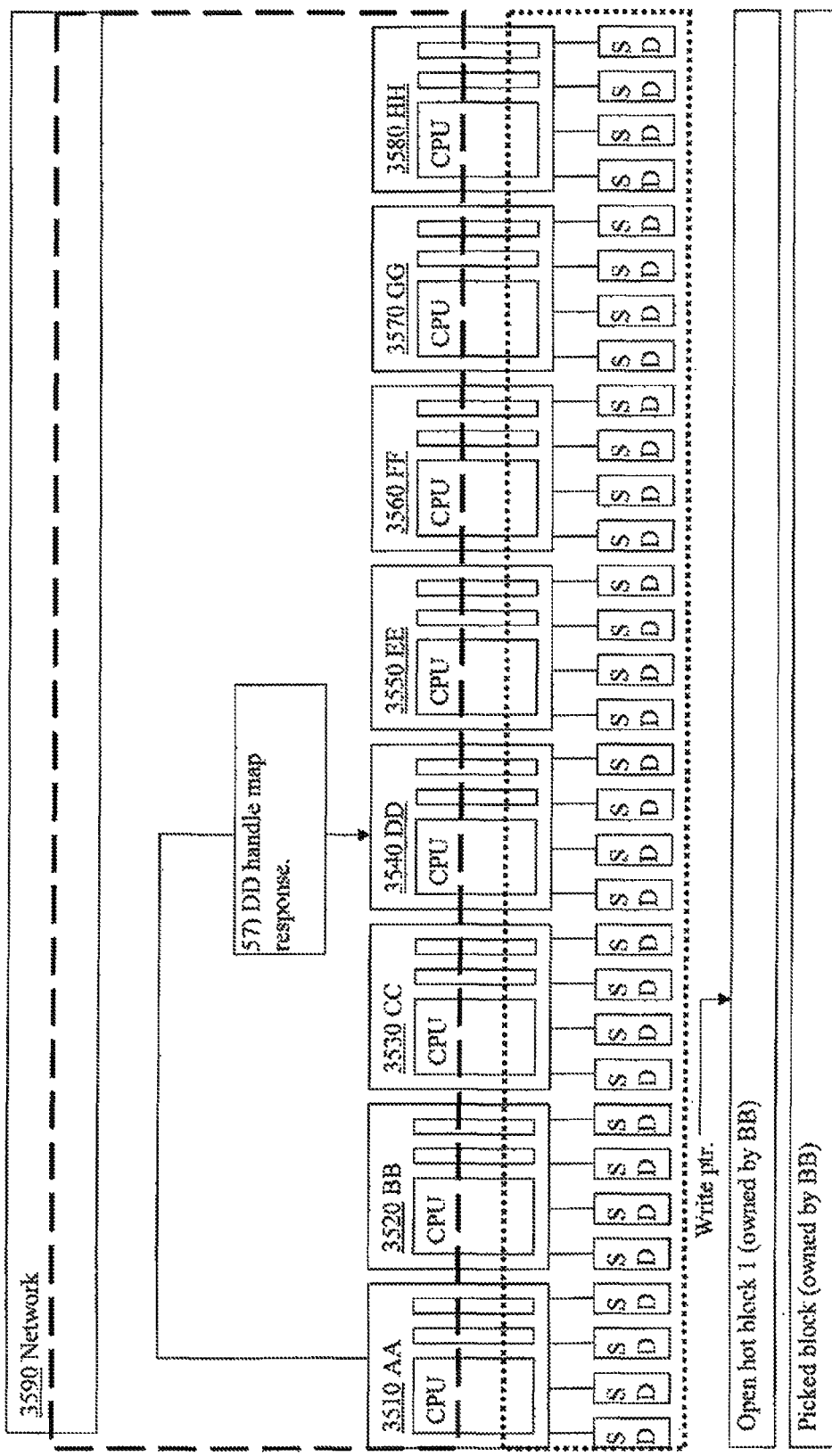
FIG. 50 is a block diagram illustrating an appliance handling a map response from another appliance.
Figure 51:
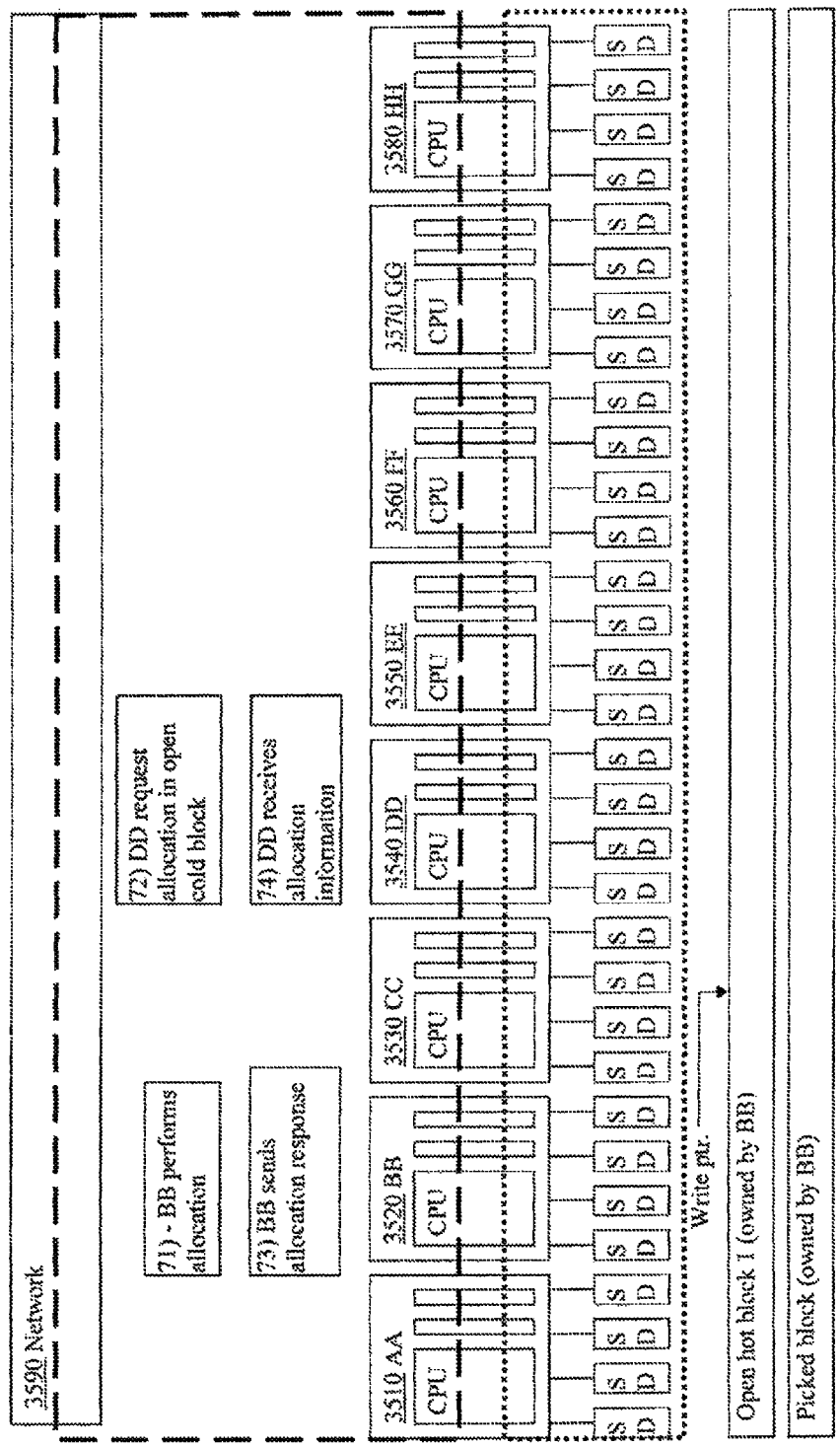
FIG. 51 is a block diagram illustrating a reclamation write process in accordance with one embodiment.

FIGS. 46 through 51 are block diagrams illustrating an exemplary reclamation implementation in accordance with one embodiment. Physical free space accounting is evenly distributed across systems with a redundant copy on random different systems via hashing. With regards to mapping, logical address space is evenly distributed across systems with a redundant copy on random different systems via hashing. In one example, block 3520 BB is next in a free block list and decides to become a cold block. FIG. 46 is a block diagram showing in step 51 a broadcast from appliance 3520 BB that a block has become a cold block and requests block picking if necessary. When a reclamation is likely already in process, allocation requests resulting from a promotion to a cold block can start very fast as there will already be a picked block in the queue. FIG. 47 is a block diagram showing other appliances performing block picking and sending the results back to appliance 3520 BB in step 52. When reclamation is not running and block picking is necessary, the systems or appliances (including the requesting system or appliance) perform block picking. In step 53, appliance 3520 BB selects a block. FIG. 48 is a block diagram illustrating an exemplary broadcast of a picked block in step 54. FIG. 49 is a block diagram illustrating appliance 3540 DD issuing a map lookup to appliance 3510 AA in step 55, based upon a header to determine if the data is valid. It is appreciated that multiple appliances can perform reclamation and appliance 3540 DD is shown for simplicity. Appliance 3540 DD starts at the beginning of its portion of the picked block (using a hidden header to determine the first header). FIG. 50 is a block diagram illustrating step 57 in which appliance 3540 DD is handling a map response from appliance 3510 AA. If the data is invalid, the process moves onto the next header assuming it is valid. It is possible that the data may spill over to appliance 3550 EE. If the data is valid then the second portion of the data is fetched from appliance 3550 EE (sequence not shown). FIG. 51 is a block diagram illustrating a reclamation write process. Steps for the reclamation write process are similar to host write operations except that the original location information is sent as part of the map update to allow stale updates to be discarded. In step 71, appliance 3520 BB performs an allocation and in step 72, appliance 3540 DD requests an allocation in a cold block. In step 73, appliance 3520 BB sends an allocation response and in step 74, appliance 3540 DD receives allocation information.

The presented multimode approaches include variety of features and characteristics that facilitate effective and efficient storage of information. The features and characteristics can be leveraged to improve many different aspects of performance. In one embodiment, the flexibility of the described partitioning approaches allows realization of relatively fast speed and manageable complexity. The relatively large amounts of user data are stored in a SUE address space that enables very fast storage and management operations for the user data. The relatively small amounts of metadata are stored in a logically addressed area allowing the system to leverage the abstraction nature of the metadata utilized for complexity reduction. In addition, the flexibility of increasing the over provisioning of the relatively smaller metadata region gives a much larger percentage over provisioning impact that helps speed up the metadata storage operations and compensate for the complexity reduction speed impact that would otherwise occur. This allows for better overall allocation and comparative impact of over provisioning resources. The flexibility can also facilitate improved life cycle preservation by allowing different storage regions of blocks to be reassigned or reallocated between the two partitions. The nature of the data stored in a region may mean it is written/erased less than another region (e.g., most of the metadata does not change much compared to the user data, etc.) and a physical block in one partition can be reassigned to another partition to even out wear and tear on a particular region. The flexibility also allows power cycling improvement by moving the power cycling responsibility up to the system level.

In one embodiment, a multimode selective underlying exposure storage device or approach is included in a distributed or shared storage system (e.g., a network attached storage (NAS) system or cluster) that includes a plurality of NAS devices (e.g., storage 100, 300, 400, 600, 700). The multimode selective underlying exposure NAS devices can provide data storage services for other devices (e.g., clients, servers, and so on) in the network. The storage services can include the storage, management, and maintenance for very large data sets commonly referred to as "big data". In one exemplary implementation, multimode selective underlying exposure NAS devices are included in or are part of an online transaction processing (OLTP) system that, in general, stores and maintains a database of transactional data. A database management system (DBMS) or distributed DBMS partitions the database across a cluster of computer systems or storage devices in the OLTP.

Being able to flexibly rearrange or move different types of data and/or storage management operations to different parts of a system (e.g., the internet, a networked "cloud", a data center, a network, and so on) enables a variety of greater capabilities. The multimode selective underlying exposure storage approach enables utilization of applications that involve splitting different types of data and address access. In one embodiment, types of information, such as "user data", that is considered big or large can be stored in one part of system (e.g., cloud, data center, or network), while other types of data, such as "metadata", that is consider small can be handled in another part of the system (e.g., cloud, datacenter, or network). For example, in the past user data and metadata were not typically split or accessed differently. With a multimode selective underlying exposure system "big data" that is accessed often can be handled by storage better suited for storing this type of information (e.g., physically addressed) or closer to processing power better able to handle the information (thereby reducing latency and impact on network communications). The "small data" or metadata can be in stored in a smaller storage area that is logically accessed with reduced complexity.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A distributed storage system comprising:
   a plurality of appliances wherein at least a first one of the plurality of appliances includes:
      a plurality of storage devices that have:
         a first storage partition including a first type of interface and a first information storage region configured to store a first type of information;
         a second storage partition including a selective underlying exposure (SUE) interface and a second information storage region that stores a second type of information, wherein the SUE interface exposes an aspect of the second information storage region;
      a distributed multimode storage management coordinator that includes a plurality of multimode storage management systems that direct conveyance of information to the plurality of storage devices, wherein the plurality of multimode storage management systems include multimode selective underlying exposure (SUE) management systems that direct file activities of the second partitions via the SUE interface in accordance with the aspect exposed by the SUE interface, wherein the aspect includes grouping a plurality of underlying physical address blocks that are managed together in response to individual management commands including an erase command; and
      a communication mechanism for communicating messages between the plurality of multimode storage management systems, including distributed multimode storage management messages.

2. The distributed storage system of claim 1, wherein the distributed multimode storage management messages keep selected underlying aspects exposed across the plurality of appliances.

3. The distributed storage system of claim 1, wherein metadata storage space and user data storage space are spread out homogenously across the plurality of appliances.

4. The distributed storage system of claim 1, wherein SUE address space mapping is maintained across multiple appliances and wherein a representative geometry configuration of the SUE address space mapping matches a representative geometry configuration of an underlying physical address space.

5. The distributed storage system of claim 1, wherein redundancy is controlled at a level of the multimode storage management system.

6. The distributed storage system of claim 1, wherein the plurality of appliances are arranged in an architecture in which elements of the architecture are linearly scalable across multiple systems.

7. The distributed storage system of claim 1, wherein the distributed multimode storage management coordinator operates based on a selective underlying exposure level across the plurality of storage devices.

8. The distributed storage system of claim 1, wherein failure of a single unit does not bring the distributed storage system down even though a node includes more than one storage device.

9. The distributed storage system of claim 1, wherein free space accounting occurs at a selected underlying aspect block level.

10. A distributed storage method comprising:
setting up a plurality of appliances in a redundant array independent device (RAID) configuration, wherein one of the plurality of appliances includes a plurality of storage devices; and
managing information storage in the plurality of storage devices, including mapping a first type of address space into a selective underlying exposure (SUE) address space that corresponds to an aspect of at least one of the underlying storage devices and the aspect includes grouping a plurality of underlying physical address blocks that are managed together in response to individual management commands including an erase command.

11. The distributed storage method of claim 10, wherein mapping data is logically distributed across a plurality of storage devices redundantly.

12. The distributed storage method of claim 10, wherein said managing information storage includes coordinating management of information storage in the plurality of storage devices across the redundant array independent device (RAID) configuration.

13. The distributed storage method of claim 12, wherein said coordinating includes communicating messages between a first one of the plurality of appliances and a second one of the plurality of appliances.

14. The distributed storage method of claim 12, wherein free space accounting happens at a multimode storage management system level.

15. The distributed storage method of claim 12, wherein reclamation is managed by a primary block owner which triggers distributed block picking and a picked block is distributed to another block.

16. The distributed storage method of claim 12, wherein a non primary block owner performs a physical scan and valid determination lookup.

17. A distributed facility comprising:
a plurality of appliances that store information in stripes, wherein at least a first one of the plurality of appliances includes:
a plurality of solid state storage devices that have:
a first storage partition including a first type of interface and a first information storage region configured to store a first type of information;
a second storage partition including a selective underlying exposure (SUE) interface and a second information storage region that stores a second type of information, wherein the SUE interface exposes an aspect of the second information storage region;
a distributed multimode storage management coordinator that includes a plurality of multimode storage management systems that direct conveyance of information to the plurality of storage devices, wherein the distributed multimode storage management coordinator includes a multiple mode underlying exposure management system that directs file activities of the second partitions via the SUE interface and selected underlying aspects wherein the selected underlying aspects include grouping a plurality of underlying physical address blocks that are managed together in response to individual management commands including an erase command; and
a communication mechanism for communicating messages between a hybrid management system and a second one of the plurality of appliances.

18. The distributed facility of claim 17, further comprising physically striping metadata and user data across multiple systems.

19. The distributed facility of claim 17, wherein redundancy is controlled at a level of the distributed multimode storage management coordinator which is a higher hierarchical level than a storage device.

20. The distributed facility of claim 17, wherein a failure unit is a storage node and failure of a single node does not bring down the distributed facility, wherein a storage node includes one of the plurality of appliances.

* * * * *